US010284852B2

(12) United States Patent
Possos et al.

(10) Patent No.: US 10,284,852 B2
(45) Date of Patent: May 7, 2019

(54) CONTENT ADAPTIVE PREDICTION DISTANCE ANALYZER AND HIERARCHICAL MOTION ESTIMATION SYSTEM FOR NEXT GENERATION VIDEO CODING

(71) Applicant: INTEL CORPORATION, Santa Clara, CA (US)

(72) Inventors: Sebastian Possos, Redmond, WA (US); Atul Puri, Redmond, WA (US)

(73) Assignee: Intel Corporation, Santa Clara, CA (US)

(*) Notice: Subject to any disclaimer, the term of this patent is extended or adjusted under 35 U.S.C. 154(b) by 643 days.

(21) Appl. No.: 14/759,165

(22) PCT Filed: Jan. 30, 2014

(86) PCT No.: PCT/US2014/013965
§ 371 (c)(1),
(2) Date: Jul. 2, 2015

(87) PCT Pub. No.: WO2014/120987
PCT Pub. Date: Aug. 7, 2014

(65) Prior Publication Data
US 2016/0127741 A1    May 5, 2016

Related U.S. Application Data

(60) Provisional application No. 61/758,314, filed on Jan. 30, 2013.

(51) Int. Cl.
*H04N 19/53* (2014.01)
*H04N 19/517* (2014.01)
(Continued)

(52) U.S. Cl.
CPC ............ *H04N 19/13* (2014.11); *H04N 19/105* (2014.11); *H04N 19/117* (2014.11);
(Continued)

(58) Field of Classification Search
CPC ...... H04N 19/53; H04N 19/577; H04N 19/59; H04N 19/523; H04N 19/517; H04N 19/593
See application file for complete search history.

(56) References Cited

U.S. PATENT DOCUMENTS 6,542,547 B1    4/2003  Wong
2007/0127573 A1  6/2007  Soroushian et al.
(Continued)

FOREIGN PATENT DOCUMENTS

CN    102918839 A      2/2013
JP    2006270301 A  * 10/2006
(Continued)

OTHER PUBLICATIONS

CN Office Action dated Oct. 18, 2017 for CN Application No. 201480003732.4, 5 pages.
(Continued)

*Primary Examiner* — Gims S Philippe
*Assistant Examiner* — Mainul Hasan
(74) *Attorney, Agent, or Firm* — Jordan IP Law, LLC

(57) ABSTRACT

Techniques related to content adaptive prediction distance analysis and hierarchical motion estimation for video coding may address the general problem of designing a new, advanced video codec that maximizes the achievable compression efficiency while remaining sufficiently practical for implementation on various platforms including limited devices. More specifically, certain motion estimation techniques may be adaptive to properties of the content and results in improved motion compensation, lower computa-
(Continued)

tional complexity, and lower cost of motion vector coding as compared to existing solutions.

48 Claims, 34 Drawing Sheets

(51) Int. Cl.

| | |
|---|---|
| H04N 19/523 | (2014.01) |
| H04N 19/577 | (2014.01) |
| H04N 19/59 | (2014.01) |
| H04N 19/13 | (2014.01) |
| H04N 19/105 | (2014.01) |
| H04N 19/124 | (2014.01) |
| H04N 19/182 | (2014.01) |
| H04N 19/513 | (2014.01) |
| H04N 19/167 | (2014.01) |
| H04N 19/169 | (2014.01) |
| H04N 19/17 | (2014.01) |
| H04N 19/186 | (2014.01) |
| H04N 19/122 | (2014.01) |
| H04N 19/176 | (2014.01) |
| H04N 19/61 | (2014.01) |
| H04N 19/91 | (2014.01) |
| H04N 19/63 | (2014.01) |
| H04N 19/119 | (2014.01) |
| H04N 19/96 | (2014.01) |
| H04N 19/12 | (2014.01) |
| H04N 19/136 | (2014.01) |
| H04N 19/139 | (2014.01) |
| H04N 19/159 | (2014.01) |
| H04N 19/184 | (2014.01) |
| H04N 19/192 | (2014.01) |
| H04N 19/573 | (2014.01) |
| H04N 19/117 | (2014.01) |
| H04N 19/82 | (2014.01) |
| H04N 19/196 | (2014.01) |
| H04N 19/126 | (2014.01) |
| H04N 19/31 | (2014.01) |
| H04N 19/40 | (2014.01) |
| H04N 19/14 | (2014.01) |
| H04N 19/172 | (2014.01) |
| H04N 19/593 | (2014.01) |
| H04N 19/44 | (2014.01) |
| H04N 19/147 | (2014.01) |
| H04N 19/52 | (2014.01) |

(52) U.S. Cl.
CPC .......... *H04N 19/119* (2014.11); *H04N 19/12* (2014.11); *H04N 19/122* (2014.11); *H04N 19/124* (2014.11); *H04N 19/126* (2014.11); *H04N 19/136* (2014.11); *H04N 19/139* (2014.11); *H04N 19/14* (2014.11); *H04N 19/159* (2014.11); *H04N 19/167* (2014.11); *H04N 19/17* (2014.11); *H04N 19/172* (2014.11); *H04N 19/176* (2014.11); *H04N 19/182* (2014.11); *H04N 19/184* (2014.11); *H04N 19/186* (2014.11); *H04N 19/1887* (2014.11); *H04N 19/192* (2014.11); *H04N 19/196* (2014.11); *H04N 19/31* (2014.11); *H04N 19/40* (2014.11); *H04N 19/513* (2014.11); *H04N 19/517* (2014.11); *H04N 19/523* (2014.11); *H04N 19/53* (2014.11); *H04N 19/573* (2014.11); *H04N 19/577* (2014.11); *H04N 19/59* (2014.11); *H04N 19/593* (2014.11); *H04N 19/61* (2014.11); *H04N 19/63* (2014.11); *H04N 19/82* (2014.11); *H04N 19/91* (2014.11); *H04N 19/96* (2014.11); *H04N 19/147* (2014.11); *H04N 19/44* (2014.11); *H04N 19/52* (2014.11)

(56) References Cited

U.S. PATENT DOCUMENTS

| | | | |
|---|---|---|---|
| 2008/0240249 A1 | 10/2008 | Chien et al. | |
| 2009/0086814 A1* | 4/2009 | Leontaris | H04N 19/105 375/240.02 |
| 2009/0086816 A1* | 4/2009 | Leontaris | H04N 19/80 375/240.03 |
| 2009/0135901 A1 | 5/2009 | Au et al. | |
| 2011/0058610 A1* | 3/2011 | Van Beek | H04N 19/198 375/240.16 |
| 2011/0069757 A1* | 3/2011 | Ammu | H04N 19/172 375/240.12 |
| 2012/0170660 A1 | 7/2012 | Novotny et al. | |
| 2012/0281759 A1* | 11/2012 | Xu | H04N 19/30 375/240.16 |
| 2013/0022126 A1 | 1/2013 | Xu et al. | |

FOREIGN PATENT DOCUMENTS

| | | |
|---|---|---|
| JP | 2006270301 A * | 10/2006 |
| WO | 2009141011 A1 | 11/2009 |

OTHER PUBLICATIONS

International Preliminary Report on Patentability for PCT/US2014/013965, dated Aug. 13, 2015, 6 pages.
International Search Report and Written Opinion for PCT/US2014/013965, dated Jun. 9, 2014, 9 pages.
Notice of Preliminary Rejection for Korean Patent Application 2015-7017027, dated Oct. 21, 2016, 5 pages (w/Translation).

* cited by examiner

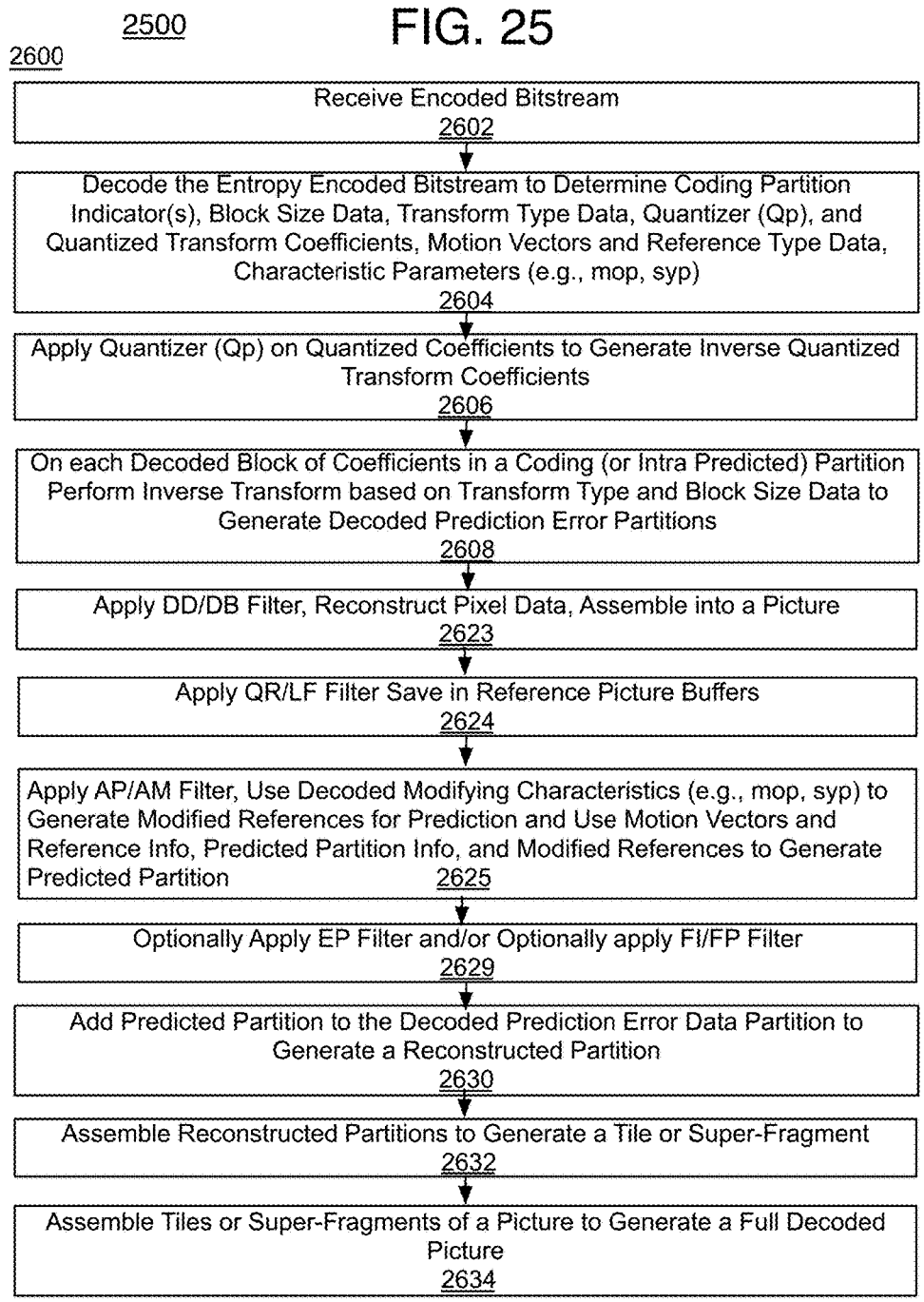

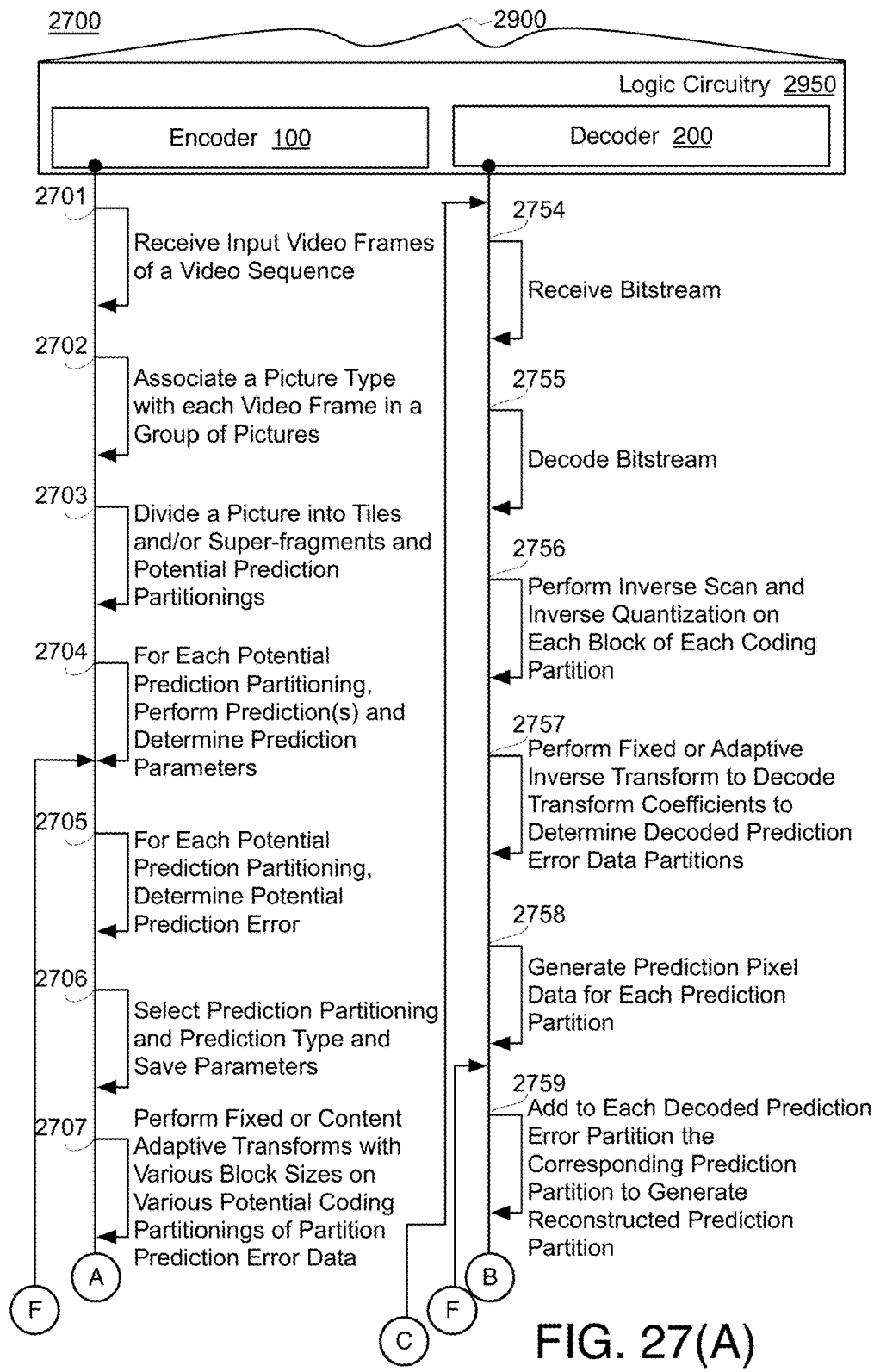

CONTENT ADAPTIVE PREDICTION DISTANCE ANALYZER AND HIERARCHICAL MOTION ESTIMATION SYSTEM FOR NEXT GENERATION VIDEO CODING

RELATED APPLICATIONS

The present application is a national stage application of international application no. PCT/US2014/013965, filed Jan. 30, 2014, which claims the benefit of U.S. Provisional Application No. 61/758,314 filed 30 Jan. 2013, and titled "NEXT GENERATION VIDEO CODING", the disclosure of which is expressly incorporated herein in its entirety.

BACKGROUND

A video encoder compresses video information so that more information can be sent over a given bandwidth. The compressed signal may then be transmitted to a receiver having a decoder that decodes or decompresses the signal prior to display.

High Efficient Video Coding (HEVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). HEVC is being developed in response to the previous H.264/AVC (Advanced Video Coding) standard not providing enough compression for evolving higher resolution video applications. Similar to previous video coding standards, HEVC includes basic functional modules such as intra/inter prediction, transform, quantization, in-loop filtering, and entropy coding.

With ever increasing resolution of video and expectation of high video quality due to availability of good displays, the corresponding bitrate/bandwidth required using existing video coding standards such as earlier MPEG standards and even the more recent H.264/AVC standard, is relatively high. In fact, the development of a new standard (HEVC) was deemed necessary as H.264/AVC was not perceived to be providing high enough compression for evolving higher resolution video applications.

To gain high coding efficiency, competitive video coding solutions, standards typically employ interframe video coding, of which motion estimation and compensation is a component. Standards typically operate to standardize motion compensation block sizes, motion compensation accuracy and filtering, motion compensation types (forward, and/or backward), and use of multiple reference motion compensation. However, such standards typically do not standardize specific techniques for motion estimation.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 25 illustrates an example bitstream;

FIG. 26 is a flow diagram illustrating an example decoding process;

FIGS. 27(A), 27(B), and 27(C) provide an illustrative diagram of an example video coding system and video coding process in operation;

DETAILED DESCRIPTION

Figure 1:
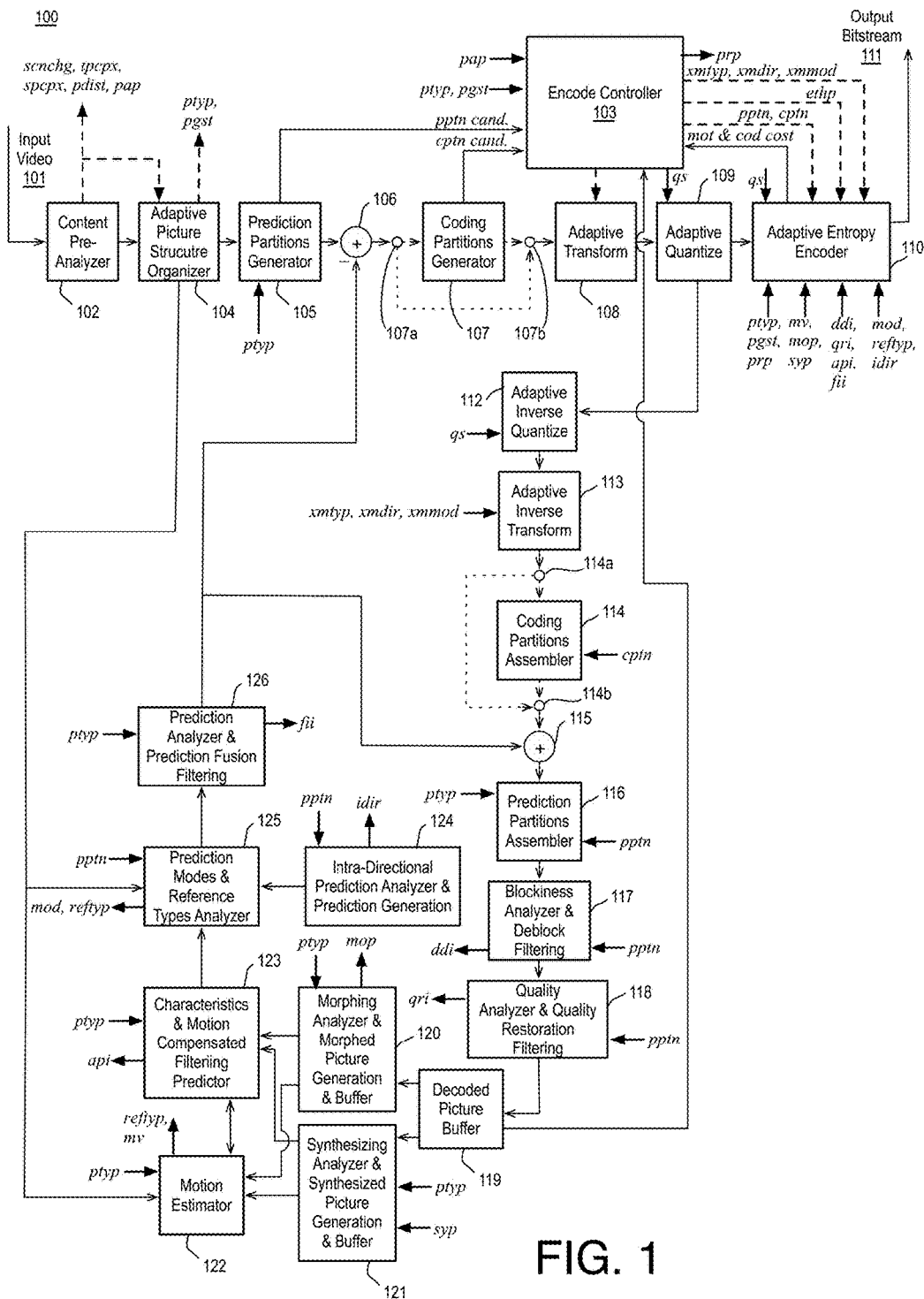
FIG. 1 is an illustrative diagram of an example next generation video encoder.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.); and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to content adaptive prediction distance analysis and hierarchical motion estimation for video coding.

As discussed above, standards typically do not standardize specific techniques for motion estimation. In fact, while not standardized, a good motion estimation technique may be needed to show compression efficiency of any video coding solution as well designed motion estimation technique can allow higher compression by providing improved prediction, allow balanced computational complexity, and reduce motion vector coding overhead bit cost. This is especially important as all advanced video codecs use several different block sizes for motion compensation, they also use higher accuracy (such as one-fourth pixel, or one-eight pixel) motion compensation, as well as may typically use multiple reference pictures for motion compensation.

Typically, video coding uses I-, P-, and B- (or somewhat similar) pictures where I- are Intra pictures that do not use motion compensation, P-frames use uni-directional (forward or backward) motion compensation, and B-pictures that are non-causal and use bi-directional (forward and/or backward) motion compensation. Thus, even in a simple scenario of no explicit multi-reference frames, typical video coding uses up to two reference pictures. Typically, to achieve higher coding efficiency it is not uncommon for each picture to use 8 or more block sizes (by first subdividing picture into Macroblocks, prediction units or tiles, and then into smaller blocks), between 4 and 8 decoded reference pictures, and at least one-quarter pixel accuracy motion compensation. Further, the arrangement of I-, P-, and B-pictures, which may be closely related to frequency of occurrence of each picture type may be directly related to the amount of compression that is possible as B-pictures can allow higher compression with support from high quality coded P- and I-pictures.

Thus, higher the temporal prediction distance (pdist) between P-pictures, the higher the number of B-pictures, which allows for potentially higher compression, at least for lower complexity scenes. Variable complexity scenes or scenes with highly varying amount of motion present a challenge as for such scenes the pdist parameter needs to be adaptive to content. For instance, a pdist=2 (1 B-picture) between neighboring anchor pictures, an I-picture or P-picture.

However, the use of a larger pdist parameter, while it may have potential benefits for compression efficiency can have adverse consequences for complexity due to need for large fixed range required for motion estimation. Again, while a fixed pdist parameter is not mandated in standards based coding, typically the complexity of correctly and continuously deciding this parameter causes typically standards to recommend fixed reference pdist parameter to use for video coding. Overall, a good technique for motion estimation not only improves motion compensation efficiency but also allows for ease of adaptation of pdist, giving a significant overall benefit in coding efficiency.

As will be described in greater detail below, the limitations of existing approaches including those used by H.264 and HEVC standard recommended motion estimation schemes may be addressed by the lower complexity, higher efficiency techniques discussed herein. The present disclosure developed within the context of Next Generation Video (NGV) codec project addresses the general problem of designing a new, advanced video codec that maximizes the achievable compression efficiency while remaining sufficiently practical for implementation on various platforms including limited devices. More specifically, motion estimation techniques will be discussed herein that may be adaptive to properties of the content and results in improved motion compensation, lower computational complexity, and lower cost of motion vector coding as compared to existing solutions.

More specifically, techniques described herein may differ from standards based approaches as it naturally incorporates significant content based adaptivity in video coding process to achieve higher compression. By comparison, standards based video coding approaches typically tend to squeeze higher gains by adaptations and fine tuning of legacy approaches. For instance, a Content Adaptive Hierarchical Motion Estimation technique discussed below, was designed with the purpose of computing accurate motion estimates with low computational complexity, while ensuring that the motion estimates can be used for efficient video compression (low overhead coding of motion vectors). More specifically, the following disclosure includes discussion of the following aspects: a Content Adaptive Hierarchical Motion Estimator (HME); a Content Adaptive Prediction Distance (e.g., a Temporal-Spatial Analyzer) Analyzer; and/or a Content Adaptive Prediction Distance Analyzer and Motion Estimation System (which may include an HME and/or Temporal-Spatial Analyzer).

Accordingly, techniques described herein describe content adaptive motion estimation methods that may provide the following benefits over other existing algorithms: smoother motion field; accurate motion description; configurable subpel precision (e.g., up to ⅛ pel); methods that may be ready made for interfacing with preprocessor tools; an ability to detect and adapt for very large motion, and or very large resolution; 3 levels of accuracy for motion description; the like; and/or combinations thereof. Additionally, techniques described herein describe an application of such motion estimator in adaptively computing pdist that is of significant value in increasing overall compression efficiency in video coding.

As used herein, the term "coder" may refer to an encoder and/or a decoder. Similarly, as used herein, the term "coding" may refer to performing video encoding via an encoder and/or performing video decoding via a decoder. For example, a video encoder and video decoder may both be examples of coders capable of coding video data. In addition, as used herein, the term "codec" may refer to any process, program or set of operations, such as, for example, any combination of software, firmware, and/or hardware that may implement an encoder and/or a decoder. Further, as used herein, the phrase "video data" may refer to any type of data associated with video coding such as, for example, video frames, image data, encoded bit stream data, or the like.

FIG. 1 is an illustrative diagram of an example next generation video encoder 100, arranged in accordance with at least some implementations of the present disclosure. As shown, encoder 100 may receive input video 101. Input video 101 may include any suitable input video for encoding such as, for example, input frames of a video sequence. As shown, input video 101 may be received via a content pre-analyzer module 102. Content pre-analyzer module 102 may be configured to perform analysis of the content of video frames of input video 101 to determine various types of parameters for improving video coding efficiency and speed performance. For example, content pre-analyzer module 102 may determine horizontal and vertical gradient information (e.g., Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation, or the like. The parameters generated by content pre-analyzer module 102 may be used by encoder 100 (e.g., via encode controller 103) and/or quantized and communicated to a decoder. As shown, video frames and/or other data may be transmitted from content pre-analyzer module 102 to adaptive picture organizer module 104, which may determine the picture type (e.g., I-, P-, or F/B-picture) of each video frame and reorder the video frames as needed. In some examples, adaptive picture organizer module 104 may include a frame portion generator configured to generate frame portions. In some examples, content pre-analyzer module 102 and adaptive picture organizer module 104 may together be considered a pre-analyzer subsystem of encoder 100.

As shown, video frames and/or other data may be transmitted from adaptive picture organizer module 104 to prediction partitions generator module 105. In some examples, prediction partitions generator module 105 may divide a frame or picture into tiles or super-fragments or the like. In some examples, an additional module (e.g., between modules 104 and 105) may be provided for dividing a frame or picture into tiles or super-fragments. Prediction partitions generator module 105 may divide each tile or super-fragment into potential prediction partitionings or partitions. In some examples, the potential prediction partitionings may be determined using a partitioning technique such as, for example, a k-d tree partitioning technique, a bi-tree partitioning technique, or the like, which may be determined based on the picture type (e.g., I-, P-, or F/B-picture) of individual video frames, a characteristic of the frame portion being partitioned, or the like. In some examples, the determined potential prediction partitionings may be partitions for prediction (e.g., inter- or intra-prediction) and may be described as prediction partitions or prediction blocks or the like.

In some examples, a selected prediction partitioning (e.g., prediction partitions) may be determined from the potential prediction partitionings. For example, the selected prediction partitioning may be based on determining, for each potential prediction partitioning, predictions using characteristics and motion based multi-reference predictions or intra-predictions, and determining prediction parameters. For each potential prediction partitioning, a potential prediction error may be determined by differencing original pixels with prediction pixels and the selected prediction partitioning may be the potential prediction partitioning with the minimum prediction error. In other examples, the selected prediction partitioning may be determined based on a rate distortion optimization including a weighted scoring based on number of bits for coding the partitioning and a prediction error associated with the prediction partitioning.

As shown, the original pixels of the selected prediction partitioning (e.g., prediction partitions of a current frame) may be differenced with predicted partitions (e.g., a prediction of the prediction partition of the current frame based on a reference frame or frames and other predictive data such as inter- or intra-prediction data) at differencer 106. The determination of the predicted partitions will be described further below and may include a decode loop as shown in FIG. 1. Any residuals or residual data (e.g., partition prediction error data) from the differencing may be transmitted to coding partitions generator module 107. In some examples, such as for intra-prediction of prediction partitions in any picture type (I-, F/B- or P-pictures), coding partitions generator module 107 may be bypassed via switches 107a and 107b. In such examples, only a single level of partitioning may be performed. Such partitioning may be described as prediction partitioning (as discussed) or coding partitioning or both. In various examples, such partitioning may be performed via prediction partitions generator module 105 (as discussed) or, as is discussed further herein, such partitioning may be performed via a k-d tree intra-prediction/coding partitioner module or a bi-tree intra-prediction/coding partitioner module implemented via coding partitions generator module 107.

In some examples, the partition prediction error data, if any, may not be significant enough to warrant encoding. In other examples, where it may be desirable to encode the partition prediction error data and the partition prediction error data is associated with inter-prediction or the like, coding partitions generator module 107 may determine coding partitions of the prediction partitions. In some examples, coding partitions generator module 107 may not be needed as the partition may be encoded without coding partitioning (e.g., as shown via the bypass path available via switches 107a and 107b). With or without coding partitioning, the partition prediction error data (which may subsequently be described as coding partitions in either event) may be transmitted to adaptive transform module 108 in the event the residuals or residual data require encoding. In some examples, prediction partitions generator module 105 and coding partitions generator module 107 may together be considered a partitioner subsystem of encoder 100. In various examples, coding partitions generator module 107 may operate on partition prediction error data, original pixel data, residual data, or wavelet data.

Coding partitions generator module 107 may generate potential coding partitionings (e.g., coding partitions) of, for example, partition prediction error data using bi-tree and/or k-d tree partitioning techniques or the like. In some examples, the potential coding partitions may be transformed using adaptive or fixed transforms with various block sizes via adaptive transform module 108 and a selected coding partitioning and selected transforms (e.g., adaptive or fixed) may be determined based on a rate distortion optimization or other basis. In some examples, the selected coding partitioning and/or the selected transform(s) may be determined based on a predetermined selection method based on coding partitions size or the like.

For example, adaptive transform module 108 may include a first portion or component for performing a parametric transform to allow locally optimal transform coding of small to medium size blocks and a second portion or component for performing globally stable, low overhead transform coding using a fixed transform, such as a discrete cosine transform (DCT) or a picture based transform from a variety of transforms, including parametric transforms, or any other configuration as is discussed further herein. In some examples, for locally optimal transform coding a Parametric Haar Transform (PHT) may be performed, as is discussed further herein. In some examples, transforms may be performed on 2D blocks of rectangular sizes between about 4×4 pixels and 64×64 pixels, with actual sizes depending on a number of factors such as whether the transformed data is luma or chroma, or inter or intra, or if the determined transform used is PHT or DCT or the like.

As shown, the resultant transform coefficients may be transmitted to adaptive quantize module 109. Adaptive quantize module 109 may quantize the resultant transform coefficients. Further, any data associated with a parametric transform, as needed, may be transmitted to either adaptive quantize module 109 (if quantization is desired) or adaptive entropy encoder module 110. Also as shown in FIG. 1, the quantized coefficients may be scanned and transmitted to adaptive entropy encoder module 110. Adaptive entropy encoder module 110 may entropy encode the quantized coefficients and include them in output bitstream 111. In some examples, adaptive transform module 108 and adaptive quantize module 109 may together be considered a transform encoder subsystem of encoder 100.

As also shown in FIG. 1, encoder 100 includes a local decode loop. The local decode loop may begin at adaptive inverse quantize module 112. Adaptive inverse quantize module 112 may be configured to perform the opposite operation(s) of adaptive quantize module 109 such that an inverse scan may be performed and quantized coefficients may be de-scaled to determine transform coefficients. Such an adaptive quantize operation may be lossy, for example. As shown, the transform coefficients may be transmitted to an adaptive inverse transform module 113. Adaptive inverse transform module 113 may perform the inverse transform as that performed by adaptive transform module 108, for example, to generate residuals or residual values or partition prediction error data (or original data or wavelet data, as discussed) associated with coding partitions. In some examples, adaptive inverse quantize module 112 and adaptive inverse transform module 113 may together be considered a transform decoder subsystem of encoder 100.

As shown, the partition prediction error data (or the like) may be transmitted to optional coding partitions assembler 114. Coding partitions assembler 114 may assemble coding partitions into decoded prediction partitions as needed (as shown, in some examples, coding partitions assembler 114 may be skipped via switches 114a and 114b such that decoded prediction partitions may have been generated at adaptive inverse transform module 113) to generate prediction partitions of prediction error data or decoded residual prediction partitions or the like.

As shown, the decoded residual prediction partitions may be added to predicted partitions (e.g., prediction pixel data) at adder 115 to generate reconstructed prediction partitions. The reconstructed prediction partitions may be transmitted to prediction partitions assembler 116. Prediction partitions assembler 116 may assemble the reconstructed prediction partitions to generate reconstructed tiles or super-fragments. In some examples, coding partitions assembler module 114 and prediction partitions assembler module 116 may together be considered an un-partitioner subsystem of encoder 100.

The reconstructed tiles or super-fragments may be transmitted to blockiness analyzer and deblock filtering module 117. Blockiness analyzer and deblock filtering module 117 may deblock and dither the reconstructed tiles or super-fragments (or prediction partitions of tiles or super-fragments). The generated deblock and dither filter parameters may be used for the current filter operation and/or coded in output bitstream 111 for use by a decoder, for example. The output of blockiness analyzer and deblock filtering module 117 may be transmitted to a quality analyzer and quality restoration filtering module 118. Quality analyzer and quality restoration filtering module 118 may determine QR filtering parameters (e.g., for a QR decomposition) and use the determined parameters for filtering. The QR filtering parameters may also be coded in output bitstream 111 for use by a decoder. As shown, the output of quality analyzer and quality restoration filtering module 118 may be transmitted to decoded picture buffer 119. In some examples, the output of quality analyzer and quality restoration filtering module 118 may be a final reconstructed frame that may be used for prediction for coding other frames (e.g., the final reconstructed frame may be a reference frame or the like). In some examples, blockiness analyzer and deblock filtering module 117 and quality analyzer and quality restoration filtering module 118 may together be considered a filtering subsystem of encoder 100.

In encoder 100, prediction operations may include inter- and/or intra-prediction. As shown in FIG. 1(a), inter-prediction may be performed by one or more modules including morphing analyzer and morphed picture generation module 120, synthesizing analyzer and generation module 121, and characteristics and motion filtering predictor module 123. Morphing analyzer and morphed picture generation module 120 may analyze a current picture to determine parameters for changes in gain, changes in dominant motion, changes in registration, and changes in blur with respect to a reference frame or frames with which it may be coded. The determined morphing parameters may be quantized/de-quantized and used (e.g., by morphing analyzer and morphed picture generation module 120) to generate morphed reference frames that that may be used by motion estimator module 122 for computing motion vectors for efficient motion (and characteristics) compensated prediction of a current frame. Synthesizing analyzer and generation module 121 may generate super resolution (SR) pictures and projected interpolation (PI) pictures or the like for motion for determining motion vectors for efficient motion compensated prediction in these frames.

Motion estimator module 122 may generate motion vector data based on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion compensated filtering predictor module 123 may apply motion compensation as part of the local decode loop as discussed.

Intra-prediction may be performed by intra-directional prediction analyzer and prediction generation module 124. Intra-directional prediction analyzer and prediction generation module 124 may be configured to perform spatial directional prediction and may use decoded neighboring partitions. In some examples, both the determination of direction and generation of prediction may be performed by intra-directional prediction analyzer and prediction generation module 124. In some examples, intra-directional prediction analyzer and prediction generation module 124 may be considered an intra-prediction module.

As shown in FIG. 1, prediction modes and reference types analyzer module 125 may allow for selection of prediction modes from among, "skip", "auto", "inter", "split", "multi", and "intra", for each prediction partition of a tile (or super-fragment), all of which may apply to P- and F/B-pictures. In addition to prediction modes, it also allows for selection of reference types that can be different depending on "inter" or "multi" mode, as well as for P- and F/B-pictures. The prediction signal at the output of prediction modes and reference types analyzer module 125 may be filtered by prediction analyzer and prediction fusion filtering module 126. Prediction analyzer and prediction fusion filtering module 126 may determine parameters (e.g., filtering coefficients, frequency, overhead) to use for filtering and may perform the filtering. In some examples, filtering the prediction signal may fuse different types of signals representing different modes (e.g., intra, inter, multi, split, skip, and auto). In some examples, intra-prediction signals may be different than all other types of inter-prediction signal(s) such that proper filtering may greatly enhance coding efficiency. In some examples, the filtering parameters may be encoded in output bitstream 111 for use by a decoder. The filtered prediction signal may provide the second input (e.g., prediction partition(s)) to differencer 106, as discussed above, that may determine the prediction difference signal (e.g., partition prediction error) for coding discussed earlier. Further, the same filtered prediction signal may provide the second input to adder 115, also as discussed above. As discussed, output bitstream 111 may provide an efficiently encoded bitstream for use by a decoder for the presentment of video.

FIG. 1 illustrates example control signals associated with operation of video encoder 100, where the following abbreviations may represent the associated information:
scnchg Scene change information
spcpx Spatial complexity information
tpcpx Temporal complexity information
pdist Temporal prediction distance information
pap Pre Analysis parameters (placeholder for all other pre analysis parameters except scnchg, spcpx, tpcpx, pdist)
ptyp Picture types information
pgst Picture group structure information
pptn cand. Prediction partitioning candidates
cptn cand. Coding Partitioning Candidates
prp Preprocessing
xmtyp Transform type information
xmdir Transform direction information
xmmod Transform mode
ethp One eighth (⅛th) pel motion prediction
pptn Prediction Partitioning
cptn Coding Partitioning
mot&cod cost Motion and Coding Cost
qs quantizer information set (includes Quantizer parameter (Qp), Quantizer matrix (QM) choice)
mv Motion vectors
mop Morphing Paramters
syp Synthesizing Parameters
ddi Deblock and dither information
qri Quality Restoration filtering index/information
api Adaptive Precision filtering index/information
fii Fusion Filtering index/information
mod Mode information
reftyp Reference type information
idir Intra Prediction Direction The various signals and data items that may need to be sent to the decoder, e.g., pgst, ptyp, prp, pptn, cptn, modes, reftype, ethp, xmtyp, xmdir, xmmod, idir, my, qs, mop, syp, ddi, qri, api, fii, quant coefficients and others may then be entropy encoded by adaptive entropy encoder 110 that may include different entropy coders collectively referred to as an entropy encoder subsystem. While these control signals are illustrated as being associated with specific example functional modules of encoder 100 in FIG. 1, other implementations may include a different distribution of control signals among the functional modules of encoder 300. The present disclosure is not limited in this regard and, in various examples, implementation of the control signals herein may include the undertaking of only a subset of the specific example control signals shown, additional control signals, and/or in a different arrangement than illustrated.

Figure 2:
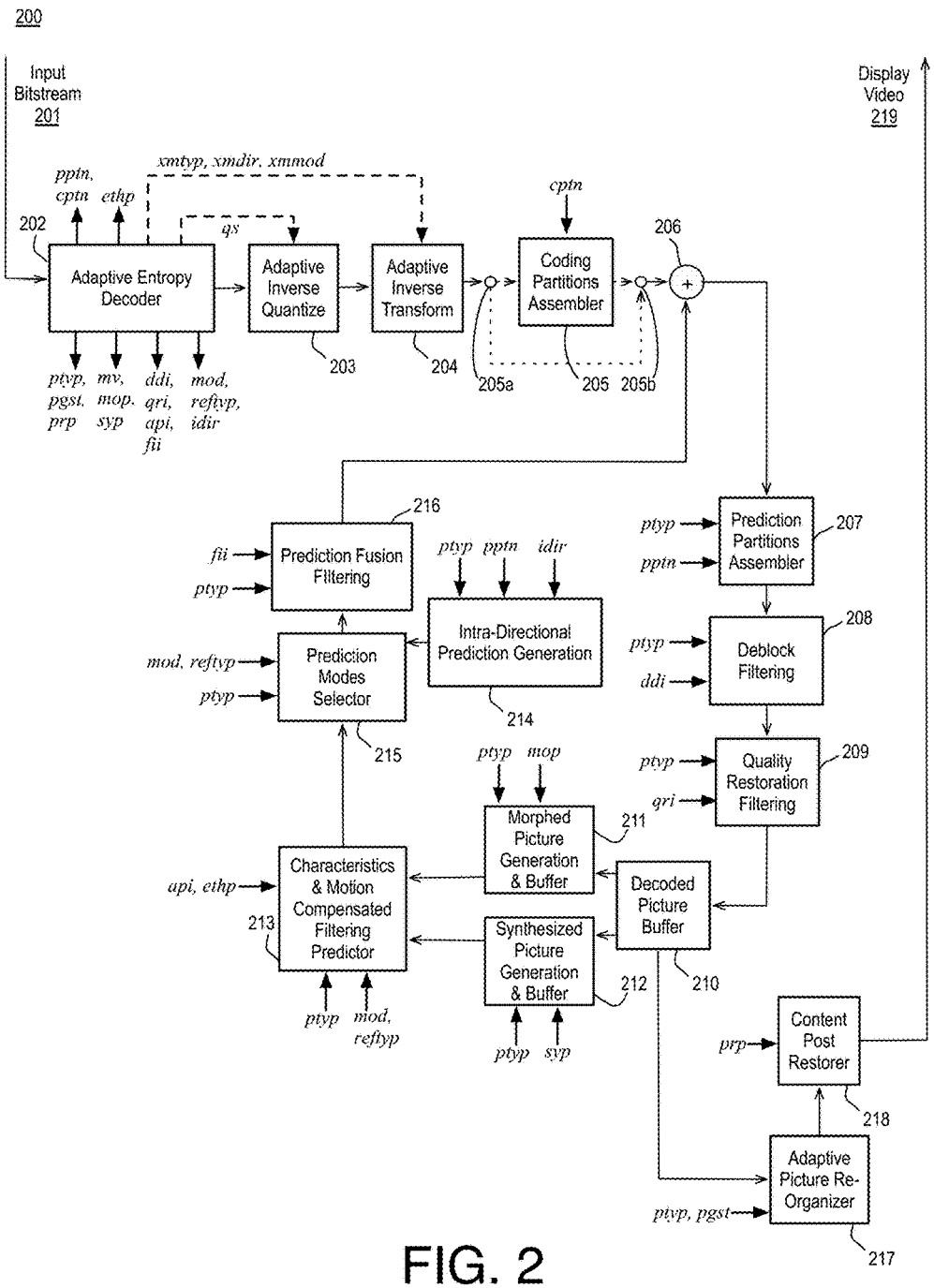
FIG. 2 is an illustrative diagram of an example next generation video decoder.

FIG. 2 is an illustrative diagram of an example next generation video decoder 200, arranged in accordance with at least some implementations of the present disclosure. As shown, decoder 200 may receive an input bitstream 201. In some examples, input bitstream 201 may be encoded via encoder 100 and/or via the encoding techniques discussed herein. As shown, input bitstream 201 may be received by an adaptive entropy decoder module 202. Adaptive entropy decoder module 202 may decode the various types of encoded data (e.g., overhead, motion vectors, transform coefficients, etc.). In some examples, adaptive entropy decoder 202 may use a variable length decoding technique. In some examples, adaptive entropy decoder 202 may perform the inverse operation(s) of adaptive entropy encoder module 110 discussed above.

The decoded data may be transmitted to adaptive inverse quantize module 203. Adaptive inverse quantize module 203 may be configured to inverse scan and de-scale quantized coefficients to determine transform coefficients. Such an adaptive quantize operation may be lossy, for example. In some examples, adaptive inverse quantize module 203 may be configured to perform the opposite operation of adaptive quantize module 109 (e.g., substantially the same operations as adaptive inverse quantize module 112). As shown, the transform coefficients (and, in some examples, transform data for use in a parametric transform) may be transmitted to an adaptive inverse transform module 204. Adaptive inverse transform module 204 may perform an inverse transform on the transform coefficients to generate residuals or residual values or partition prediction error data (or original data or wavelet data) associated with coding partitions. In some examples, adaptive inverse transform module 204 may be configured to perform the opposite operation of adaptive transform module 108 (e.g., substantially the same operations as adaptive inverse transform module 113). In some examples, adaptive inverse transform module 204 may perform an inverse transform based on other previously decoded data, such as, for example, decoded neighboring partitions. In some examples, adaptive inverse quantize module 203 and adaptive inverse transform module 204 may together be considered a transform decoder subsystem of decoder 200.

As shown, the residuals or residual values or partition prediction error data may be transmitted to coding partitions assembler 205. Coding partitions assembler 205 may assemble coding partitions into decoded prediction partitions as needed (as shown, in some examples, coding partitions assembler 205 may be skipped via switches 205a and 205b such that decoded prediction partitions may have been generated at adaptive inverse transform module 204). The decoded prediction partitions of prediction error data (e.g., prediction partition residuals) may be added to predicted partitions (e.g., prediction pixel data) at adder 206 to generate reconstructed prediction partitions. The reconstructed prediction partitions may be transmitted to prediction partitions assembler 207. Prediction partitions assembler 207 may assemble the reconstructed prediction partitions to generate reconstructed tiles or super-fragments. In some examples, coding partitions assembler module 205 and prediction partitions assembler module 207 may together be considered an un-partitioner subsystem of decoder 200.

The reconstructed tiles or super-fragments may be transmitted to deblock filtering module 208. Deblock filtering module 208 may deblock and dither the reconstructed tiles or super-fragments (or prediction partitions of tiles or super-fragments). The generated deblock and dither filter parameters may be determined from input bitstream 201, for example. The output of deblock filtering module 208 may be transmitted to a quality restoration filtering module 209. Quality restoration filtering module 209 may apply quality filtering based on QR parameters, which may be determined from input bitstream 201, for example. As shown in FIG. 2, the output of quality restoration filtering module 209 may be transmitted to decoded picture buffer 210. In some examples, the output of quality restoration filtering module 209 may be a final reconstructed frame that may be used for prediction for coding other frames (e.g., the final reconstructed frame may be a reference frame or the like). In some examples, deblock filtering module 208 and quality restoration filtering module 209 may together be considered a filtering subsystem of decoder 200.

As discussed, compensation due to prediction operations may include inter- and/or intra-prediction compensation. As shown, inter-prediction compensation may be performed by one or more modules including morphing generation module 211, synthesizing generation module 212, and characteristics and motion compensated filtering predictor module 213. Morphing generation module 211 may use de-quantized morphing parameters (e.g., determined from input bitstream 201) to generate morphed reference frames. Synthesizing generation module 212 may generate super resolution (SR) pictures and projected interpolation (PI) pictures or the like based on parameters determined from input bitstream 201. If inter-prediction is applied, characteristics and motion compensated filtering predictor module 213 may apply motion compensation based on the received frames and motion vector data or the like in input bitstream 201.

Intra-prediction compensation may be performed by intra-directional prediction generation module 214. Intra-directional prediction generation module 214 may be configured to perform spatial directional prediction and may use decoded neighboring partitions according to intra-prediction data in input bitstream 201.

As shown in FIG. 2, prediction modes selector module 215 may determine a prediction mode selection from among, "skip", "auto", "inter", "multi", and "intra", for each prediction partition of a tile, all of which may apply to P- and F/B-pictures, based on mode selection data in input bitstream 201. In addition to prediction modes, it also allows for selection of reference types that can be different depending on "inter" or "multi" mode, as well as for P- and F/B-pictures. The prediction signal at the output of prediction modes selector module 215 may be filtered by prediction fusion filtering module 216. Prediction fusion filtering module 216 may perform filtering based on parameters (e.g., filtering coefficients, frequency, overhead) determined via input bitstream 201. In some examples, filtering the prediction signal may fuse different types of signals representing different modes (e.g., intra, inter, multi, skip, and auto). In some examples, intra-prediction signals may be different than all other types of inter-prediction signal(s) such that proper filtering may greatly enhance coding efficiency. The filtered prediction signal may provide the second input (e.g., prediction partition(s)) to differencer 206, as discussed above.

As discussed, the output of quality restoration filtering module 209 may be a final reconstructed frame. Final reconstructed frames may be transmitted to an adaptive picture re-organizer 217, which may re-order or re-organize frames as needed based on ordering parameters in input bitstream 201. Re-ordered frames may be transmitted to content post-restorer module 218. Content post-restorer module 218 may be an optional module configured to perform further improvement of perceptual quality of the decoded video. The improvement processing may be performed in response to quality improvement parameters in input bitstream 201 or it may be performed as standalone operation. In some examples, content post-restorer module 218 may apply parameters to improve quality such as, for example, an estimation of film grain noise or residual blockiness reduction (e.g., even after the deblocking operations discussed with respect to deblock filtering module 208). As shown, decoder 200 may provide display video 219, which may be configured for display via a display device (not shown).

FIG. 2 illustrates example control signals associated with operation of video decoder 200, where the indicated abbreviations may represent similar information as discussed with respect to FIG. 1 above. While these control signals are illustrated as being associated with specific example functional modules of decoder 200 in FIG. 2, other implementations may include a different distribution of control signals among the functional modules of encoder 100. The present disclosure is not limited in this regard and, in various examples, implementation of the control signals herein may include the undertaking of only a subset of the specific example control signals shown, additional control signals, and/or in a different arrangement than illustrated.

While FIGS. 1 through 2 illustrate particular encoding and decoding modules, various other coding modules or components not depicted may also be utilized in accordance with the present disclosure. Further, the present disclosure is not limited to the particular components illustrated in FIGS. 1 and 2 and/or to the manner in which the various components are arranged. Various components of the systems described herein may be implemented in software, firmware, and/or hardware and/or any combination thereof. For example, various components of encoder 100 and/or decoder 200 may be provided, at least in part, by hardware of a computing System-on-a-Chip (SoC) such as may be found in a computing system such as, for example, a mobile phone.

Further, it may be recognized that encoder 100 may be associated with and/or provided by a content provider system including, for example, a video content server system, and that output bitstream 111 may be transmitted or conveyed to decoders such as, for example, decoder 200 by various communications components and/or systems such as transceivers, antennae, network systems, and the like not depicted in FIGS. 1 and 2. It may also be recognized that decoder 200 may be associated with a client system such as a computing device (e.g., a desktop computer, laptop computer, tablet computer, convertible laptop, mobile phone, or the like) that is remote to encoder 100 and that receives input bitstream 201 via various communications components and/or systems such as transceivers, antennae, network systems, and the like not depicted in FIGS. 1 and 2. Therefore, in various implementations, encoder 100 and decoder subsystem 200 may be implemented either together or independent of one another.

Figure 3A:
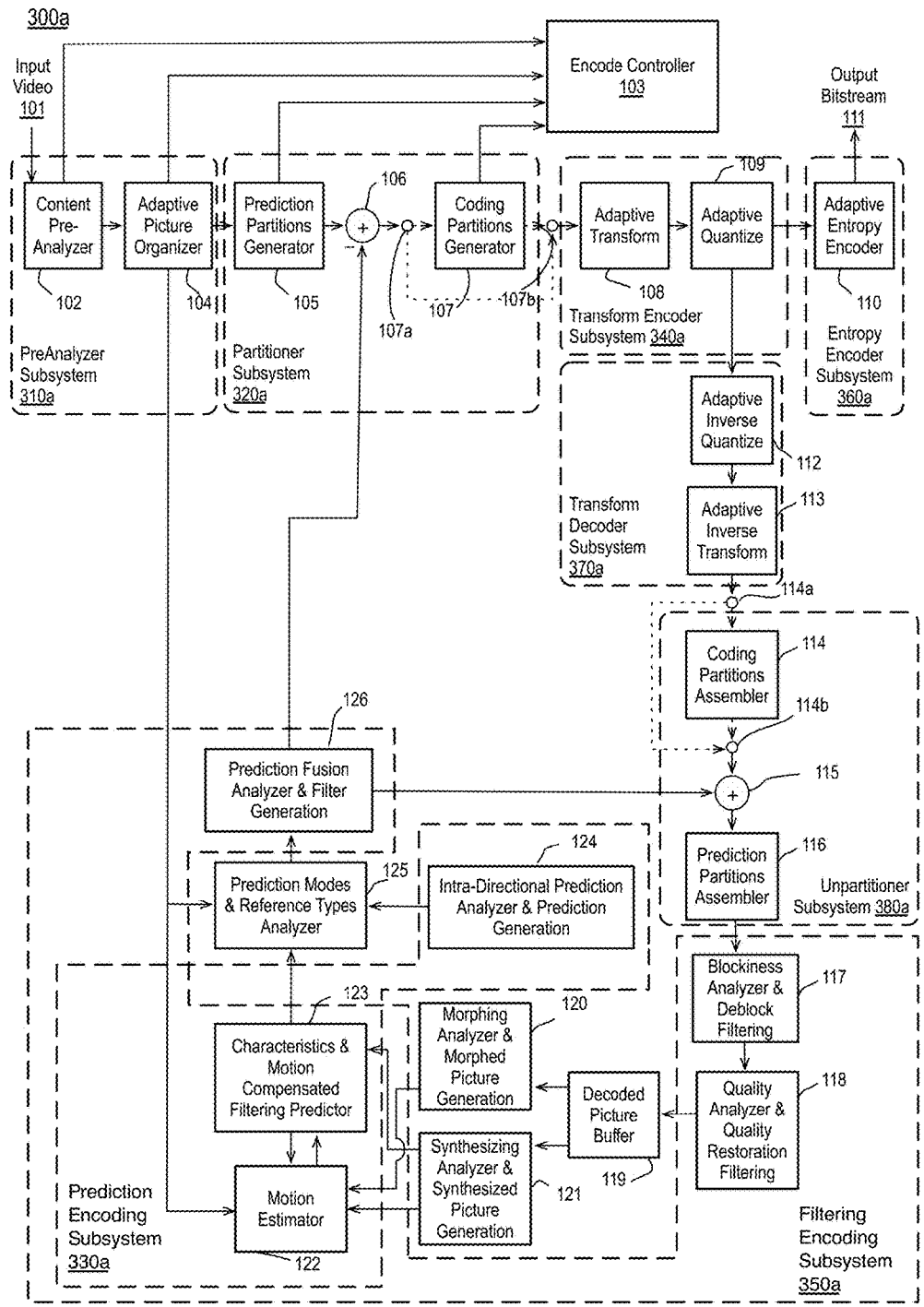
FIG. 3(a) is an illustrative diagram of an example next generation video encoder and subsystems.

FIG. 3(a) is an illustrative diagram of an example next generation video encoder 300a, arranged in accordance with at least some implementations of the present disclosure. FIG. 3(a) presents a similar encoder to that shown in FIGS. 1(a) and 1(b), and similar elements will not be repeated for the sake of brevity. As shown in FIG. 3(a), encoder 300a may include pre-analyzer subsystem 310a, partitioner subsystem 320a, prediction encoding subsystem 330a, transform encoder subsystem 340a, filtering encoding subsystem 350a, entropy encoder system 360a, transform decoder subsystem 370a, and/or unpartioner subsystem 380a. Pre-analyzer subsystem 310a may include content pre-analyzer module 102 and/or adaptive picture organizer module 104. Partitioner subsystem 320a may include prediction partitions generator module 105, and/or coding partitions generator 107. Prediction encoding subsystem 330a may include motion estimator module 122, characteristics and motion compensated filtering predictor module 123, and/or intra-directional prediction analyzer and prediction generation module 124. Transform encoder subsystem 340a may include adaptive transform module 108 and/or adaptive quantize module 109. Filtering encoding subsystem 350a may include blockiness analyzer and deblock filtering module 117, quality analyzer and quality restoration filtering module 118, motion estimator module 122, characteristics and motion compensated filtering predictor module 123, and/or prediction analyzer and prediction fusion filtering module 126. Entropy coding subsystem 360a may include adaptive entropy encoder module 110. Transform decoder subsystem 370a may include adaptive inverse quantize module 112 and/or adaptive inverse transform module 113. Unpartioner subsystem 380a may include coding partitions assembler 114 and/or prediction partitions assembler 116.

Partitioner subsystem 320a of encoder 300a may include two partitioning subsystems: prediction partitions generator module 105 that may perform analysis and partitioning for prediction, and coding partitions generator module 107 that may perform analysis and partitioning for coding. Another partitioning method may include adaptive picture organizer 104 which may segment pictures into regions or slices may also be optionally considered as being part of this partitioner.

Prediction encoder subsystem 330a of encoder 300a may include motion estimator 122 and characteristics and motion compensated filtering predictor 123 that may perform analysis and prediction of "inter" signal, and intra-directional prediction analyzer and prediction generation module 124 that may perform analysis and prediction of "intra" signal. Motion estimator 122 and characteristics and motion compensated filtering predictor 123 may allow for increasing predictability by first compensating for other sources of differences (such as gain, global motion, registration), followed by actual motion compensation. They may also allow for use of data modeling to create synthesized frames (super resolution, and projection) that may allow better predictions, followed by use of actual motion compensation in such frames.

Transform encoder subsystem 340a of encoder 300a may perform analysis to select the type and size of transform and may include two major types of components. The first type of component may allow for using parametric transform to allow locally optimal transform coding of small to medium size blocks; such coding however may require some overhead. The second type of component may allow globally stable, low overhead coding using a generic/fixed transform such as the DCT, or a picture based transform from a choice of small number of transforms including parametric transforms. For locally adaptive transform coding, PHT (Parametric Haar Transform) may be used. Transforms may be performed on 2D blocks of rectangular sizes between 4×4 and 64×64, with actual sizes that may depend on a number of factors such as if the transformed data is luma or chroma, inter or intra, and if the transform used is PHT or DCT. The resulting transform coefficients may be quantized, scanned and entropy coded.

Entropy encoder subsystem 360a of encoder 300a may include a number of efficient but low complexity components each with the goal of efficiently coding a specific type of data (various types of overhead, motion vectors, or transform coefficients). Components of this subsystem may belong to a generic class of low complexity variable length coding techniques, however, for efficient coding, each component may be custom optimized for highest efficiency. For instance, a custom solution may be designed for coding of "Coded/Not Coded" data, another for "Modes and Ref Types" data, yet another for "Motion Vector" data, and yet another one for "Prediction and Coding Partitions" data. Finally, because a very large portion of data to be entropy coded is "transform coefficient" data, multiple approaches for efficient handling of specific block sizes, as well as an algorithm that may adapt between multiple tables may be used.

Filtering encoder subsystem 350a of encoder 300a may perform analysis of parameters as well as multiple filtering of the reconstructed pictures based on these parameters, and may include several subsystems. For example, a first subsystem, blockiness analyzer and deblock filtering module 117 may deblock and dither to reduce or mask any potential block coding artifacts. A second example subsystem, quality analyzer and quality restoration filtering module 118, may perform general quality restoration to reduce the artifacts due to quantization operation in any video coding. A third example subsystem, which may include motion estimator 122 and characteristics and motion compensated filtering predictor module 123, may improve results from motion compensation by using a filter that adapts to the motion characteristics (motion speed/degree of blurriness) of the content. A fourth example subsystem, prediction fusion analyzer and filter generation module 126, may allow adaptive filtering of the prediction signal (which may reduce spurious artifacts in prediction, often from intra prediction) thereby reducing the prediction error which needs to be coded.

Encode controller module 103 of encoder 300a may be responsible for overall video quality under the constraints of given resources and desired encoding speed. For instance, in full RDO (Rate Distortion Optimization) based coding without using any shortcuts, the encoding speed for software encoding may be simply a consequence of computing resources (speed of processor, number of processors, hyper-threading, DDR3 memory etc.) availability. In such case, encode controller module 103 may be input every single combination of prediction partitions and coding partitions and by actual encoding, and the bitrate may be calculated along with reconstructed error for each case and, based on lagrangian optimization equations, the best set of prediction and coding partitions may be sent for each tile of each frame being coded. The full RDO based mode may result in best compression efficiency and may also be the slowest encoding mode. By using content analysis parameters from content preanalyzer module 102 and using them to make RDO simplification (not test all possible cases) or only pass a certain percentage of the blocks through full RDO, quality versus speed tradeoffs may be made allowing speedier encoding. Up to now we have described a variable bitrate (VBR) based encoder operation. Encode controller module 103 may also include a rate controller that can be invoked in case of constant bitrate (CBR) controlled coding.

Lastly, preanalyzer subsystem 310a of encoder 300a may perform analysis of content to compute various types of parameters useful for improving video coding efficiency and speed performance. For instance, it may compute horizontal and vertical gradient information (Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation etc. The parameters generated by preanalyzer subsystem 310a may either be consumed by the encoder or be quantized and communicated to decoder 200.

While subsystems 310a through 380a are illustrated as being associated with specific example functional modules of encoder 300a in FIG. 3(a), other implementations of encoder 300a herein may include a different distribution of the functional modules of encoder 300a among subsystems 310a through 380a. The present disclosure is not limited in this regard and, in various examples, implementation of the example subsystems 310a through 380a herein may include the undertaking of only a subset of the specific example functional modules of encoder 300a shown, additional functional modules, and/or in a different arrangement than illustrated.

Figure 3B:
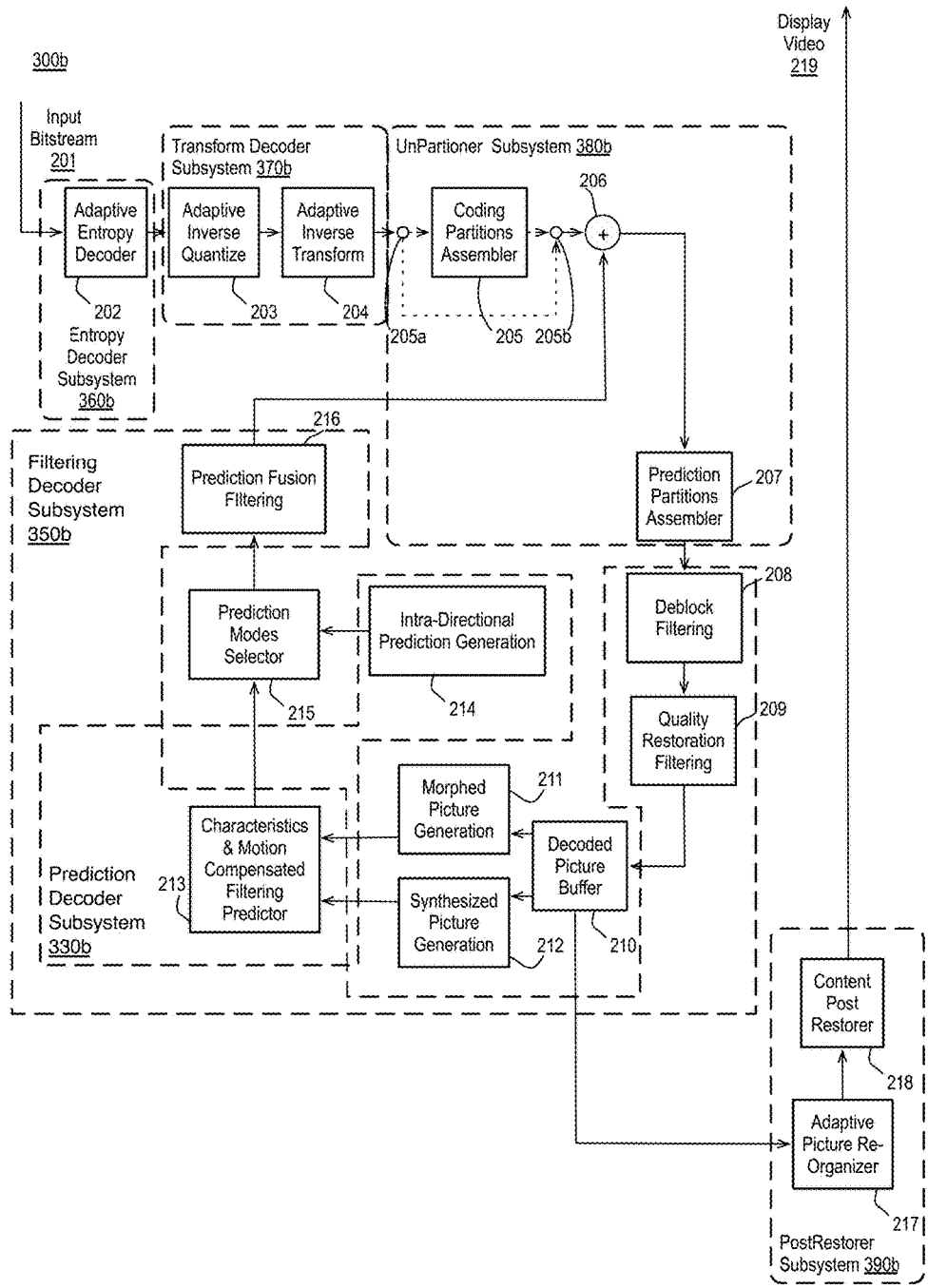
FIG. 3(b) is an illustrative diagram of an example next generation video decoder and subsystems.

FIG. 3(b) is an illustrative diagram of an example next generation video decoder 300b, arranged in accordance with at least some implementations of the present disclosure. FIG. 3(b) presents a similar decoder to that shown in FIG. 2, and similar elements will not be repeated for the sake of brevity. As shown in FIG. 3(b), decoder 300b may include prediction decoder subsystem 330b, filtering decoder subsystem 350b, entropy decoder subsystem 360b, transform decoder subsystem 370b, unpartitioner_2 subsystem 380b, unpartitioner_1 subsystem 351b, filtering decoder subsystem 350b, and/or postrestorer subsystem 390b. Prediction decoder subsystem 330b may include characteristics and motion compensated filtering predictor module 213 and/or intra-directional prediction generation module 214. Filtering decoder subsystem 350b may include deblock filtering module 208, quality restoration filtering module 209, characteristics and motion compensated filtering predictor module 213, and/or prediction fusion filtering module 216. Entropy decoder subsystem 360b may include adaptive entropy decoder module 202. Transform decoder subsystem 370b may include adaptive inverse quantize module 203 and/or adaptive inverse transform module 204. Unpartitioner_2 subsystem 380b may include coding partitions assembler 205. Unpartitioner_1 subsystem 351b may include prediction partitions assembler 207. Postrestorer subsystem 790 may include content post restorer module 218 and/or adaptive picture re-organizer 217.

Entropy decoding subsystem 360b of decoder 300b may perform the inverse operation of the entropy encoder subsystem 360a of encoder 300a, i.e., it may decode various data (types of overhead, motion vectors, transform coefficients) encoded by entropy encoder subsystem 360a using a class of techniques loosely referred to as variable length decoding. Specifically, various types of data to be decoded may include "Coded/Not Coded" data, "Modes and Ref Types" data, "Motion Vector" data, "Prediction and Coding Partitions" data, and "Transform Coefficient" data.

Transform decoder subsystem 370b of decoder 300b may perform inverse operation to that of transform encoder subsystem 340a of encoder 300a. Transform decoder subsystem 370b may include two types of components. The first type of example component may support use of the parametric inverse PHT transform of small to medium block sizes, while the other type of example component may support inverse DCT transform for all block sizes. The PHT transform used for a block may depend on analysis of decoded data of the neighboring blocks. Output bitstream 111 and/or input bitstream 201 may carry information about partition/block sizes for PHT transform as well as in which direction of the 2D block to be inverse transformed the PHT may be used (the other direction uses DCT). For blocks coded purely by DCT, the partition/block sizes information may be also retrieved from output bitstream 111 and/or input bitstream 201 and used to apply inverse DCT of appropriate size.

Unpartitioner subsystem 380b of decoder 300b may perform inverse operation to that of partitioner subsystem 320a of encoder 300a and may include two unpartitioning subsystems, coding partitions assembler module 205 that may perform unpartitioning of coded data and prediction partitions assembler module 207 that may perform unpartitioning for prediction. Further if optional adaptive picture organizer module 104 is used at encoder 300a for region segmentation or slices, adaptive picture re-organizer module 217 may be needed at the decoder.

Prediction decoder subsystem 330b of decoder 300b may include characteristics and motion compensated filtering predictor module 213 that may perform prediction of "inter" signal and intra-directional prediction generation module 214 that may perform prediction of "intra" signal. Characteristics and motion compensated filtering predictor module 213 may allow for increasing predictability by first compensating for other sources of differences (such as gain, global motion, registration) or creation of synthesized frames (super resolution, and projection), followed by actual motion compensation.

Filtering decoder subsystem 350b of decoder 300b may perform multiple filtering of the reconstructed pictures based on parameters sent by encoder 300a and may include several subsystems. The first example subsystem, deblock filtering module 208, may deblock and dither to reduce or mask any potential block coding artifacts. The second example subsystem, quality restoration filtering module 209, may perform general quality restoration to reduce the artifacts due to quantization operation in any video coding. The third example subsystem, characteristics and motion compensated filtering predictor module 213, may improve results from motion compensation by using a filter that may adapt to the motion characteristics (motion speed/degree of blurriness) of the content. The fourth example subsystem, prediction fusion filtering module 216, may allow adaptive filtering of the prediction signal (which may reduce spurious artifacts in prediction, often from intra prediction) thereby reducing the prediction error which may need to be coded.

Postrestorer subsystem 390b of decoder 300b is an optional block that may perform further improvement of perceptual quality of decoded video. This processing can be done either in response to quality improvement parameters sent by encoder 100, or it can be standalone decision made at the postrestorer subsystem 390b. In terms of specific parameters computed at encoder 100 that can be used to improve quality at postrestorer subsystem 390b may be estimation of film grain noise and residual blockiness at encoder 100 (even after deblocking). As regards the film grain noise, if parameters can be computed and sent via output bitstream 111 and/or input bitstream 201 to decoder 200, then these parameters may be used to synthesize the film grain noise. Likewise, for any residual blocking artifacts at encoder 100, if they can be measured and parameters sent via output bitstream 111 and/or bitstream 201, postrestorer subsystem 390b may decode these parameters and may use them to optionally perform additional deblocking prior to display. In addition, encoder 100 also may have access to scene change, spatial complexity, temporal complexity, motion range, and prediction distance information that may help in quality restoration in postrestorer subsystem 390b.

While subsystems 330b through 390b are illustrated as being associated with specific example functional modules of decoder 300b in FIG. 3(b), other implementations of decoder 300b herein may include a different distribution of the functional modules of decoder 300b among subsystems 330b through 390b. The present disclosure is not limited in this regard and, in various examples, implementation of the example subsystems 330b through 390b herein may include the undertaking of only a subset of the specific example functional modules of decoder 300b shown, additional functional modules, and/or in a different arrangement than illustrated.

Figure 4:
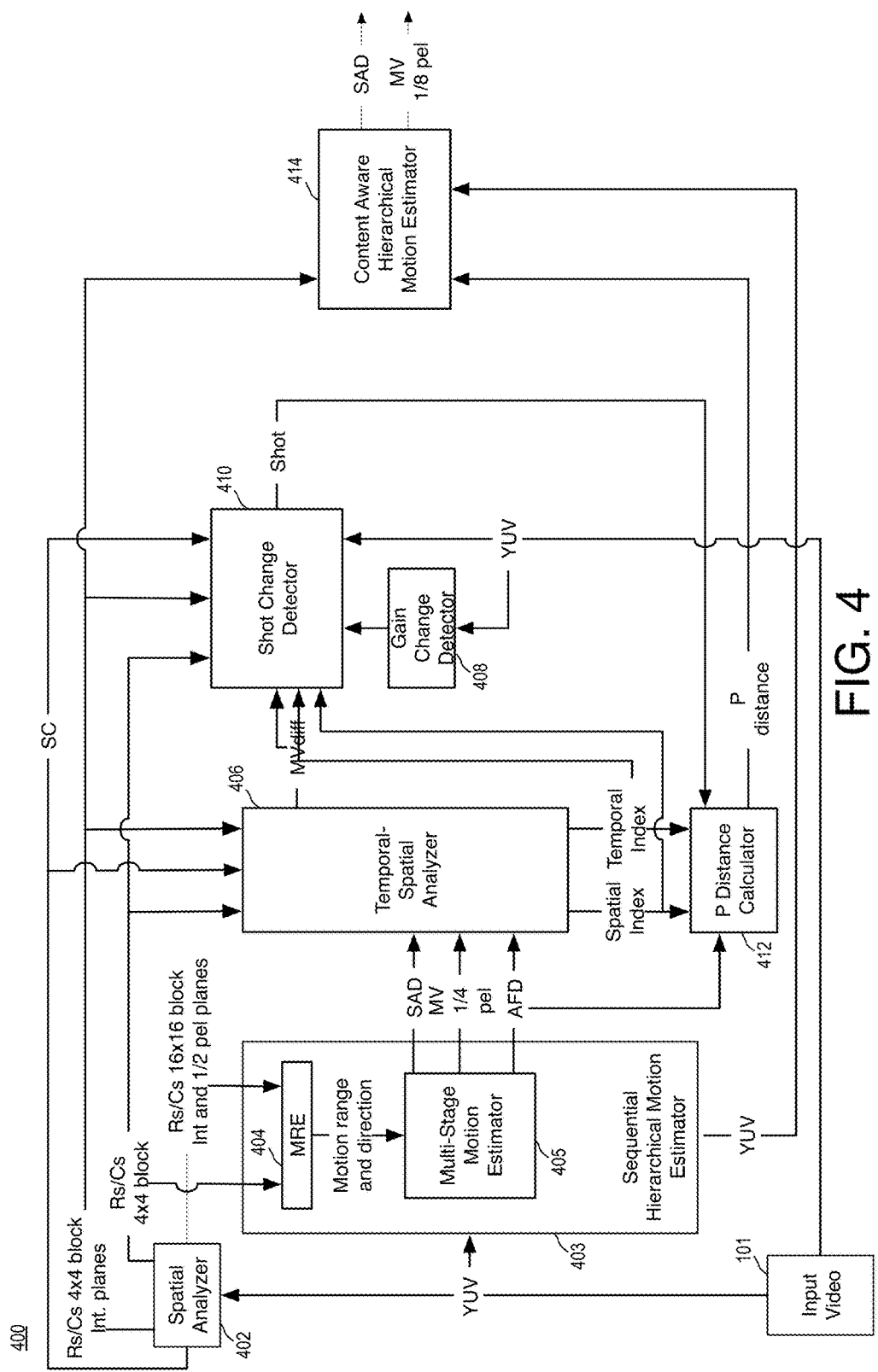
FIG. 4 is an illustrative diagram of an example content pre-analyzer subsystem.

FIG. 4 is an illustrative diagram of an example content pre-analyzer subsystem 400 for performing content adaptive prediction distance analysis and motion estimation, arranged in accordance with at least some implementations of the present disclosure. Encoder subsystem 400 may receive input video 101 and include spatial analyzer module 402, sequential hierarchical motion estimator module 403 (including motion range estimator 404 and/or multistage motion estimator 405), temporal-spatial analyzer module 406, gain change detector module 408, shot change detector module 410, p distance calculator module 412, and/or content aware hierarchical motion estimator module 414.

In the illustrated implementation, spatial analyzer module 402 may receive input video 101 (e.g., luma and chroma (YUV) data). Spatial analyzer module 402 may operate to generate texture pictures and measurements of complexity characteristics. For each texture direction (e.g., horizontal and vertical) 4 different images are generated, each picture represents a different phase, each phase represent an increase of motion accuracy, going from 16 pixels, to 8 pixel accuracy. As used herein, the term "Rs/Cs domain data" may refer to one or more phases that including horizontal and vertical texture direction data generated from input video. For example, such Rs/Cs domain data may include spatial complexity data (e.g., SC data), a plurality of low resolution row sum and column sum planes corresponding with individual integer positions (e.g., RsCs 4×4 blocks), a plurality of low resolution row sum and column sum planes corresponding with individual integer positions (e.g., RsCs 4×4 block Int. planes data), and/or (e.g, Rs/Cs 16/16 block Int. and ½ pel planes).

In the illustrated implementation, sequential hierarchical motion estimator module 403 (including motion range estimator 404 and/or multistage motion estimator 405) may receive input video 101 (e.g., luma and chroma (YUV) data) as well as output from spatial analyzer module 402 (e.g., Rs/Cs domain data). Sequential hierarchical motion estimator module 403 may operate via motion range estimator module 404 (MRE) to compute the range and direction of motion. By estimating the range and direction information from content itself, the total amount of computations needed for motion estimation can be substantially reduced in case motion estimation search is performed with a large default range, or motion compensation quality can be improved by extending the default range for specific sequence as needed if it has been chosen to be too small. Sequential hierarchical motion estimator module 403 may operate via multistage motion estimator 405 as a block based motion estimator that uses hierarchical picture representation to accurately be able to compute motion estimates even when motion is fast. Low to medium resolution may allow large uniform motion to be easily detected while medium to high resolution allows detection of detailed individual motion in complex motion sequences.

In the illustrated implementation, temporal-spatial analyzer module 406 may receive output from sequential hierarchical motion estimator module 403 (e.g., sum of absolute differences (SAD), motion vector at ¼ pel accuracy (MV ¼ pel), average frame difference (e.g., AFD)). Temporal-spatial analyzer module 406 may collect the MV information generated by sequential hierarchical motion estimator 403 on consecutive frames and deliver a measure of how much correlation is present between motion vectors from consecutive frames, and also deliver the indexed value for texture complexity (e.g., Spatial Index) and motion complexity (e.g., Temporal Index) for use by shot change detector module 410 and P distance analyzer 412.

In the illustrated implementation, gain change detector module 408 may receive input video 101 (e.g., luma and chroma (YUV) data). Gain change detector module 408 may determine when two consecutive frames belong to different cameras, when that happens the correlation level between those two pictures is very low and using one as a reference for the other reduces the coding efficiency.

In the illustrated implementation, shot change detector module 410 may receive input video 101 (e.g., luma and chroma (YUV) data), as well as output from spatial analyzer module 402 (e.g., Rs/Cs domain data), temporal-spatial analyzer module 406 (e.g., spatial index and/or temporal index), and/or gain change detector module 408. Shot change detector module 410 may may allow for detection of sudden change in brightness such as by camera flashes or other reasons that may impact individual pictures and makes them less suitable as references for good prediction. If so desired, such pictures can be isolated from pictures that are used as prediction references.

In the illustrated implementation, p distance calculator module 412 may receive output from sequential hierarchical motion estimator module 403 (e.g., average frame difference (AFD)), temporal-spatial analyzer module 406 (e.g., spatial index and/or temporal index), and shot change detector module 410 (e.g., shot change indication). P distance calculator module 412 may include a loop that goes through a whole sequence, frame by frame extracting texture, motion and frame difference information. P distance calculator module 412 may generate the intermediate data needed for motion estimation process of content aware hierarchical motion estimator module 414. In efficient video coding, automatic scene dependent calculation of prediction distance (pdist) between reference frames that amounts to calculating how many B-frames to insert between every pair of reference frames (typically I or P, except in pyramid picture structures, where reference frames can be of I-, P- or even B-frame), can provide compression benefits. This is so because as explained earlier, adaptively increasing number of B-frames (or F-pictures) can provide compression gains due to their high compressibility.

In the illustrated implementation, content aware hierarchical motion estimator module 414 may receive may receive input video 101 (e.g., luma and chroma (YUV) data), as well as output from spatial analyzer module 402 (e.g., Rs/Cs domain data), and/or p distance calculator module 412 (e.g., p-distance data). Content aware hierarchical motion estimator module 414 may compute motion vectors for efficient motion compensated prediction via prediction encoding subsystem 330a (see, e.g., FIG. 3(a)).

Referring to both FIGS. 1 and 4, in operation, video to be compressed may be input to Content PreAnalyzer 102 (such as, for example, Content PreAnalyzer 400) and then to Adaptive Picture Structure Organizer 104. Content PreAnalyzer 102 (such as, for example, Content PreAnalyzer 400) may perform analysis of the scene being coded, providing at its output, information about scene changes (scnchg), temporal complexity (tpcpx), spatial complexity (spcpx), temporal prediction distance (pdist), and others. Further, the original video frames at the output of Content PreAnalyzer 102 (such as, for example, Content PreAnalyzer 400) may be input to Adaptive Picture Structure Organizer 104, which may output control signals indicating picture group structure (pgst), and accordingly picture types (ptyp) of each picture in the group, as well as reordered pictures in encoding order as needed. For reference NGV encoding uses 3 picture types, I- (intra), P- (predictive), and F- (functional) pictures. F-pictures may be non-causal and require reordering of frames for encoding at the encoder (and display at the decoder).

A frame to be coded may be divided into processing units called tiles. Two tile sizes, 32×32, and 64×64, with 64×64 size used for all standard definition and higher size video for coding of all picture types (I-, P-, or F-) and for coding of I- and F-pictures of all sizes, while 32×32 size may be used for P-pictures of lower resolution sequences, may be utilized.

If a picture being coded may be an I-picture, every tile may be further divided in Prediction Partitions Generator 105 into KdTree based partitions that can divide a space (till smallest size may be reached) in one dimension at a time, into either no further division, division into two equal halves, division into two parts ¼ and ¾ of the space, or division into two parts that may be ¾ and ¼ of the space. So, with I-pictures using 64×64 as the largest size (and allowing smallest size of 4×4), a very large number of partitionings of a tile can be generated if no other constraints may be imposed. For example, a constraint that can be placed on 64×64 tile may be that the first pair of cuts may be already pre-decided to halve the space in each dimension. This amounts to starting with a 64×64 and dividing it into 32×32 size subtiles and then subpartitioning each 32×32 by KdTree partitioning; other restrictions may be also possible to reduce number of combinations. These partitions of an I-picture tile may be referred to as prediction partitions, as each tile partitioning may be used for spatial prediction (directional angular prediction or other types of prediction) and coding of prediction differences. Likewise P-picture tiles can also be partitioned in this manner for prediction. A caveat in case of P-pictures may be that for lower resolutions, P-picture partitions start with 32×32 tile and KdTree based partitions may be not used, but rather a simpler B-Tree partitioning may be used. Bi-Tree partitioning divides a space into 2 equal parts only, one dimension at a time, alternating between the two dimensions.

Further P-picture partitions may be mainly predicted using motion (with one or more references) rather than spatial prediction, although some subpartitions can use intra spatial prediction may be also supported to deal with, for instance, uncovered background. For standard definition to higher picture sizes, P-pictures start with 64×64 tile sizes only. Finally, F-pictures also use Bi-Tree partitioning use 64×64 tile sizes for generating prediction partitions that mainly use motion (with one or more partitions), although some subpartitions can also use spatial prediction (for intra coding). In NGV coding, there may be much more to generation of inter prediction than simply using motion vectors to generate prediction and may be discussed elsewhere. In P- and F-picture coding, each sub-partition's prediction may be identified by including a prediction mode (skip, auto, inter, multi, and intra). The output of Prediction Partitions Generator 105 may be literally hundreds of potential partitionings (more or less depending on limits placed) of a tile. These partitionings may be indexed as 1 . . . m and may be provided to Encode Controller 103 to select the best possible prediction partitioning.

The partitioned original blocks may be differenced with prediction blocks (the details of generation of prediction blocks may be discussed later), by, for example, difference 106, to determine if there may be any residual signal worth encoding. Thus not all subpartitions of a tile actually need to be coded (using transform coding) as prediction may have been sufficient for certain subpartitions.

The partitions that can't be compensated by prediction alone require further subpartitioning into smaller partitions for transform coding. For P- and F-pictures, this subpartitioning for coding may be accomplished using Coding Partitions Generator 107 that uses Bi-tree partitioning for coding of prediction difference partitions that require further division, others can simply be coded by motion compensation. In P- or F-pictures, only in some cases (very simple content and/or large quantizer step sizes), the coding partitions may equal the size of the entire tile, the same size used by prediction partitions in these cases. Thus, some P- and F-picture tile may contain no coding partitioning, one coding partitioning, or multiple coding partitionings. These partitionings may be indexed as 1 . . . n and may be provided to Encode Controller 103 to select the best possible combination of prediction and coding partitioning from given choices. As regards I-picture tiles, there may be only prediction partitioning followed by actual transform coding with no further coding partitioning per se, or in other words coding partitioning may be skipped.

The next two blocks (Adaptive Transform 108, and Adaptive Quantize 109) and portion of Encode Controller 103 that perform Quantizer Adaptation were collectively referred to in FIG. 3(a) as Transform Encoder Subsystem 340a, and may be described next.

The partitioning (after prediction partitions for I-pictures, and coding partitions for P- and F-pictures) undergo transform coding in Adaptive Transform 108 unit that performs either forward hybrid PHT transform or forward DCT Transform on rectangular blocks. For HPHT transform, small to medium block sizes may be supported while for DCT transform a large number of block sizes may be supported. The choice of partition/block size, as well as the transform (HPHT vs DCT) employed may be dependent on results of RDO analysis. For HPHT transform some overhead may be needed to identify the direction, either horizontal or vertical in which DCT may be applied while the PHT may be applied in the orthogonal direction, as well as the mode (at least for intra coding where mode can be based on decoded pixels or prediction difference pixels). The actual PHT transform basis used for transforming a particular block may be content adaptive as it depends on decoded neighboring pixels. Since both encoder and decoder require calculation of the same basis matrix, the complexity of calculation may be kept low by allowing a limited number of good transforms known (to both encoder and decoder) that one can select from. As regards the Quantizer Adapter in Encode Controller 103, it performs analysis of content to come up with locally adaptive quantization parameters that may be then represented by a multi-level map that can be efficiently coded and included in the bitstream. The computed quantizer set (qs, and a matrix applied to coefficient block) may be used by Adaptive Quantize 109 unit to perform scaling of coefficients.

The various signals and data items that need to be sent to the decoder, ie, pgst, ptyp, prp, pptn, cptn, modes, reftype, ethp, xmtyp, xmdir, xmmod, idir, my, qs, mop, syp, ddi, qri, api, fii, quant coefficients and others may be then entropy encoded by Content and Context Adaptive Entropy Encoder 110 that in fact includes 7 different entropy coders collectively referred to as Entropy Encoder in FIG. 1.

The encoder of FIG. 1 includes a local decoding loop in the encoder. An important observation needs to be made however that depending on how RDO may be operating, not all of hundreds or more partitionings of a tile may need to be fully coded (sometimes lookup of bitcounts may be sufficient). After the best partitioning of a tile may be however determined, certainly in that case fullcoding may be necessary. The first two units in the decoding loop may be Adaptive Inverse Quantize 112, and Adaptive Inverse Transform 113 (collectively referred to as Transform Decoder Subsystem 370a). The operation of Adaptive Inverse Quantize 112 may be opposite of Adaptive Quantizer 109 unit and basically it unscales the scaled transform coefficients (a lossy process). Further Adaptive Inverse Transform 113 inverts the dequantized transform coefficient blocks to generate blocks of reconstructed prediction difference pixels. For P- and F-pictures, the decoded pixel difference blocks may be re-assembled by Coding Partitions Assembler 114 in the right order. For I-picture tile partitionings, the coding partitions re-assembly process may be skipped. Next in the local decoding loop in the encoder, the prediction signal (inter or intra) may be added to decoded partitions, using the adder 115, and the reconstructed partitions at the output of adder may be assembled by Prediction Partitions Assembler 116.

Next set of steps involve filtering, and intermingling of filtering and prediction generation. Specifically the reconstructed partitions may be deblocked and dithered by Recon Blockiness Analyzer & DD Filt Gen 117; the parameters for analysis ddi may be used for filtering operation and may be also coded and sent to the decoder via the bitstream. The deblocked recon output may be then handed over to quality improvement filter referred to here as Recon Quality Analyzer & QR Filt Gen 118, which computes QR filtering parameters and uses them for filtering. These parameters may be also coded and sent via the bitstream to the decoder. The QR filtered output may be the final reconstructed frame that may be also used as a prediction for coding future frames.

The prediction process includes two main type of prediction: inter prediction, and intra prediction. Inter prediction in FIG. 1 corresponds to a collection of components such as Char and Motion AP Filter Analyzer & ¼ & ⅛ pel Compensated Predictor, Motion Estimator 4×4 Blocks to ¼ & ⅛ pel Acc 122, Morph Gen & Loc Buf, Synth Gen & Pic Buf, Morph Analyzer & Gen 120, and Synth Analyzer & Gen 121. NGV Codec employs several types of Morphing to generate local buffers/prediction pictures that allow compensation for Gain, Dominant Motion, Registration, Blur prior to motion compensated prediction, as well as several types of synthesized frames (SR (Super Resolution) Pictures, PI (Projected Interpolation) pictures among others) in which motion compensated prediction can result in even higher gains. Morph Analyzer & Gen 120 performs the task of analysis of current picture by computing parameters for changes in gain, changes in dominant motion, changes in registration, and changes in blur with respect to reference frame with which it may be to be coded. The computed mop parameters may be quantized/dequantized and used to generate morphed reference frames that may be used by the motion estimator for computing motion vectors for efficient motion (and characteristics) compensated prediction of current frame. Likewise, Synth Analyzer and Gen 121 performs the task of analysis for generating SR pictures and PI pictures for motion for use by the motion estimator for computing motion vectors for efficient motion compensated prediction in these frames. The details of specific morphing algorithms to compute gain, dominant motion, registration and blur may be outside of the scope of this discussion. Likewise, details of specific techniques for generation of synthesized pictures such as DMC and PI may be outside of the scope of current discussion, while the generation of SR may be the topic of this disclosure and will be discussed in detail a little later.

The intra prediction may be performed via spatial directional prediction and uses decoded neighboring partitions, and since here both the analysis of direction and actual generation of prediction takes place it may be referred to here as Intra Directional Pred Analyzer & Pred Gen 124.

The Prediction Modes and Reference Types Analyzer 125 allows for selection of prediction modes from among, "skip", "auto", "inter", "multi", and "inter", for each partition of tile, all of which apply to P- and F-pictures; this may be shown in Table 11. In addition to prediction modes, it also allows for selection of reference types that can be different depending on "inter" or "multi" mode, as well as for P- and F-pictures; the detailed list of ref types may be shown in Tables 2(a) and 2(b) for P-pictures, and Tables 3(a), 3(b), 3(c), and 3(d) for F-pictures.

TABLE 11

Prediction modes for Partitions of a Tile in P- and F- pictures

| No. | Prediction mode |
|---|---|
| 0. | Intra |
| 1. | Skip |
| 2. | Split |
| 3. | Auto |
| 4. | Inter |
| 5. | Multi |

TABLE 12(a)

Ref Types for Partitions of Tile that have "inter" mode in P-pictures

| No. | Ref Types for partitions with "inter" mode |
|---|---|
| 0. | MR0n (=past SR0) |
| 1. | MR1n |
| 2. | MR2n |
| 3. | MR3n |
| 4. | MR5n (past SR1) |
| 5. | MR6n (past SR2) |
| 6. | MR7n (past SR3) |
| 7. | MR0d |
| 8. | MR0g |

TABLE 12(b)

Ref Types for Partitions of Tile that have "multi" mode in P-pictures

| No. | Ref Types for partitions with "multi" mode (first Ref Past none, second Ref:) |
|---|---|
| 0. | MR1n |
| 1. | MR2n |
| 2. | MR3n |

TABLE 13(a)

Ref Types for Partitions of Tile that have "inter" mode in F-pictures

| No. | Ref Types for partitions with "inter" mode |
|---|---|
| 0. | MR0n |
| 1. | MR7n (=proj F) |
| 2. | MR3n (=future SR0) |

TABLE 13(a)-continued

Ref Types for Partitions of Tile that have "inter" mode in F-pictures

| No. | Ref Types for partitions with "inter" mode |
|---|---|
| 3. | MR1n |
| 4. | MR4n (=Future SR1) |
| 5. | MR5n (=Future SR2) |
| 6. | MR6n (=Future SR3) |
| 7. | MR0d |
| 8. | MR3d |
| 9. | MR0g/MR3g |

TABLE 13(b)

Ref Types for Partitions of Tile that have "multi" mode and Dir 0 in F-pictures

| No. | Ref Types for partitions with "multi" mode and Dir 0 (first Ref Past-none, second Ref:) |
|---|---|
| 0. | MR3n (=future SR0) |
| 1. | MR1n |
| 2. | MR4n (=Future SR1) |
| 3. | MR5n (=Future SR2) |
| 4. | MR6n (=Future SR3) |
| 5. | MR7n (=proj F) |
| 6. | MR3d |
| 7. | MR3g |

TABLE 13(c)

Ref Types for Partitions of Tile that have "multi" mode and Dir 1 in F-pictures

| No. | Ref Types for partitions with "multi" mode and Dir 1 (first Ref MR0n, second Ref:) |
|---|---|
| 0. | MR7n (=proj F) |

TABLE 13(d)

Ref Types for Partitions of Tile that have "multi" mode and Dir 2 in F-pictures

| No. | Ref Types for partitions with Multi-mode and Dir 2 (first Ref MR3n, second Ref:) |
|---|---|
| 0. | MR7n (=proj F) |

The prediction signal at the output of Pred Modes & Ref Types Analyzer & Selector 125 can be filtered by the unit Pred Fusion Analyzer and FI Filt Gen 126 that first analyzes to determine parameters (filtering coefficients, frequency, overhead) to use for this filtering and then actually performs this filtering. The purpose of filtering the prediction signal may be to fuse different types of signal representing different modes, ie, intra, inter, multi, skip, and auto. Since typically, intra prediction signal looks very different than all other types of inter signal/s, properly filtering can be a big contributor to coding efficiency. The filtering parameters, fii, may be encoded in the bitstream 111 for use by the decoder. The filtered prediction forms the second input to the difference 115 that computes the prediction difference signal for coding discussed earlier. Also, the same filtered prediction signal forms a second input to the adder 106, the first input of which may be quantized/dequantized decoded difference signal.

Finally the Context and Content Adaptive Entropy Encoder 110 may be used to encode various types of control data/signals, parameters, modes and ref types, motion vectors, and transform coefficients. It may be based on a generic class of low complexity entropy coders called adaptive variable length coders (vlc). The data to be entropy coded may be divided in to several categories (7 in our case), and starting from generic vlc coders, specialized coders may be developed for each category. This concludes the description of NGV Video Encoder.

Figure 5:
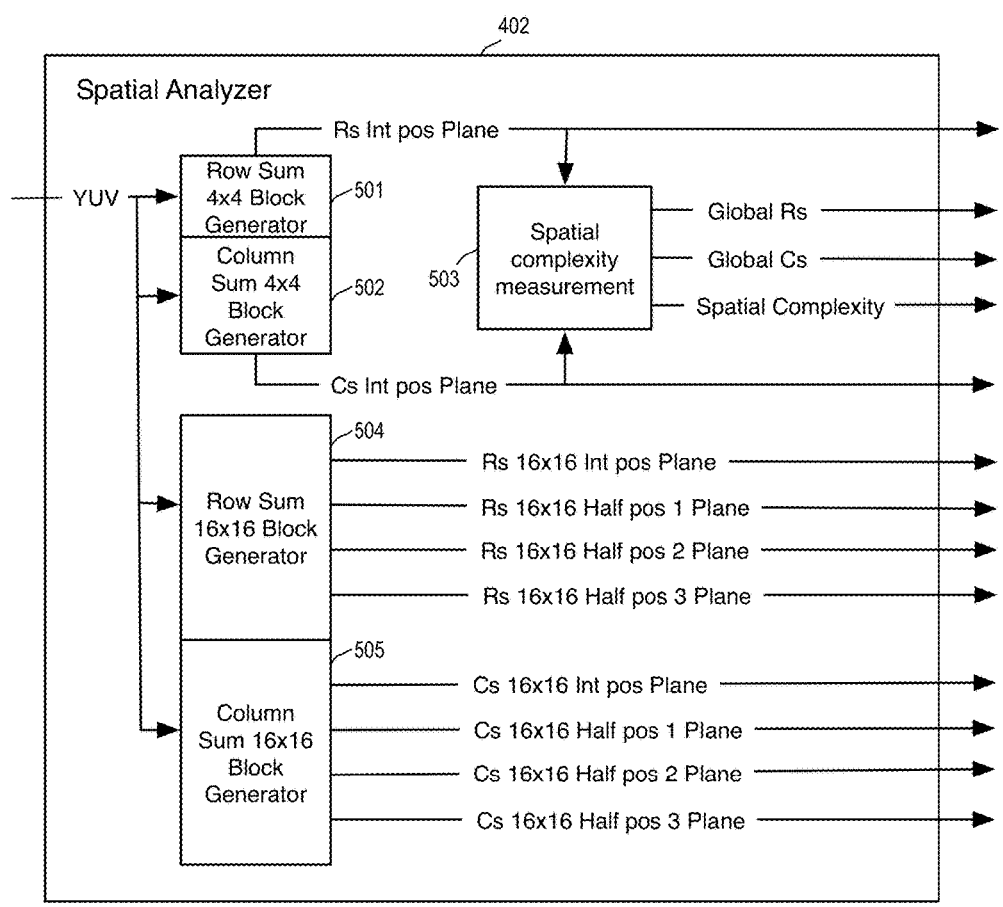
FIG. 5 is an illustrative diagram of an example spatial analyzer module.

FIG. 5 is an illustrative diagram of an example spatial analyzer module 402 for performing spatial analysis, arranged in accordance with at least some implementations of the present disclosure. As shown, spatial analyzer module 402 may include row sum 4×4 block generator module 501, column sum 4×4 block generator module 502, row sum 16×16 block generator module 504, column sum 16×61 block generator module 505, and/or spatial complexity measurement module 503.

In some implementations, spatial analyzer module 402 may operate to generate texture pictures and measurements of complexity characteristics. For each texture direction (e.g., horizontal and vertical) 4 different images are generated, each picture represents a different phase, each phase represent an increase of motion accuracy, going from 16 pixels, to 8 pixel accuracy.

As discussed above, Rs/Cs domain data may refer to one or more phases that including horizontal and vertical texture direction data generated from input video. For example, such Rs/Cs domain data may include spatial complexity data (e.g., SC data), global row sum and column sum data (e.g., RsCs 4×4 blocks), a plurality of low resolution row sum and column sum planes corresponding with individual integer positions (e.g., RsCs 4×4 block Int. planes data), and/or (e.g, Rs/Cs 16/16 block Int. and ½ pel planes).

For example, row sum 4×4 block generator module 501 may generate row sum planes corresponding with individual integer positions (e.g., Rs Int pos Plane, for example, Rs 4×4 blocks). Column sum 4×4 block generator module 502 may generate column sum planes corresponding with individual integer positions (e.g., Cs Int pos Plane, for example, Cs 4×4 blocks). Spatial complexity measurement module 503 may generate spatial complexity data (e.g., SC data). Row sum 4×4 block generator module 501 may generate global row sum (e.g., global Rs). Column sum 4×4 block generator module 502 may generate global column sum data (e.g., global Cs). Row sum 16×16 block generator module 504 may generate a plurality of low resolution row sum planes corresponding with individual integer positions (e.g., RsCs 4×4 block Int. planes data), and/or (e.g, Rs/Cs 16/16 block Int. and ½ pel planes). Column sum 16×61 block generator module 505 may generate a plurality of low resolution column sum planes corresponding with individual integer positions (e.g., RsCs 4×4 block Int. planes data), and/or (e.g, Rs/Cs 16/16 block Int. and ½ pel planes).

Figure 6:
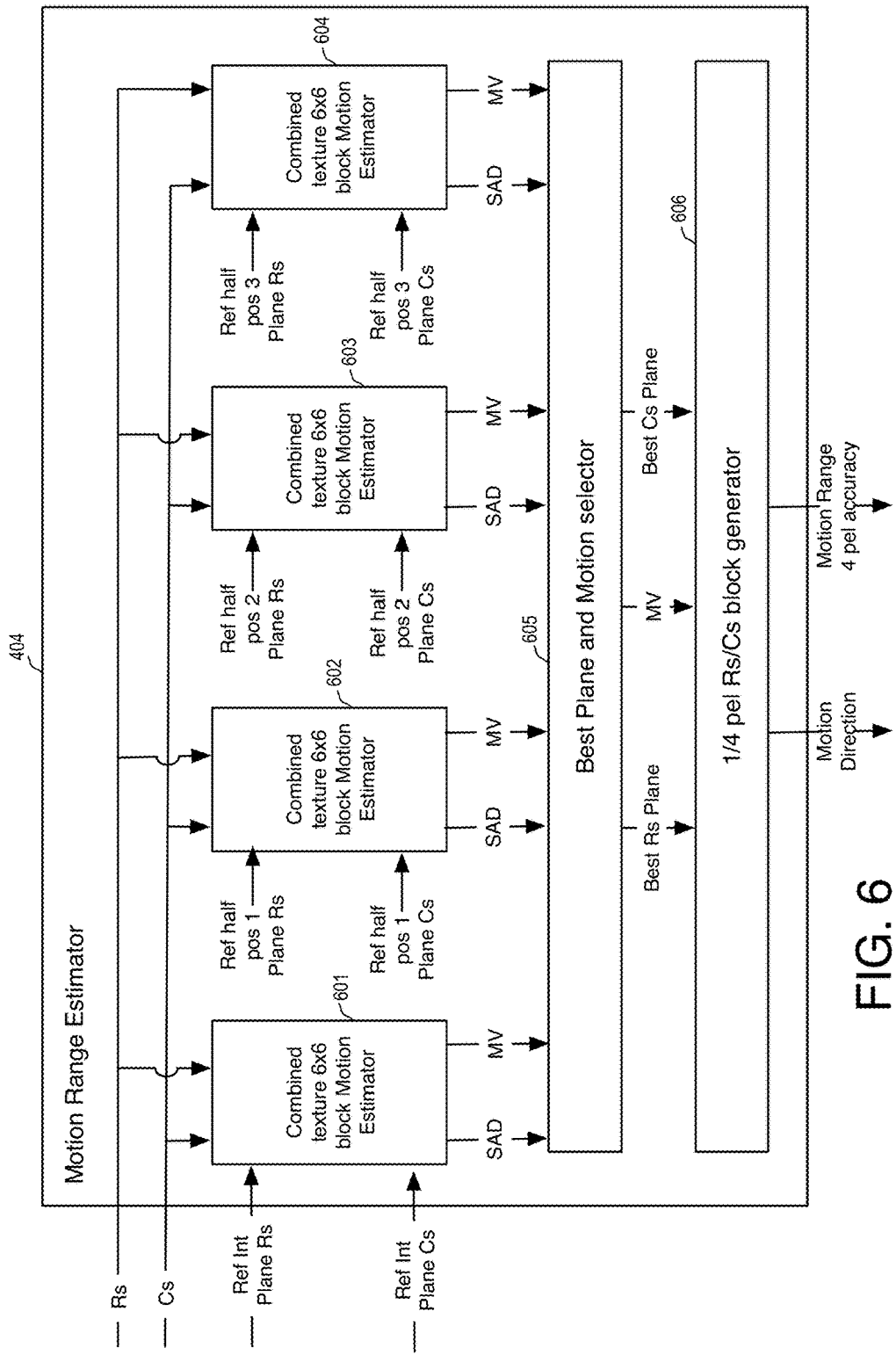
FIG. 6 is an illustrative diagram of an example motion range estimator module.

FIG. 6 is an illustrative diagram of an example motion range estimator module 404 for performing motion range estimation, arranged in accordance with at least some implementations of the present disclosure. As illustrated, motion range estimator module 404 may include combined texture 6×6 block motion estimator module(s) 601 through 604, best plane and motion selector module 605, and/¼ pel Rs/Cs block generator module 606.

The purpose of the motion range estimator module 404 (MRE) is to compute the range and direction of motion. By estimating the range and direction information from content itself, the total amount of computations needed for motion estimation can be substantially reduced in case motion estimation search is performed with a large default range, or motion compensation quality can be improved by extending the default range for specific sequence as needed if it has been chosen to be too small. To perform this analysis a set of small data arrays are generated by extracting the RsCs information of blocks of 16×16 size from the original frame.

For example, the set of arrays may include four arrays that mimic half pel planes but in RsCs domain. A search (e.g., an exhaustive search) may be performed for motion is performed on these four "pictures". Such an exhaustive search for MRE 404 may be done with blocks of 6×6 RsCs pixels because a small border of 2 RsCs pixels can be used when blocks need to have different size, the size of each block is determined by its position in the frame.

In some implementations, a picture may divided into units of 6×6 and that determines the position for the block except when the block intersects with a border, then the block is trimmed But if the width of the block is equal to 2 and the height is equal to 4 then the block dimensions are modified such that the width is kept the same but the height is increased by 2. Next motion estimation may be performed that may include four motion estimation processes performed serially using a RsCsME( ) function on four half pel planes. The sum of absolute differences (SAD) may be calculated from the comparison between the current frame Rs and Cs "pictures" and the four half pel planes from the reference Rs and Cs "pictures".

The operation of the MRE 404 will be explained below in greater detail with respect to FIGS. 12 and 13. At the end of the procedure, depending on which half pel plane gave the best SAD an extra plane may be calculated for quarter pel refinement. At this stage some heuristics may be used to determine if the data obtained is valid or if it is better to use data of previous neighbor. Now that the direction and magnitude of motion has been determined a hierarchical search may be performed next by sequential hierarchical motion estimator module 403, as illustrated in FIG. 7.

Figure 7:
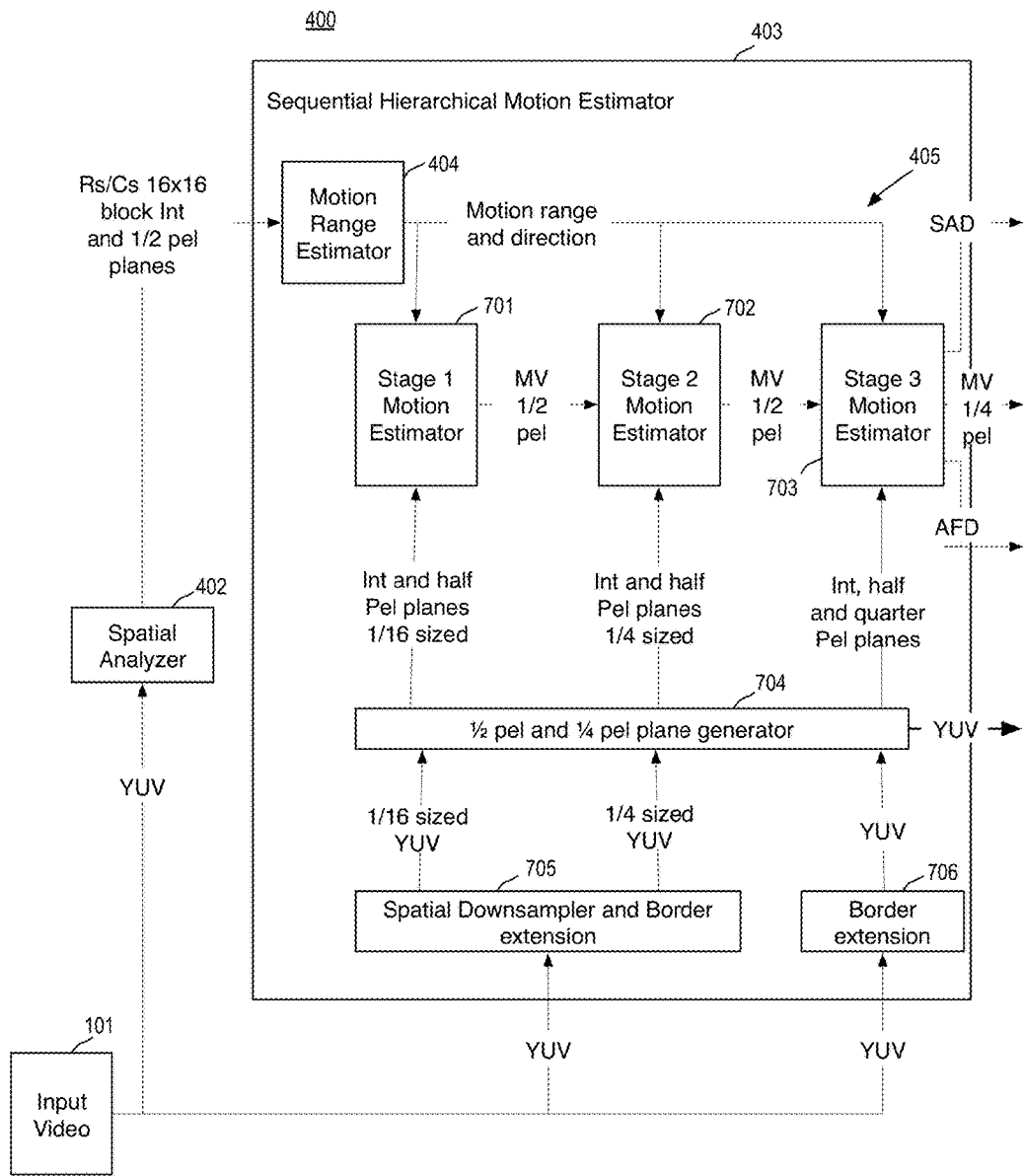
FIG. 7 is an illustrative diagram of an example sequential hierarchical motion estimator module.

FIG. 7 is an illustrative diagram of an example sequential hierarchical motion estimator module 403, arranged in accordance with at least some implementations of the present disclosure. As illustrated, Content PreAnalyzer subsystem 400 may receive input video 101 and include spatial analyzer module 402 and/or sequential hierarchical motion estimator module 403. Sequential hierarchical motion estimator module 403 may include motion range estimator module 404 as well as multi-stage motion estimation module 405. In the illustrated example, multi-stage motion estimation module 405 may include stage 1 motion estimator module 701, stage 2 motion estimator module 702, stage 3 motion estimator module 703, ½ pel and ¼ pel plane generator module 704, spatial downsampler and border extension module 705, and/or border extension module 706. However, multi-stage motion estimation module 405 may include any number of stages, and is not limited to the three stages listed here.

In the illustrated implementation, sequential hierarchical motion estimator module 403 may be implemented as a block based motion estimator that uses hierarchical picture representation to accurately be able to compute motion estimates even when motion is fast. Low to medium resolution allows large uniform motion to be easily detected while medium to high resolution allows detection of detailed individual motion in complex motion sequences.

First Stage of Content Adaptive Hierarchical Motion Estimation (HME)

In the first stage of the motion estimation procedure the data originated from MRE 404 is collected and used by sequential hierarchical motion estimator module 403 to define the search area for each block of 8×8 in the smallest size picture. Sequential hierarchical motion estimator module 403 may use a function for the smallest picture (e.g., HME_Low8×8( )) to first check if the analyzed picture is the smallest resolution, then in that case it collects the corresponding motion range to the block position in the frame, this is done (e.g., through the function MotionRangeDelivery( )). This functions may check the position of the block and matches that position with the data from MRE 404, and then determine if the range is valid for the block, if it is not then sequential hierarchical motion estimator module 403 (e.g., via spatial downsampler and border extension module 705) may correct the search range to avoid going out of bounds when performing the motion estimation.

Then with this ready, a first step of motion estimation is done by stage 1 motion estimator module 701. Here a reduced search is done along the search range, where following a quincunx pattern the best SAD value is look for. Please notice that the reduce search is done by jumping 4 pixels in horizontal and 2 pixels in vertical, and to allow the quincunx pattern a variable called counter is initialized at 0 and incremented every time that a SAD row is done, with that count if the value is even or odd then an offset is introduced at the beginning of horizontal part of the concatenated for( ) loop. After that a search around previous neighbors is done, if the result from the neighbors is better than the current SAD, then a reduced search around the resulting motion vector may be done. The search area for this is of 32×32 pixels, when that search is done a small refinement of +−1 pixels is done over the best obtained motion vector. Then a search around the motion vector zero, zero is done, just in case individual motion behavior is been able to be captured at this level. For this search the same reduced search strategy is done with a search range of +−32 pixels, followed by a small refinement of +−1 pixel search.

With this done, the best candidate is then saved into the first layer motion vector array, but also the resulting motion vector is propagated into the next resolution layer (e.g., for use by stage 2 motion estimator module 702), copying that motion vector into four motion vectors in the next layer array corresponding to the 16×16 area that is represented by the 8××8 block on the current layer. Just to clarify each layer is 4 times smaller than the next, being the original sized picture the last layer, that's why each motion vector on a smaller layer matches a square of 2×2 motion vectors on the next layer.

In some implementations, during the multi-stage motion estimation, one or more popular approaches for motion estimation may be used in conjunction with the techniques introduced by of the present disclosure. Such approaches for motion estimation may include various implementations of the following algorithms: Exhaustive Search (ES) Algorithm; the Three Step Search (TSS) algorithm; the Diamond Search Algorithm (DIA); the Hexagon algorithm; the Unsymmetrical-cross Multi Hexagon Algorithm; Spiral Algorithm; Log Algorithm; Test Zone (TZS) Algorithm; Full Search Algorithm; the like; and/or combinations thereof.

For example, the Exhaustive Search (ES) Algorithm calculates the cost of each possible macro block location in the search window, making it the most computationally expensive algorithm. For instance for motion estimation range of +−16 integer pixels in each (x-, and y-) direction, the exhaustive search requires block matching search calculation for $(16 \times 2+1)^2 = 969$ locations for every block.

The Three Step Search (TSS) algorithm in an attempt to reduce computation, starts the search at eight locations 4 pixels away from a point of origin (0,0), defining a step size of S=4. The location with the least cost from the nine total points calculated (eight points plus the origin) is selected as the new center or point of origin and the Step size is reduced by S/2, repeating the process until S=1.

The Diamond Search Algorithm (DIA) operates using the same principle as the Three Step Search. However, it searches only at four points that form a diamond around a fifth point, the origin. The algorithm searches an undefined number of times around those four points resetting the origin until the new origin is the lowest cost location. Only then, is the step reduced and the search restarted.

The Hexagon algorithm may find the matching block in fewer steps than the Diamond Search being a good tradeoff for higher speeds and is particularly advantageous for larger motion vectors. This algorithm suggests a seven points for the first search round: a hexagon and an origin. The origin is reset to the lowest cost hexagon vertex, uncovering and evaluating only 3 new locations for iteration. When the lowest cost location finally set at the hexagon origin, a 4 point smaller diamond is evaluated next.

The Unsymmetrical-cross Multi Hexagon Algorithm provides good speed without sacrificing quality. The starting point of this search comes from the median value of three motion vectors of adjacent blocks (left, top, and top-right or top-left), the median predictor. The unsymmetrical cross search uses the prediction vector as the search center and extends vertically and horizontally. Then the cross search is modified asymmetrically, the horizontal search range being twice that of the vertical one. In the third stage, a full search is performed around the center and then a 16 point multi hexagon approach is carried out.

The H.264 JMVC implementation provides 4 algorithms for motion estimation, Spiral, Log, Test Zone (TZS) and Full search. As expected, the full search gives the best performance but is computationally expensive. The TZS algorithm is also used on HEVC encoder, this algorithm may include 4 steps as follows:

1.) Motion vector prediction: The method checks four different predictors, median, left, up and upper right. The predictor that gives the best SAD is selected as starting point, for the following step.

2.) Diamond search: Defines a diamond shape with 8 points, starting at a distance of 1 up to 64 pixels from the center, in steps of power of 2, and then the best SAD location is used as center of the next search. HEVC software code constrains the number of rounds of search to 3. When the best SAD has been found, either because the maximum number of rounds or the best location has been reached, the distance value from the current center is saved to be used on the next step.

3.) Reduced Raster search: On this step, the SAD search is done on a raster pattern, and the distance between search positions has been previously defined, on HEVC case this value is constant and is equal to 5, this step is done only if the resulting distance from the center calculated on the previous step is bigger than the raster step. The window size is then defined internally depending on the size of the partition where the motion estimation is being done. FIG. 2B shows raster search with distance of 5 showing the search locations where the SAD calculation is done in case of HEVC.

4.) Diamond refinement search: Same 8 point diamond search is perform on this step, the starting size of the diamond is defined as half the distance from the origin for the best SAD location obtained in the previous step, then each next search distance is half of the previous until it reaches zero.

Second Stage of Content Adaptive Hierarchical Motion Estimation (HME)

In stage 2 motion estimator module 702, a function (e.g., HME_Low8×8( )) may be called. Here sequential hierarchical motion estimator module 403 may test what layer is being worked in and a determination may be made regarding whether it is not the first layer. Sequential hierarchical motion estimator module 403 then tests what motion vector was propagated from the previous layer (e.g., from stage 1 motion estimator module 701) and whether this motion vector is valid (e.g., not going out of bounds), and if found to be so the motion vector may be corrected as needed (e.g., via spatial downsampler and border extension module 705 via a MVpropagationCheck( ) function).

In stage 2 motion estimator module 702, the resultant propagated motion vector SAD may be calculated and compared against motion vector zero zero, and in case zero motion gives better results the motion vector may be reset and starts from zero. The SAD calculation for the propagated motion vector may be done directly at half pixel level which may be followed by determining the best plane to work with by saving the plane information of the one that gave the best SAD in that comparison. The rest of the processing in this stage (e.g., stage 2 motion estimator module 702) works the same or in a similar manner as in the first stage (e.g., stage 1 motion estimator module 701).

Third Stage of Content Adaptive Hierarchical Motion Estimation (HME)

In stage 3 motion estimator module 703, depending on the parameter settings four different SAD quality modes can be chosen for the final stage with differences between them mainly in the granularity of the reduced search. The algorithm may start by testing the validity of the propagated motion vector for that block, if it is not then it corrects it, then stage 3 motion estimator module 703 checks if the motion vector should be reset to zero position or continue with the current value. While checking the current value, stage 3 motion estimator module 703 compares the same propagated motion vector on all 16 planes, and selects the best plane to do motion analysis depending on which plane returns the best SAD.

Now stage 3 motion estimator module 703 may determine the search range for the propagated motion vector depending on if the search range was reset or not (e.g., via the a PropCalcSearchWindowHigh( )function). Now with the search range calculated, an initial reduced search is done by stage 3 motion estimator module 703 with the previously obtained range and motion vector, (e.g., using procedure that is the same or similar as described with regard to stage 1 motion estimator module 701), using a quincunx pattern. Then a second reduced search may be done for refinement, but in this case the second reduced search may be done only in the quadrant where the previous motion estimation was moving to. This second refinement also may use the quincunx pattern, but with a small change, in this case the odd lines are the ones that start with the offset. After that second refinement, one last refinement may be done with a search range of +−1, over all 16 planes. Then neighbors may be checked, for that surrounding neighbors MV may be retrieved and evaluated on all 16 planes for the current block, if a better SAD is then found, that better SAD may replace the current SAD and MV data. Then if the propagated motion vector wasn't reset, a search around zero motion may be done. For that purpose a first small reduced search may be done on over zero motion, and then a refinement search following the quadrant where best SAD was found may be performed. A second refinement may be done on the resulting motion vector with the quincunx pattern and a search range of +−32. Finally a full search on all planes may be performed on a range of +−1. And a last refinement may be performed where a full search on 16 planes may be performed on the best MV, with a range of +−1. The resulting MV of this procedure may be selected for motion. Then if previously defined, an update at ⅛ pel accuracy can be done, as shown in more detail below with respect to the third stage flowchart illustrated in FIG. 15.

Figure 8:
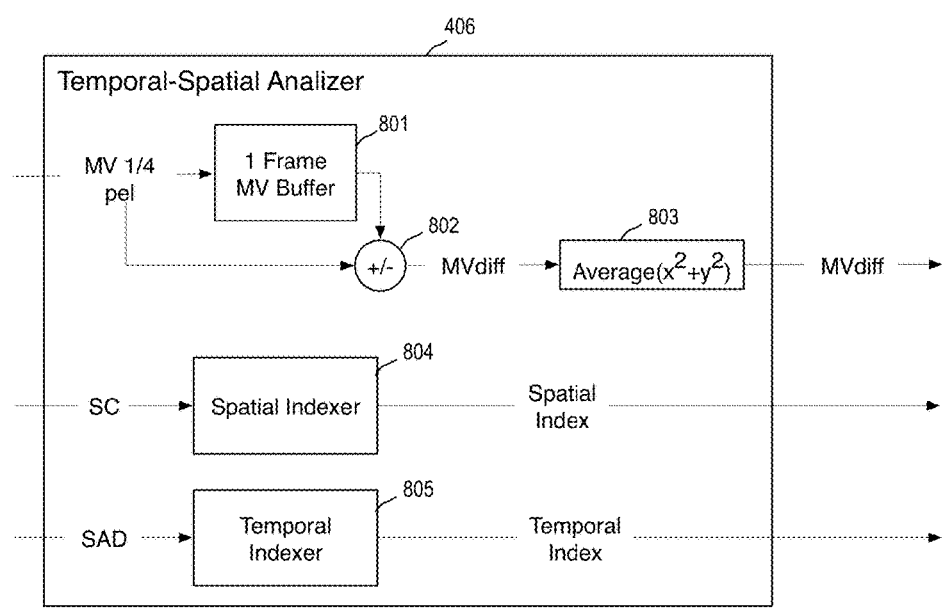
FIG. 8 is an illustrative diagram of an example temporal-spatial analyzer module.

FIG. 8 is an illustrative diagram of an example temporal-spatial analyzer module 406, arranged in accordance with at least some implementations of the present disclosure. As illustrated, temporal-spatial analyzer module 406 may include a frame motion vector buffer module 801, differencer 802, average($x^2+y^2$) module 803, spatial indexer module 804, and/or a temporal indexer module 805.

In the illustrated implementation, temporal-spatial analyzer module 406 may collect the MV information generated by sequential hierarchical motion estimator 403 (e.g., see FIG. 4) on consecutive frames and delivers a measure of how much correlation is present between motion vectors from consecutive frames (e.g., via frame motion vector buffer module 801, differencer 802, and/or average($x^2+y^2$) module 803), and also delivers the indexed value for texture complexity (e.g., Spatial Index generated via spatial indexer module 804) and motion complexity (e.g., Temporal Index generated via temporal indexer module 805) for use by shot change detector module 410 and P distance analyzer 412 (e.g., see FIG. 4).

In operation, temporal-spatial analyzer module 406 may operate in conjunction with gain change detector module 408, shot change detector module 410, and P distance analyzer 412 (e.g., see FIG. 4). The general idea is to analyze consecutive frames to determine which are the spatial and temporal characteristics of a specific sequence and with that information predict the best configuration of P and F frames for encoding. The P distance (pdist) calculation also includes two specialized tools, gain change detector and shot change detector as discussed in greater detail below.

Figure 9:
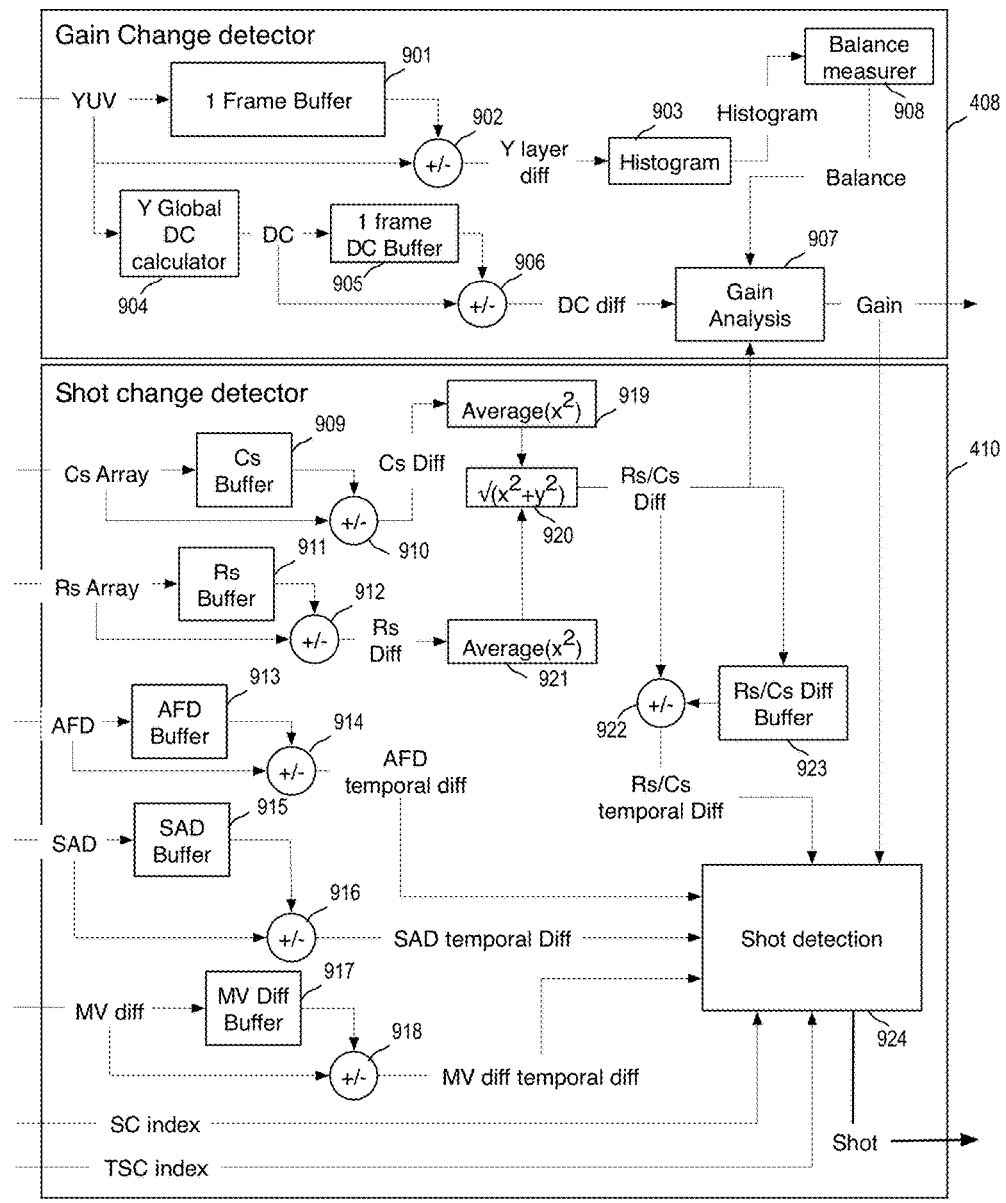
FIG. 9 is an illustrative diagram of an example gain change detector module and shot change detector module.

FIG. 9 is an illustrative diagram of an example gain change detector module 408 and shot change detector module 410, arranged in accordance with at least some implementations of the present disclosure. As illustrated, gain change detector module 408 may include a frame buffer module 901, differencer 902, histogram 903, y global DC calculator module 904, a frame DC buffer module 905, differencer 906, gain analysis module 907, and/or balance measurer module 908. Shot change detector module 410 may include Cs buffer module 909, differencer 910, Rs buffer module 911, differencer 912, AFD buffer module 913, differencer 914, SAD buffer module 915, differencer 916, motion vector difference buffer module 917, differencer 918, average($x^2$) module 919, square root ($x^2+y^2$) module 920, average($x^2$) module 921, differencer 922, Rs/Cs difference buffer module 923, and/or shot detection module 924.

In the illustrated implementation, gain change detector module 408 may determine when two consecutive frames belong to different cameras, when that happens the correlation level between those two pictures is very low and using one as a reference for the other reduces the coding efficiency. Gain change detector module 408 may receive input video 101 (e.g., luma and chroma (YUV) data). For example, gain change may be calculated (e.g., via gain analysis module 907) by doing a Luma histogram of the current frame and comparing it to the previous frame histogram, also the DC and the texture information may be taken into account to determine if there is a gain change. All those three variables may be analyzed and if they cross a set of empirically obtained thresholds, and then a gain change flag may be set.

In the illustrated implementation, shot change detector module 410 may allow for detection of sudden change in brightness such as by camera flashes or other reasons that may impact individual pictures and makes them less suitable as references for good prediction. If so desired, such pictures can be isolated from pictures that are used as prediction referencesShot change detector module 410 may receive input video 101 (e.g., luma and chroma (YUV) data) (e.g., see FIG. 4), as well as output from spatial analyzer module 402 (e.g., Rs/Cs domain data) (e.g., see FIG. 4), temporal-spatial analyzer module 406 (e.g., spatial index and/or temporal index) (e.g., see FIG. 4), and/or gain change detector module 408 (e.g., gain). To determine the shot change, a function (e.g., ShotDetect( )) may be called. Now that the gain information is available, shot change may be determined (e.g., via shot detection module 924) by testing for conditions (e.g., see the conditions illustrated below in charts illustrated in FIGS. 18-21) that have to be met for a shot change to occur as follows.

More information regarding the operation of gain change detector module 408 and shot change detector module 410 may be found below with regard to the flow chart illustrated in FIG. 17.

Figure 10:
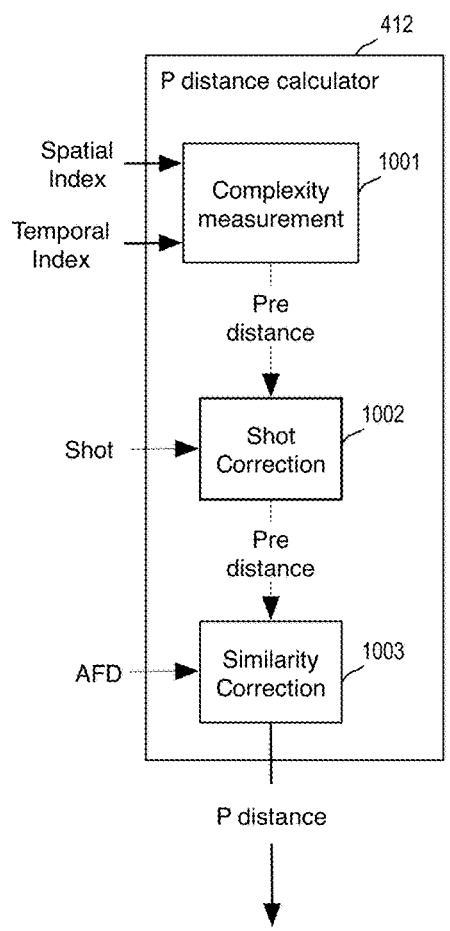
FIG. 10 is an illustrative diagram of an example p distance calculator module.

FIG. 10 is an illustrative diagram of an example p distance calculator module 412, arranged in accordance with at least some implementations of the present disclosure. As illustrated, p distance calculator module 412 may include complexity measurement module 1001, shot correction module 1002, and/or similarity correction module 1003.

In the illustrated implementation, p distance calculator module 412 may receive output from temporal-spatial analyzer module 406 (e.g., spatial index and/or temporal index) (see FIG. 4) via complexity measurement module 1001. For example, complexity measurement module 1001 may operate to calculate an initial p distance based at least in part on the spatial index and/or temporal index.

In the illustrated implementation, p distance calculator module 412 may receive output from shot change detector module 410 (e.g., shot change indication) (see FIG. 4) via shot correction module 1002. For example, shot correction module 1002 may operate to calculate an intermediate p distance based at least in part on the initial p distance as well as on the shot change indication.

In the illustrated implementation, p distance calculator module 412 may receive output from sequential hierarchical motion estimator module 403 (e.g., average frame difference (AFD)) (see FIG. 4) via similarity correction module 1003. For example, similarity correction module 1003 may calculate a final p distance based at least in part on the intermediate p distance as well as on the average frame difference.

In operation, p distance calculator module 412 may include a loop that goes through a whole sequence, frame by frame extracting texture, motion and frame difference information. The main function for pdistance calculation (e.g., NGV_Pdistance_Determine( )) may generate the intermediate data needed for motion estimation process and then continue with the analysis (e.g., by calling a processMEFrame( ) function).

For example, inside the analysis (e.g., via processMEFrame( )) a normal HME is run in the fastest mode, from it motion vectors, SAD values are kept for further analysis, when motion estimation is done, the TSCstat structure may then be filled with the texture and temporal data, that data is global Rs, global Cs, global texture or Spatial Complexity (SC), Average Frame Difference (AFD), Average Motion Compensated Frame Difference or Spatio Temporal Complexity (TSC) and Global Motion Vector difference value, which is the result of calculating the general difference between motion vectors from current and previous frame. With that data in the structure then two indexes are calculated. tscIndex and scIndex, to do that the Spatial complexity value and the Spatio Temporal complexity value may be catalogued through two tables (e.g., Lmt_tsc2 for tscIndex and lmt_sc2 for scIndex). These tables may be associated with the Temporal-Spatial analyzer module. When the two indexes are obtained, then the correspondent P distance may be calculated by looking in a 2D table (e.g., a table called PDISTTbl2), where the tscIndex may be the y coordinate and scIndex may be the x coordinate, for example.

In efficient video coding, automatic scene dependent calculation of prediction distance (pdist) between reference frames that amounts to calculating how many B-frames to insert between every pair of reference frames (typically I or P, except in pyramid picture structures, where reference frames can be of I-, P- or even B- frame), can provide additional compression benefits. This is so because as explained earlier, adaptively increasing number of B-frames (or F-pictures in case of NGV coding, that serves a similar purpose) can provide compression gains due to their high compressibility.

In fact the notion of pdist can be generalized for pyramid configurations to mean several different type of distances between various layers of frames. For instance consider FIG. 16 that shows $8^{th}$, $16^{th}$ $24^{th}$ . . . frame a P-frame, every $4^{th}$, $12^{th}$, $20^{th}$ . . . a first level of hierarchy F-picture, $2^{nd}$, $6^{th}$, $10^{th}$, $14^{th}$, $18^{th}$, and $22^{nd}$, . . . second level hierarchy F-pictures etc.

Thus, in this fixed system, there are various types of frame distances such as between non-hierarchical P-pictures (distance of 8–number of F-pictures is 7), first level of hierarchy F-pictures (distance of 4–number of F-pictures is 3), second level of hierarchy F-pictures (distance of 2–number of F-pictures is 1). In general if in this case pdist refers to distance at second level of hierarchy, and this distance can be adaptive based on content, distance at first level of hierarchy also becomes adaptive, and further, distance between non-hierarchical P-frames, also becomes adaptive.

Thus for generality of explanation, while we typically use pdist as distance between reference P-pictures (ie, 1 more than number of intervening B- (or F-) pictures), all further discussion will mean pdist to be the distance between two reference anchor pictures, regardless of their type.

Figure 11:
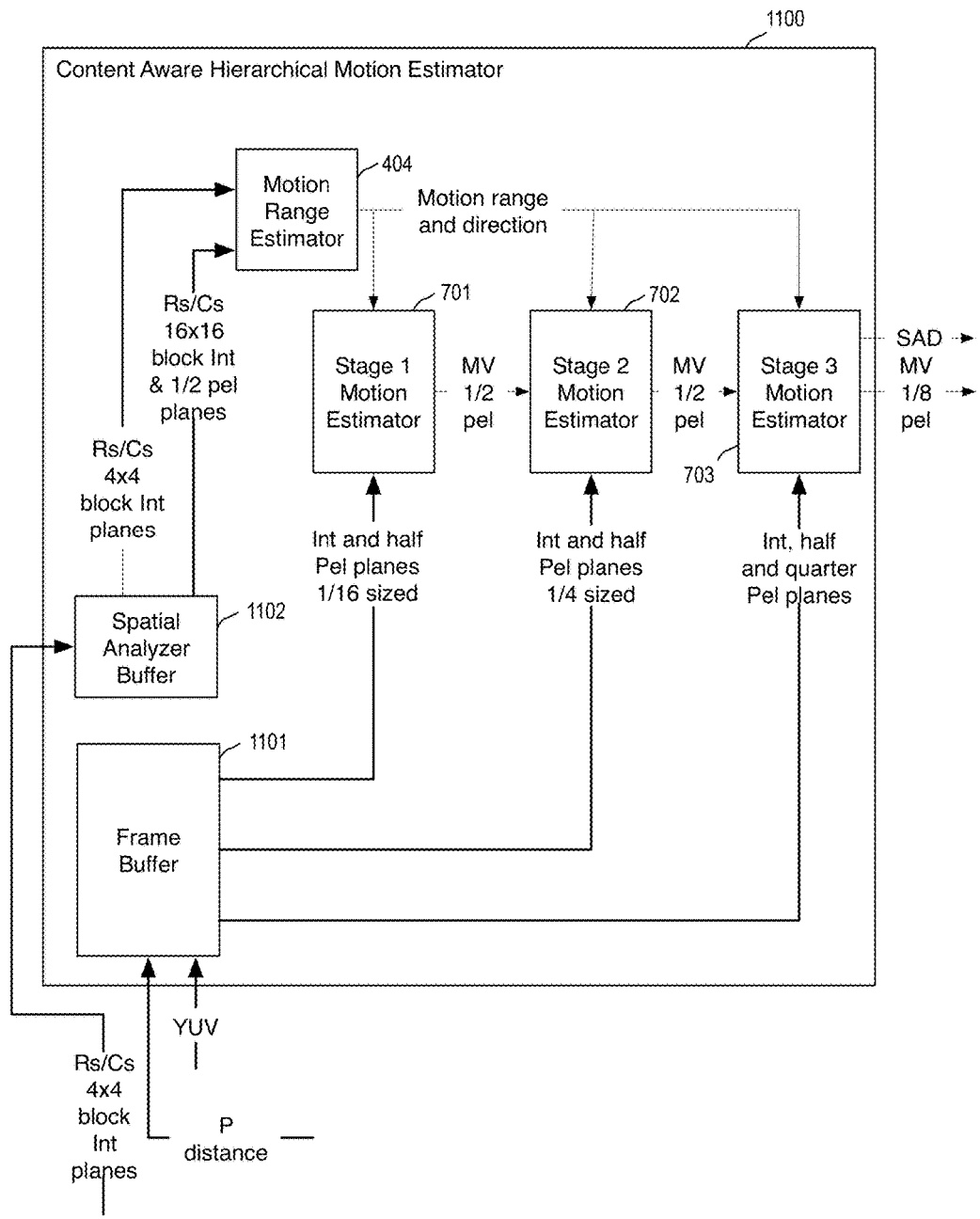
FIG. 11 is an illustrative diagram of an example content aware hierarchical motion estimator module.

FIG. 11 is an illustrative diagram of an example content aware hierarchical motion estimator module 1100, arranged in accordance with at least some implementations of the present disclosure. In the illustrated example, content aware hierarchical motion estimator module 1100 may include frame buffer 1101, spatial analyzer buffer 1102, motion range estimator module 404, stage 1 motion estimator module 701, stage 2 motion estimator module 702, and/or stage 3 motion estimator module 703.

In the illustrated implementation, content aware hierarchical motion estimator module 414 may receive may receive input video 101 (e.g., luma and chroma (YUV) data), as well as output from spatial analyzer module 402 (e.g., Rs/Cs domain data), and/or p distance calculator module 412 (e.g., p-distance data) (see, e.g., FIG. 4). For example, content aware hierarchical motion estimator module 1100 and its components may operate in a manner similar to or the same as content aware hierarchical motion estimator module 403; however, content aware hierarchical motion estimator module 1100 may perform analysis of the scene being coded, providing at its output, and may compute motion vectors that will be used for efficient motion compensated prediction via prediction encoding subsystem 330a (see, e.g., FIG. 3(a)) (as opposed to being used for p distance calculations, as is intended for the motion vectors output by similar sequential hierarchical motion estimator, see, e.g., FIG. 4)).

Figure 12:
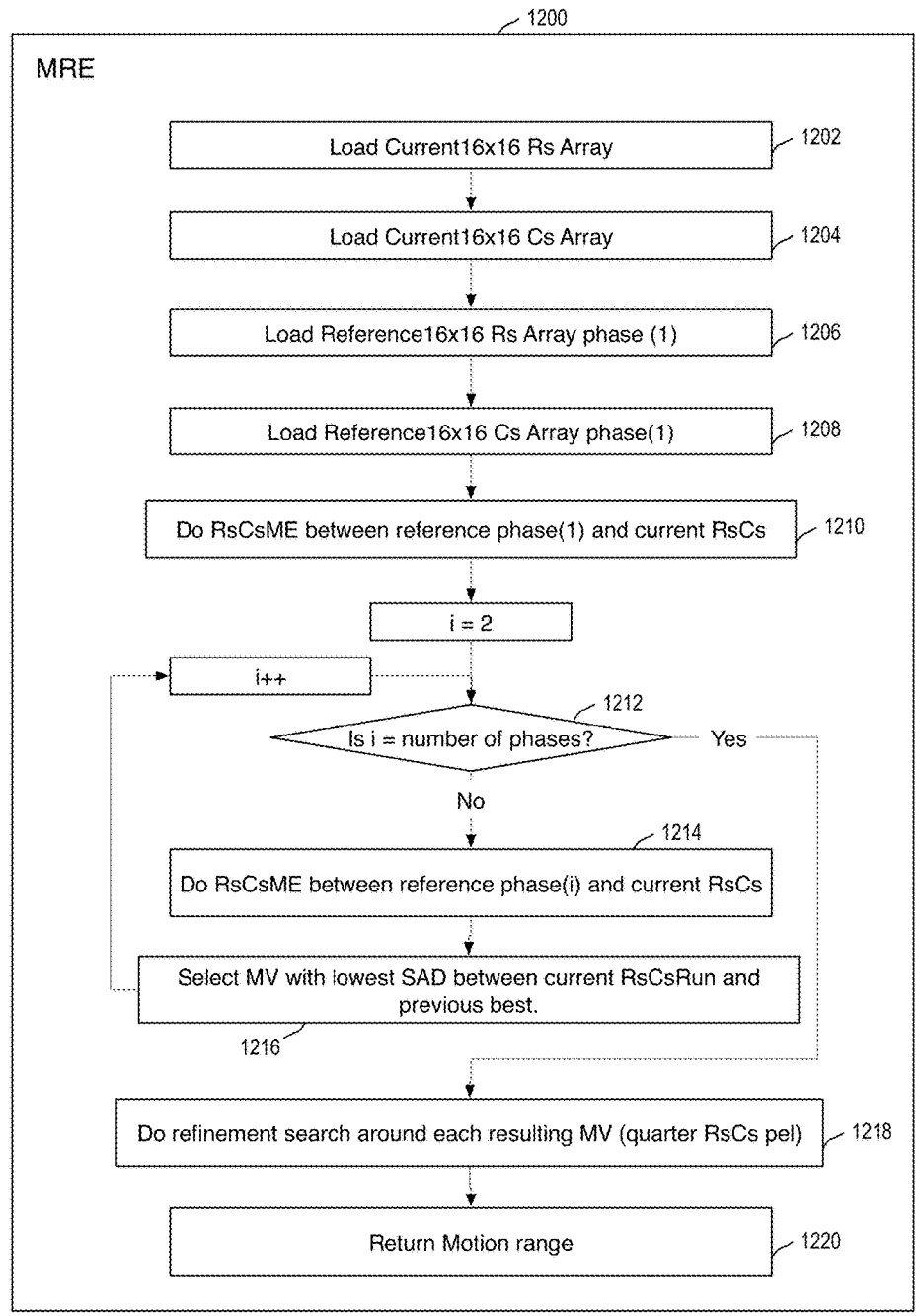
FIG. 12 is a flow diagram illustrating an example motion range estimation process.

FIG. 12 is a flow diagram illustrating an example motion range estimation process 1200, arranged in accordance with at least some implementations of the present disclosure. Process 1200 may include one or more operations, functions or actions as illustrated by one or more operations. Process 1200 may form at least part of a next generation video coding process. By way of non-limiting example, process 1200 may form at least part of a next generation video encoding process as undertaken by encoder system 100 of FIG. 1 and/or any other encoder system or subsystems described herein.

Process 1200 may begin at operation 1202, "Load Current 16×16 Rs Array", where a current 16×16 Rs array may be loaded.

Process 1200 may continue at operation 1204, "Load Current 16×16 Cs Array", where a current 16×16 Cs array may be loaded.

Process 1200 may continue at operation 1206, "Load Reference 16×16 Rs Array phase(1)", where a reference 16×16 Rs array phase(1) may be loaded.

Process 1200 may continue at operation 1208, "Load Reference 16×16 Cs Array phase(1)", where a reference 16×16 Cs array phase(1) may be loaded.

Process 1200 may continue at operation 1210, "Do RsCsME between reference phase(1) and current RsCs", where motion estimation between reference phase(1) and current RsCs may be performed. A phase counter i may be set to two.

Process 1200 may continue at operation 1212, "Is i=number of phases?", where a determination may be made as to whether a phase counter i is equal to the number of phases. If phase counter i is equal to the number of phases, process 1200 may continue at operation 1218 below.

If phase counter i is not equal to the number of phases, process 1200 may continue at operation 1214, "Do RsCsME between reference phase(i) and current RsCs", where motion estimation between reference phase(i) and current RsCs may be performed.

Process 1200 may continue at operation 1216, "Select MV with lowest SAD between current RsCsRun and previous best", where a motion vector with the lowest sum of absolute differences between the current RsCsRun and the previous best may be selected. Phase counter i may be incremented. Process 1200 may then continue at operation 1212 above.

If, at operation 1212 above, phase counter i is equal to the number of phases, process 1200 may continue at operation 1218, "Do refinement search around each resulting MV (quarter RsCs pel)", where a refinement search around each resulting motion vector on a ¼ RsCs pixel basis may be performed.

Process 1200 may continue at operation 1220, "Return Motion range", where the motion range may be returned.

Figure 13:
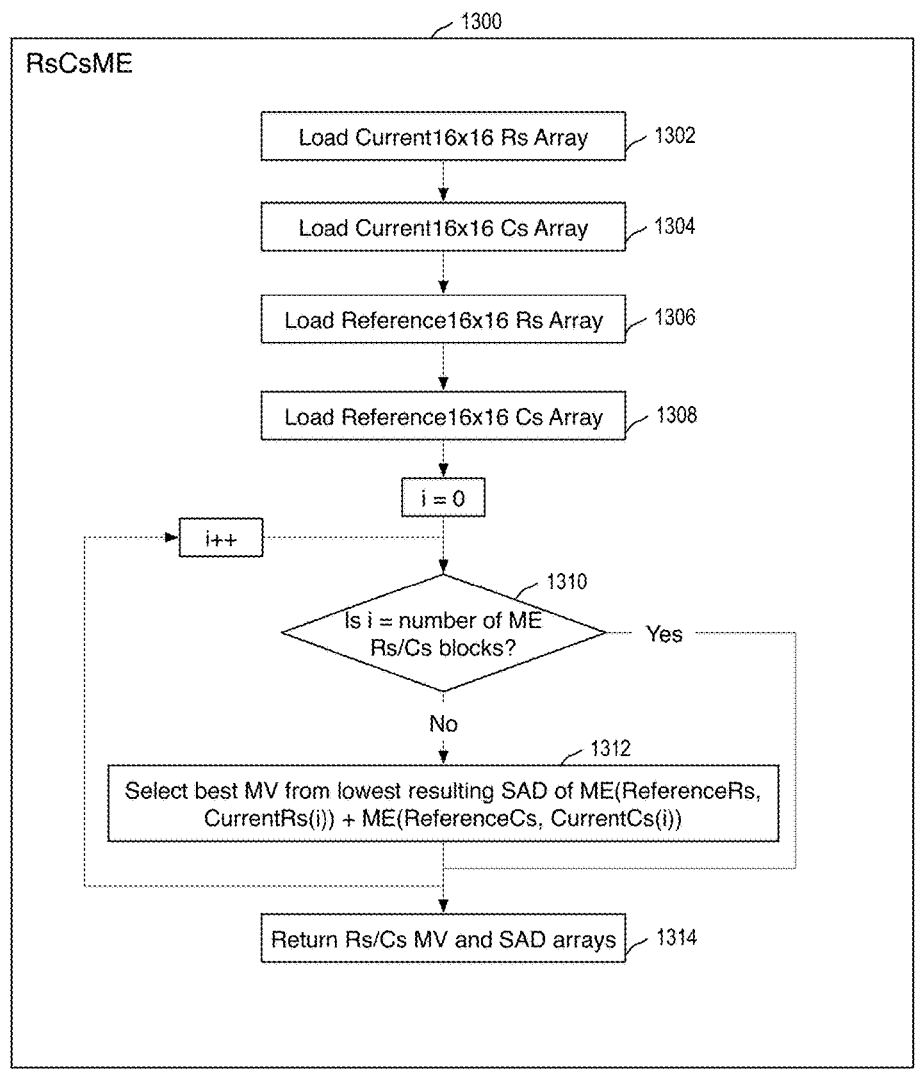
FIG. 13 is a flow diagram illustrating an example Rs/Cs domain motion estimation process.

FIG. 13 is a flow diagram illustrating an example Rs/Cs domain motion estimation process 1300, arranged in accordance with at least some implementations of the present disclosure. Process 1300 may include one or more operations, functions or actions as illustrated by one or more operations. Process 1300 may form at least part of a next generation video coding process. By way of non-limiting example, process 1300 may form at least part of a next generation video encoding process as undertaken by encoder system 100 of FIG. 1 and/or any other encoder system or subsystems described herein.

Process 1300 may begin at operation 1302, "Load Current 16×16 Rs Array", where a current 16×16 Rs array may be loaded.

Process 1300 may continue at operation 1304, "Load Current 16×16 Cs Array", where a current 16×16 Cs array may be loaded.

Process 1300 may continue at operation 1306, "Load Reference 16×16 Rs Array", where a reference 16×16 Rs array may be loaded.

Process 1300 may continue at operation 1308, "Load Reference 16×16 Cs Array", where a reference 16×16 Cs array may be loaded. A motion estimation Rs/Cs block counter may be set to zero.

Process 1300 may continue at operation 1310, "Is i=number of ME Rs/Cs blocks?", where a determination may be made as to whether a motion estimation Rs/Cs block counter i is equal to the number motion estimation Rs/Cs blocks. If motion estimation Rs/Cs block counter i is equal to the number motion estimation Rs/Cs blocks, process 1300 may continue at operation 1314 below.

If motion estimation Rs/Cs block counter i is not equal to the number motion estimation Rs/Cs blocks, motion estimation Rs/Cs block counter may be incremented and process 1300 may continue at operation 1312, "Select best MV from lowest resulting SAD of ME(ReferenceRs, CurrentRs(i))+ME(ReferenceCs, CurrentCs(i))", where a best motion vector from the lowest resulting sum of absolute differences of motion estimation for (ReferenceRs, CurrentRs(i))+ME (ReferenceCs, CurrentCs(i)) may be selected. Motion estimation Rs/Cs block counter i may be incremented. Process 1300 may then continue at operation 1310 above.

If, at operation 1310 above, motion estimation Rs/Cs block counter i is equal to the number motion estimation Rs/Cs blocks, process 1300 may continue at operation 1314, "Return Rs/Cs MV and SAD arrays", where arrays of Rs/Cs motion vectors and sum of absolute differences may be returned.

Figure 14A:
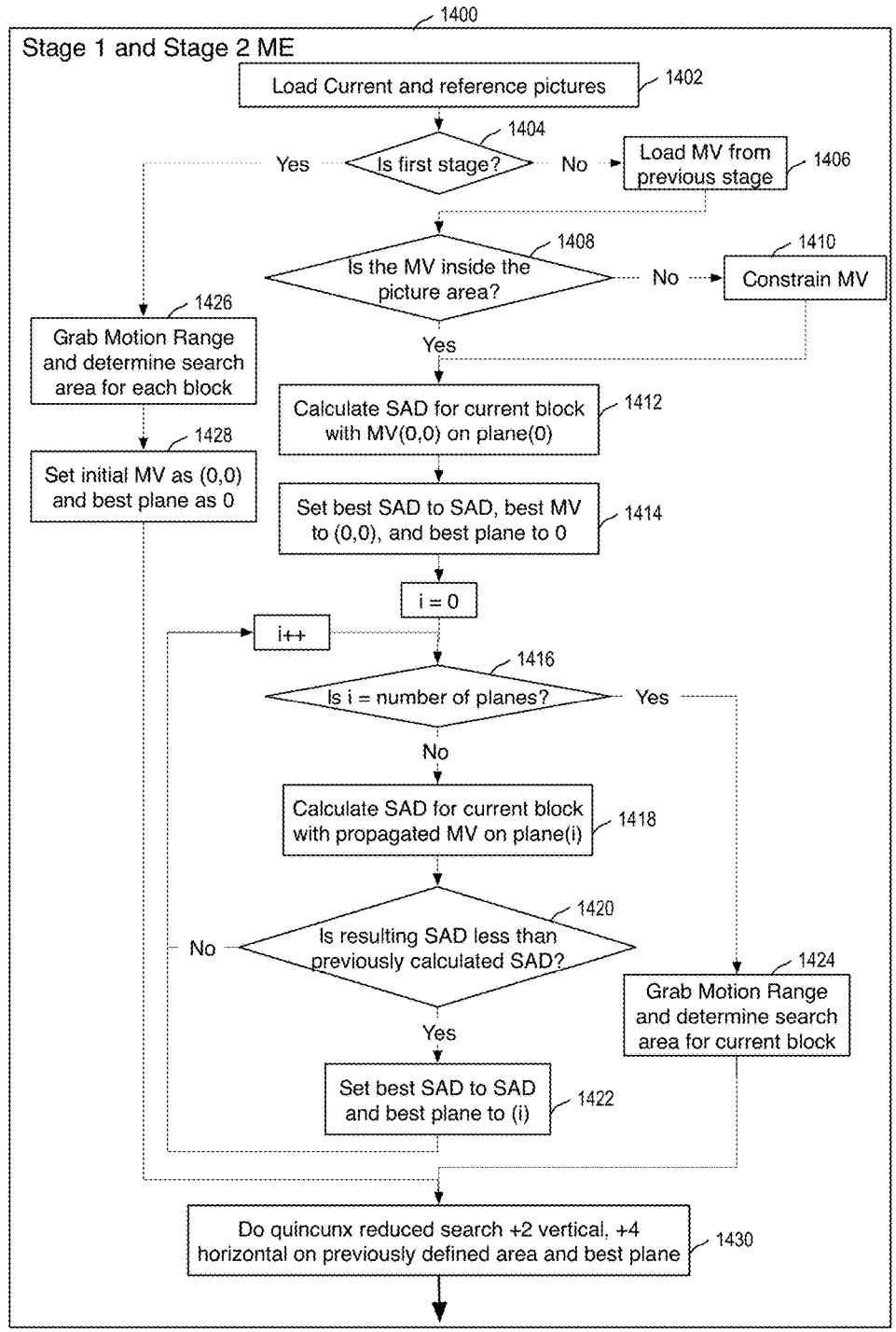
FIG. 14 is a flow diagram illustrating an example stage 1 and 2 motion estimation process.
Figure 14B:
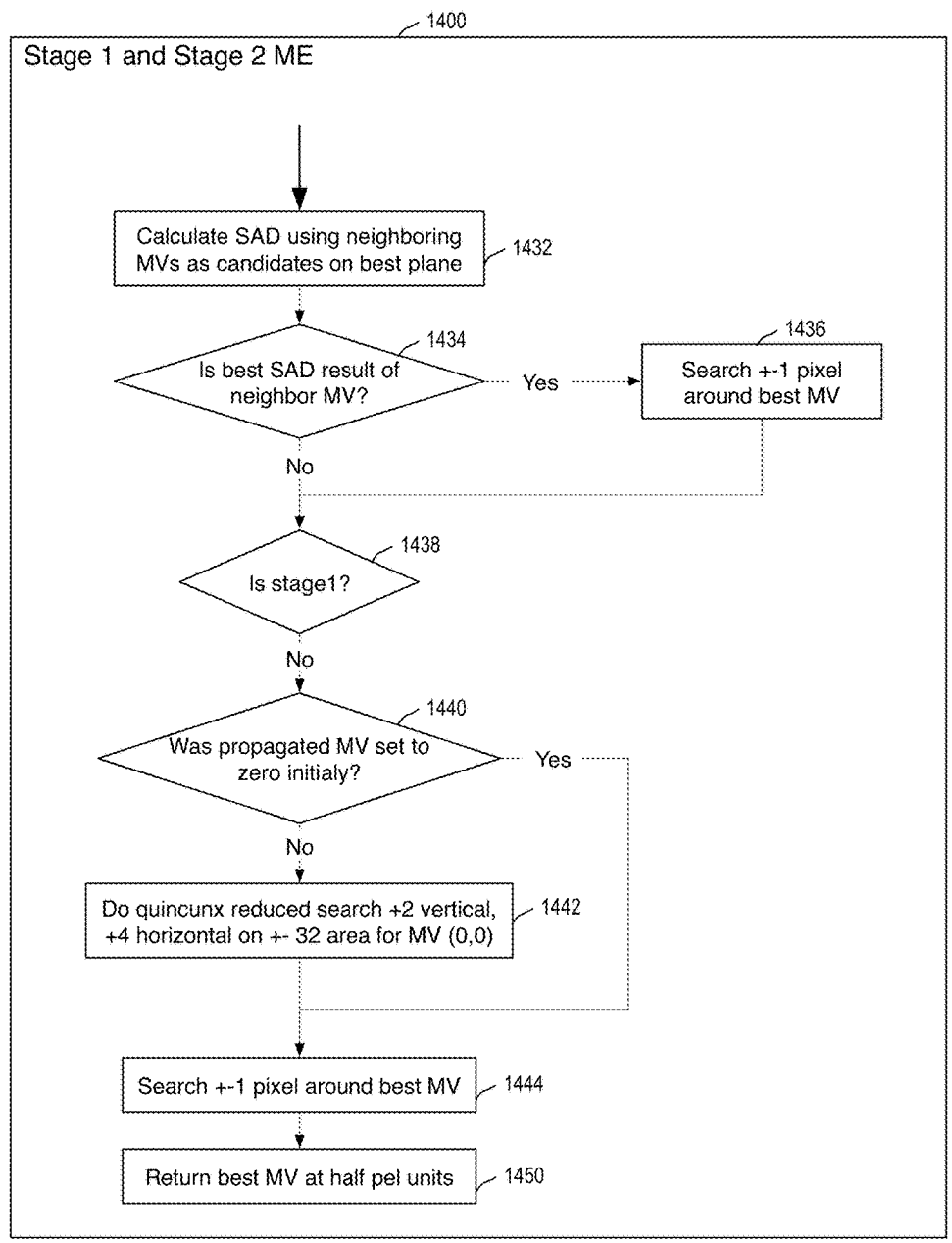

FIG. 14 is a flow diagram illustrating an example stage 1 and 2 motion estimation process 1400, arranged in accordance with at least some implementations of the present disclosure. Process 1400 may include one or more operations, functions or actions as illustrated by one or more operations. Process 1400 may form at least part of a next generation video coding process. By way of non-limiting example, process 1400 may form at least part of a next generation video encoding process as undertaken by encoder system 100 of FIG. 1 and/or any other encoder system or subsystems described herein.

Process 1400 may begin at operation 1402, "Load Current and reference pictures", where current and reference pictures may be loaded.

Process 1400 may continue at operation 1404, "Is first stage?", where a determination may be made as to whether first stage motion estimation is being performed. If first stage motion estimation is being performed, process 1400 may continue at operation 1426 below.

If first stage motion estimation is not being performed, process 1400 may continue at operation 1406, "Load MV from previous stage", where a motion vector from a previous stage may be loaded.

Process 1400 may continue at operation 1406, "Is the MV inside the picture area?", where a determination may be made as to whether the motion vector from the previous stage is inside the picture area. If the motion vector from the previous stage is inside the picture area, process 1400 may continue at operation 1412 below.

If the motion vector from the previous stage is not inside the picture area, process 1400 may continue at operation 1410, "Constrain MV", where the motion vector may be constrained.

Process 1400 may continue at operation 1412, "Calculate SAD for current block with MV(0,0) on plane(0)", where the sum of absolute differences for the current block with motion vector (0,0) on plane(0) may be calculated.

Process 1400 may continue at operation 1414, "Set best SAD to SAD, best MV to (0,0), and best plane to 0", where the best sum of absolute differences may be set to the sum of absolute differences, the best motion vector may be set to (0,0), and the best plane may be set to zero. A plane counter i may be set to zero.

Process 1400 may continue at operation 1416, "Is i=number of planes?", where a determination may be made as to whether plane counter i is equal to the number of planes. If plane counter i is equal to the number of planes, process 1400 may continue at operation 1424 below.

If plane counter i is not equal to the number of planes, process 1400 may continue at operation 1418, "Calculate SAD for current block with propagated MV on plane(i)", where the sum of absolute differences for the current block with the propagated motion vector on plane(i) may be calculated.

Process 1400 may continue at operation 1420, "Is resulting SAD less than previously calculated SAD?", where a determination may be made as to whether the resulting sum of absolute differences is less than the previously calculated sum of absolute differences. If the sum of absolute differences is not less than the previously calculated sum of absolute differences, plane counter i may be incremented and process 1400 may continue at operation 1416 above.

If the sum of absolute differences is less than the previously calculated sum of absolute differences, process 1400 may continue at operation 1422, "Set best SAD to SAD and best plane to (i)", where the best sum of absolute differences may be set to the sum of absolute differences and the best plane may be set to plane counter i. Plane counter i may be incremented, and process 1400 may continue at operation 1416 above.

If, at operation 1416 above, plane counter i is equal to the number of planes, process 1400 may continue at operation 1424, "Grab Motion Range and determine search area for current block", where motion range may be grabbed and the search area for the current block may be determined Process 1400 may then continue at operation 1430 below.

If, at operation 1404 above, first stage motion estimation is being performed, process 1400 may continue at operation 1426, "Grab Motion Range and determine search area for current block", where motion range may be grabbed and the search area for the current block may be determined.

Process 1400 may continue at operation 1428, "Set initial MV as (0,0) and best plane as 0", where the initial motion vector may be set to (0,0) and the best plane may be set to 0.

Process 1400 may continue at operation 1430, "Do quincunx reduced search +2 vertical, +4 horizontal on previously defined area and best plane", where a quincunx reduced search +2 vertical, +4 horizontal may be performed on the previously defined area and the best plane.

Process 1400 may continue at operation 1432, "Calculate SAD using neighboring MVs as candidates on best plane", where the sum of absolute differences may be calculated using neighboring motion vectors as candidates on the best plane.

Process 1400 may continue at operation 1434, "Is best SAD result of neighbor MV?", where a determination may be made as to whether the best sum of absolute differences is a result of a neighbor motion vector. If the best sum of absolute differences is not a result of a neighbor motion vector, process 1400 may continue at operation 1438 below.

If, at operation 1434, the best sum of absolute differences is a result of a neighbor motion vector, process 1400 may continue at operation 1436, "Search +−1 pixel around best MV", where a search plus or minus one pixel around the best motion vector may be performed.

Process 1400 may continue at operation 1438, "Is stage 1?", where a determination may be made as to whether stage one motion estimation is being performed. If stage one motion estimation is not being performed, process 1400 may continue at operation 1440 below.

Process 1400 may continue at operation 1440, "Was propagated MV set to zero initially?", where a determination may be made as to whether the propagated motion vector was set to zero initially. If the propagated motion vector was set to zero initially, process 1400 may continue at operation 1444 below.

If, at operation 1440, the propagated motion vector was not set to zero initially, process 1400 may continue at operation 1442, "Do quincunx reduced search +2 vertical, +4 horizontal on +−32 area for MV (0,0)" where a reduced quincunx search +2 vertical +4 horizontal may be performed on +−32 area for motion vector (0,0).

Process 1400 may continue at operation 1444, "Search +−1 pixel around best MV", where a search of +−1 pixel around the best motion vector may be performed.

Process 1400 may continue at operation 1450, "Return best MV at helf pel units", where the best motion vector may be returned at half pixel units.

Figure 15A:
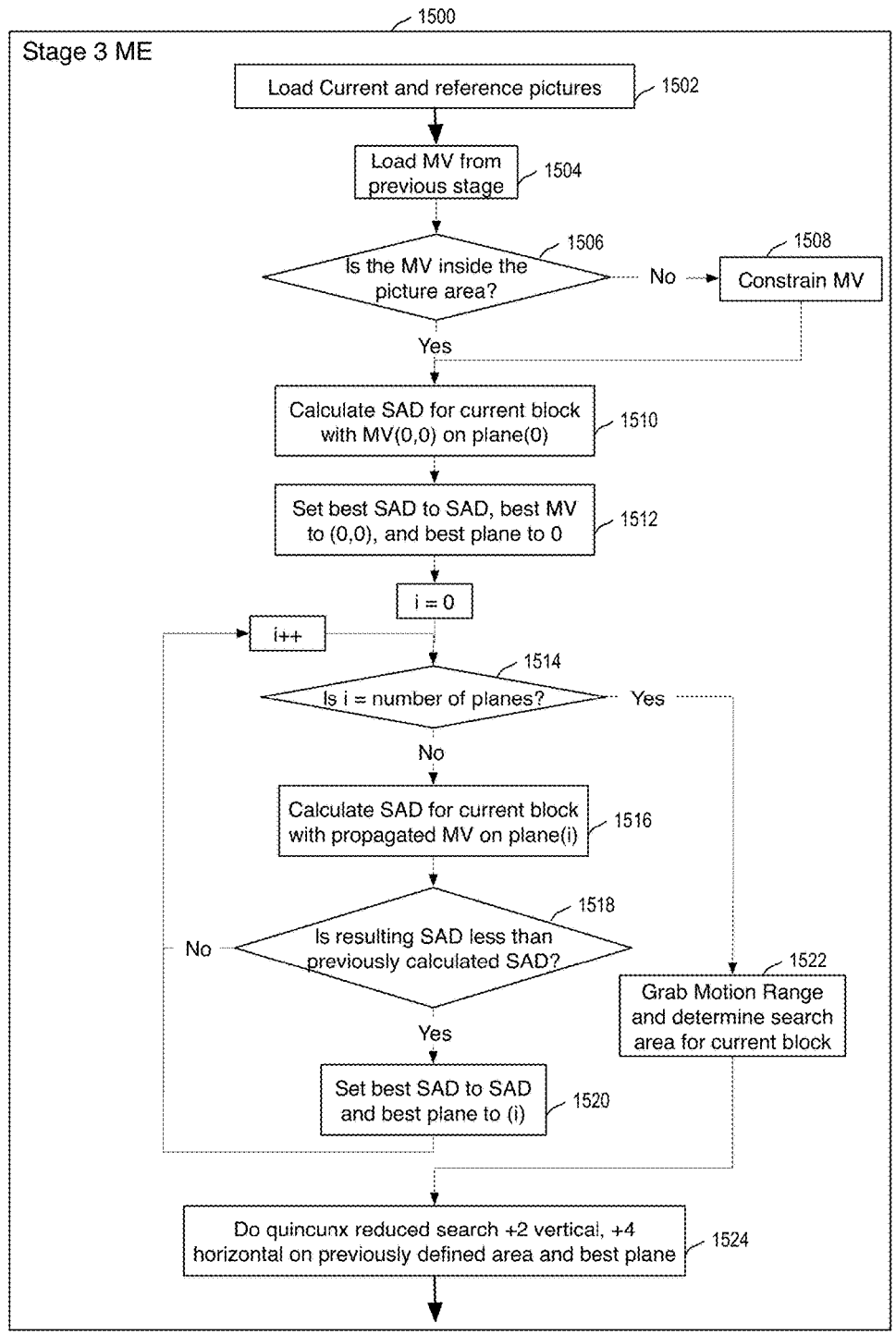
FIG. 15 is a flow diagram illustrating an example stage 3 motion estimation process.
Figure 15B:
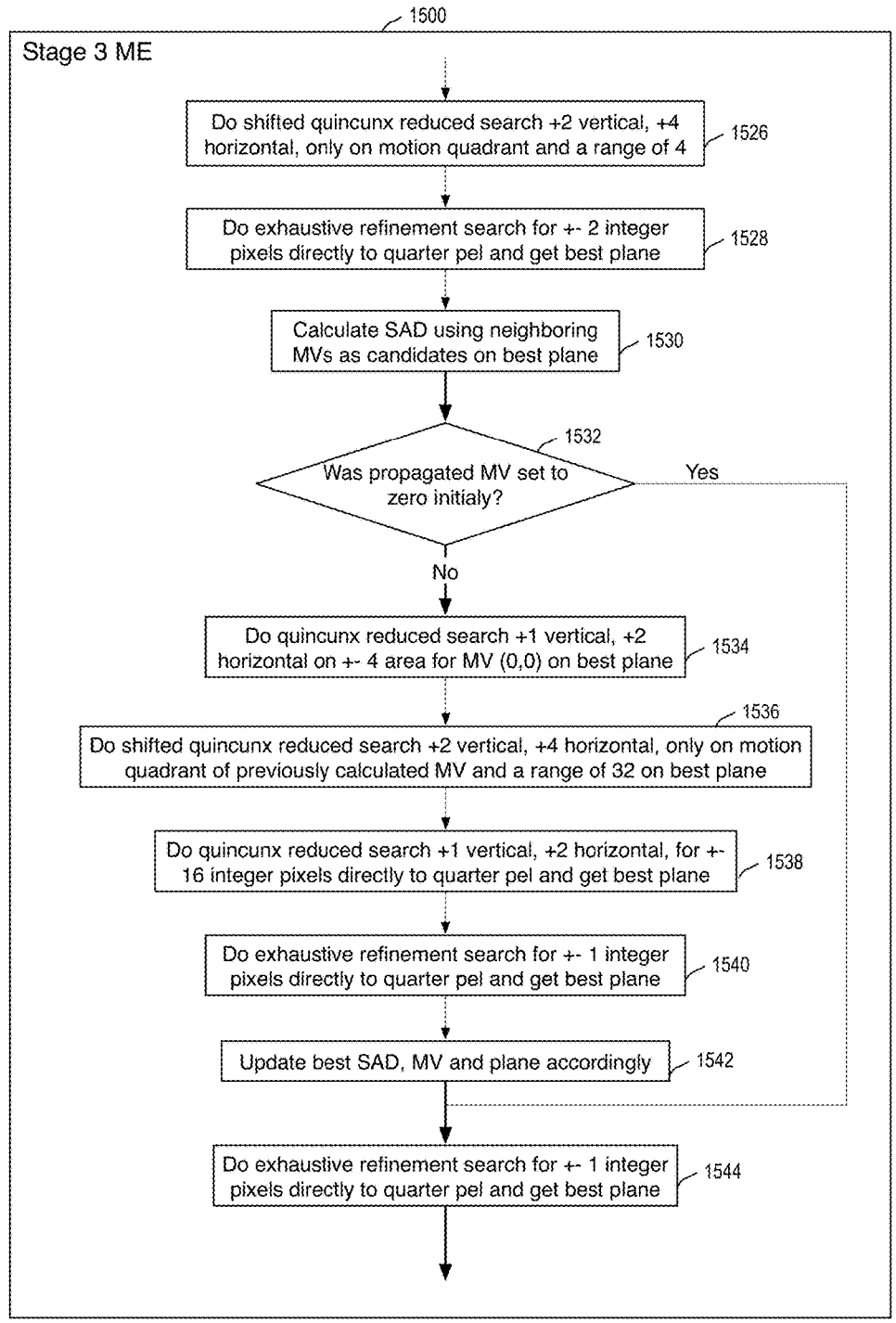
Figure 15C:
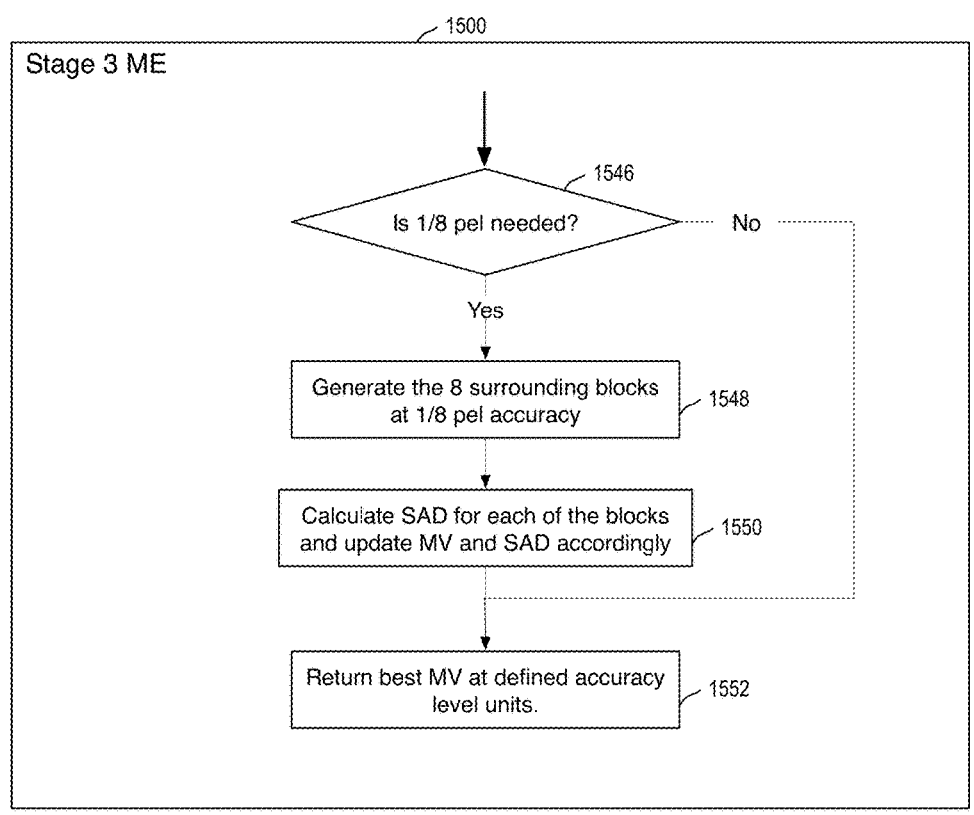

FIG. 15 is a flow diagram illustrating an example stage 3 motion estimation process 1500, arranged in accordance with at least some implementations of the present disclosure. Process 1500 may include one or more operations, functions or actions as illustrated by one or more operations. Process 1500 may form at least part of a next generation video coding process. By way of non-limiting example, process 1500 may form at least part of a next generation video encoding process as undertaken by encoder system 100 of FIG. 1 and/or any other encoder system or subsystems described herein.

Process 1500 may begin at operation 1502, "Load Current and reference pictures", where current and reference pictures may be loaded.

Process 1500 may continue at operation 1504, "Load MV from previous stage", where the motion vector from the previous stage may be loaded.

Process 1500 may continue at operation 1506, "Is the MV inside the picture area?", where a determination may be made as to whether the motion vector is inside the picture area. If the motion vector is inside the picture area, process 1500 may continue at operation 1510 below.

If, at operation 1506, the motion vector is not inside the picture area, process 1500 may continue at operation 1508, "Constrain MV", where the motion vector may be constrained.

Process 1500 may continue at operation 1510, "Calculate SAD for current block with MV(0,0) on plane(0)", where the sum of absolute differences for the current block may be calculated with motion vector (0,0) and plane(0).

Process 1500 may continue at operation 1512, "Set best SAD to SAD, best MV to (0,0), and best plane to 0", where the best sum of absolute differences may be set to the sum of absolute differences, the best motion vector may be set to (0,0), and the best plane may be set to zero. A plane counter i may be set to zero.

Process 1500 may continue at operation 1514, "Is i=number of planes?", where a determination may be made as to whether plane counter i is equal to the number of planes. If plane counter i is equal to the number of planes, process 1500 may continue at operation 1522 below.

If plane counter i is not equal to the number of planes, process 1500 may continue at operation 1516, "Calculate SAD for current block with propagated MV on plane(i)", where the sum of absolute differences for the current block with the propagated motion vector on plane(i) may be calculated.

Process 1500 may continue at operation 1518, "Is resulting SAD less than previously calculated SAD?", where a determination may be made as to whether the resulting sum of absolute differences is less than the previously calculated sum of absolute differences. If the sum of absolute differences is not less than the previously calculated sum of absolute differences, plane counter i may be incremented and process 1500 may continue at operation 1514 above.

If the sum of absolute differences is less than the previously calculated sum of absolute differences, process 1400 may continue at operation 1520, "Set best SAD to SAD and best plane to (i)", where the best sum of absolute differences may be set to the sum of absolute differences and the best plane may be set to plane counter i. Plane counter i may be incremented, and process 1500 may continue at operation 1514 above.

If, at operation 1514 above, plane counter i is equal to the number of planes, process 1500 may continue at operation 1522, "Grab Motion Range and determine search area for current block", where motion range may be grabbed and the search area for the current block may be determined.

Process 1500 may continue at operation 1524, "Do quincunx reduced search +2 vertical, +4 horizontal on previously defined area and best plane", where a quincunx reduced search +2 vertical, +4 horizontal may be performed on the previously defined area and the best plane.

Process 1500 may continue at operation 1526, "Do shifted quincunx reduced search +2 vertical, +4 horizontal only on motion quadrant and a range of 4", where a shifted quincunx reduced search +2 vertical, +4 horizontal may be performed only on motion quadrant and a range of 4.

Process 1500 may continue at operation 1528, "Do exhaustive refinement search for +−2 integer pixels directly to quarter pel and get best plane", where an exhaustive refinement search for +−2 interger pixels directly to quarter pixel accuracy may be performed and the best plane may be gotten.

Process 1500 may continue at operation 1530, "Calculate SAD using neighboring MVs as candidates on best plane", where the sum of absolute differences may be calculated using neighboring motion vectors as candidates on the best plane.

Process 1500 may continue at operation 1532, "Was propagated MV set to zero initially?", where a determination may be made as to whether the propagated motion vector was set to zero initially. If the propagated motion vector was set to zero initially, process 1500 may continue at operation 1544 below.

If, at operation 1532, the propagated motion vector was not set to zero initially, process 1500 may continue at operation 1534, "Do quincunx reduced search +1 vertical, +2 horizontal on +−4 area for MV (0,0) on best plane" where a reduced quincunx search +1 vertical +2 horizontal may be performed on +−4 area for motion vector (0,0) on best plane.

Process 1500 may continue at operation 1536, "Do shifted quincunx reduced search +2 vertical, +4 horizontal only on motion quadrant of previously calculated MV and a range of 32 on best plane", where a shifted quincunx reduced search +2 vertical, +4 horizontal may be performed only on motion quadrant of previously calculated motion vector and a range of 32 on best plane.

Process 1500 may continue at operation 1538, "Do quincunx reduced search +1 vertical, +2 horizontal for +−16 integer pixels directly to quarter pel and get best plane", where a quincunx reduced search +1 vertical, +2 horizontal may be performed for +−16 integer pixels directly to quarter pixel accuracy and the best plane may be gotten.

Process 1500 may continue at operation 1540, "Do exhaustive refinement search for +−1 integer pixels directly to quarter pel and get best plane", where an exhaustive refinement search for +−1 interger pixels directly to quarter pixel accuracy may be performed and the best plane may be gotten.

Process 1500 may continue at operation 1542, "Update SAD, MV and plane accordingly", where the sum of absolute differences, motion vector, and plane may be updated accordingly.

Process 1500 may continue at operation 1544, "Do exhaustive refinement search for +−1 integer pixels directly to quarter pel and get best plane", where an exhaustive refinement search for +−1 integer pixels directly to quarter pixel accuracy may be performed and the best plane may be gotten.

Process 1500 may continue at operation 1546, "Is ⅛ pel needed?", where a determination may be made as to whether ⅛ pixel accuracy is needed. If ⅛ pixel accuracy is not needed, process 1500 may continue at operation 1552 below.

If, at operation 1546, ⅛ pixel accuracy is needed, process 1500 may continue at operation 1548, "Generate the 8 surrounding blocks at ⅛ pel accuracy", where the eight surrounding blocks may be generated at ⅛ pixel accuracy.

Process 1500 may continue at operation 1550, "Calculate SAD for each of the blocks and update MV and SAD accordingly", where the sum of absolute differences may be calculated for each of the blocks and the motion vector and sum of absolute differences may be updated accordingly.

Process 1500 may continue at operation 1552, "Return best MV at defined accuracy level units", where the best motion vector may be returned at defined accuracy level units.

Figure 16:
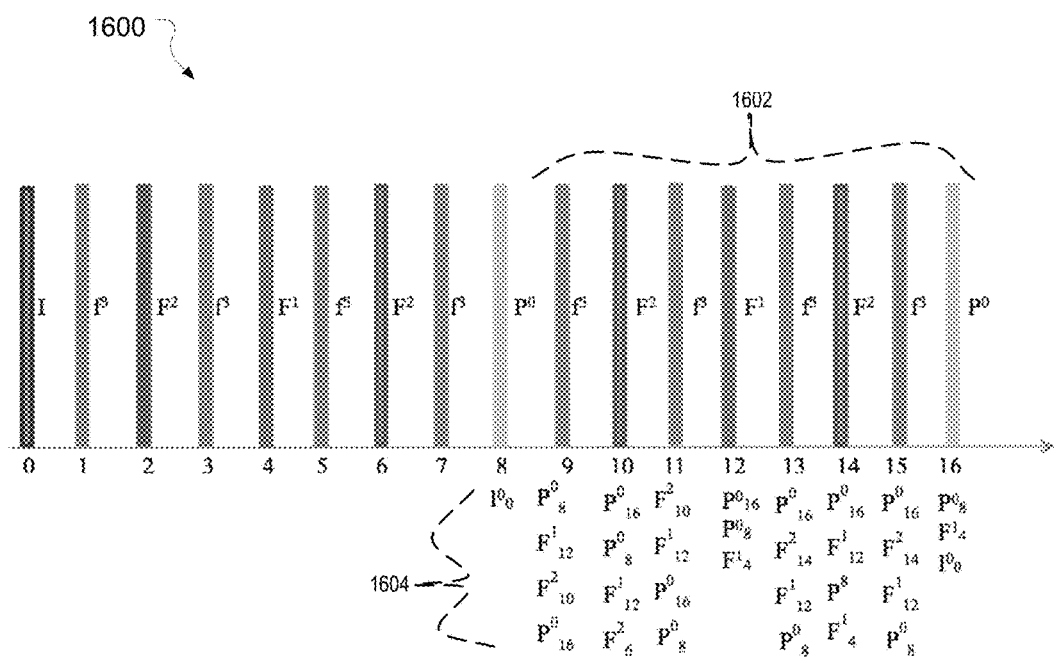
FIG. 16 is an illustrative diagram of a frame sequence with a hierarchical frame structure.

FIG. 16 is an illustrative diagram of a frame sequence with a hierarchical frame structure, arranged in accordance with at least some implementations of the present disclosure. As illustrated, a hierarchy first may be explained with a frame or video sequence 1600. Such a frame sequence may form a repeating pattern 1602 of eight pictures. Each frame or picture is numbered 1-16, in order of display, or more accurately input video, and not in the order of coding, and labeled with a picture type (I, P, F, or f) where capital F indicates the F-picture may be used as a reference frame, and the small f-picture, at least for this figure, is not used as a reference frame. The superscript on the picture type notation indicates which pyramid or hierarchy level or rank the frame resides, thereby indicating the reference frame dependencies also shown by the dependency arrows 1604.

The picture sequence 1600 includes a rank zero (0) and a three level pyramid with ranks 1 to 3 (when not including rank (0) in the pyramid level numbers). The base or rank zero (0) frames may include I-picture 0 (or in other words at time 0), which is a reference frame to P-picture 16, which itself is a reference frame to P-picture 8, all of which are rank zero as shown by their superscripts. Each pattern 1602 has one (rank 1) reference F-picture 4 or 12 in a first level of the hierarchy, two (rank 2) reference F-pictures ((2 and 6) or (10 and 14)) in a second level of the hierarchy, and four non-reference (rank 3) f-pictures (1, 3, 5, 6, or 9, 11, 13, 15) in a third level of the hierarchy. In this example, in the period levels 1 to 3, each frame has a reference from a level that is one lower in rank value, although it need not always be this way. Dependency from a current frame to its reference frame(s) also may jump levels, or may have additional dependencies on the same level. The method and system disclosed herein uses the concept that maximum compression is better approached without significantly sacrificing image quality by using higher compression as a frame is on a level father from the base or rank (0) level.

Figure 17:
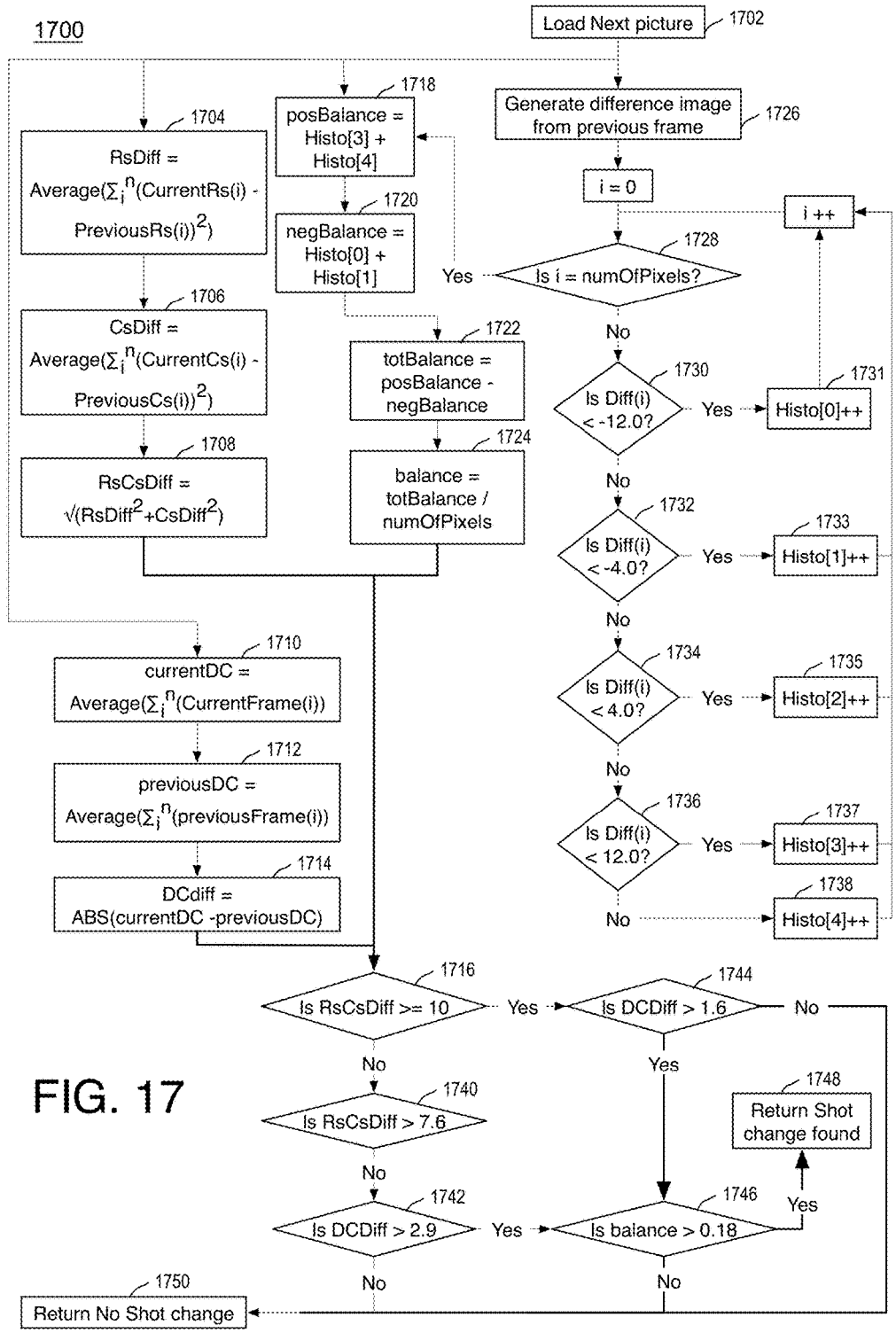
FIG. 17 is a flow diagram illustrating an example stage 3 motion estimation process.

FIG. 17 is a flow diagram illustrating an example stage 3 motion estimation process 1700, arranged in accordance with at least some implementations of the present disclosure. Process 1700 may include one or more operations, functions or actions as illustrated by one or more operations. Process 1700 may form at least part of a next generation video coding process. By way of non-limiting example, process 1700 may form at least part of a next generation video encoding process as undertaken by encoder system 100 of FIG. 1 and/or any other encoder system or subsystems described herein.

Process 1700 may begin at operation 1702, "Load Next picture", where the next picture is loaded.

Process 1700 may continue at operation 1704, "RsDiff=Average($\Sigma_i^n$(CurrentRs(i)−PreviousRs(0)$^2$)", where the calculation RsDiff=Average($\Sigma_i^n$(CurrentRs(i)−PreviousRs(i))$^2$) may be performed.

Process 1700 may continue at operation 1706, "CsDiff=Average($\Sigma_i^n$(CurrentCs(i)−PreviousCs(i))$^2$)", where the calculation CsDiff=Average($\Sigma_i^n$(CurrentCs(i)−PreviousCs(i))$^2$) may be performed.

Process 1700 may continue at operation 1708, "RsCsDiff=√(RsDiff$^2$+CsDiff$^2$)", where the calculation RsCsDiff=√(RsDiff$^2$+CsDiff$^2$) may be performed.

Process 1700 may continue at operation 1710, "currentDC=Average($\Sigma_i^n$(CurrentFrame(i))", where the calculation currentDC=Average($\Sigma_i^n$(CurrentFrame(i)) may be performed.

Process 1700 may continue at operation 1712, "previousDC=Average($\Sigma_i^n$(previousFrame(i))", where the calculation previousDC=Average($\Sigma_i^n$(previousFrame(i)) may be performed.

Process 1700 may continue at operation 1714, "DCdiff=ABS(currentDC−previousDC)", where the calculation DCdiff=ABS(currentDC−previousDC) may be performed.

Process 1700 may continue at operation 1716, "Is RsCsDiff>=10", where a determination may be made as to whether RsCsDiff is greater than or equal to 10. If RcCsDiff is greater than or equal to 10, process 1700 may continue at operation 1744 below. If RsCsDiff is not greater than or equal to ten, process 1700 may continue at operation 1740 below.

Process 1700 may continue at operation 1718, "posBalance=Histo[3]+Histo[4]", where the calculation posBalance=Histo[3]+Histo[4] may be performed.

Process 1700 may continue at operation 1720, "negBalance=Histo[0]+Histo[1]", where the calculation negBalance=Histo[0]+Histo[1] may be performed.

Process 1700 may continue at operation 1722, "totBalance=posBalance−negBalance", where the calculation totBalance=posBalance−negBalance may be performed.

Process 1700 may continue at operation 1724, "balance=totBalance/numOfPixels", where the calculation balance=totBalance/numOfPixels may be performed.

Process 1700 may continue at operation 1726, "Generate difference image from previous frame", where a difference image from a previous frame may be generated. A pixel counter I may be set to zero.

Process 1700 may continue at operation 1728, "Is I=mumOfPixels?", where a determination may be made as to whether pixel counter I is equal to the number of pixels. If pixel counter I is equal to the number of pixels, process 1700 may continue at operation 1718 above. If pixel counter I is not equal to the number of pixels, process 1700 may continue at operation 1730 below.

Process 1700 may continue at operation 1730, "Is Diff(I) <−12?", where a determination may be made as to whether Diff(I) is less than −12. If Diff(I) is less than −12, process 1700 may continue at operation 1731 below. If Diff(I) is not less than −12, process 1700 may continue at operation 1732 below.

Process 1700 may continue at operation 1731, "Histo[0]++", where a counter Histo[0] may be incremented. Pixel counter I may be incremented. Process 1700 may then continue at operation 1728 above.

Process 1700 may continue at operation 1732, "Is Diff(I) <−4?", where a determination may be made as to whether Diff(I) is less than −4. If Diff(I) is less than −4, process 1700 may continue at operation 1733 below. If Diff(I) is not less than −4, process 1700 may continue at operation 1734 below.

Process 1700 may continue at operation 1733, "Histo[1]++", where a counter Histo[1] may be incremented. Pixel counter I may be incremented. Process 1700 may then continue at operation 1728 above.

Process 1700 may continue at operation 1734, "Is Diff(I) <4?", where a determination may be made as to whether Diff(I) is less than 4. If Diff(I) is less than 4, process 1700 may continue at operation 1735 below. If Diff(I) is not less than 4, process 1700 may continue at operation 1736 below.

Process 1700 may continue at operation 1735, "Histo[2]++", where a counter Histo[2] may be incremented. Pixel counter I may be incremented. Process 1700 may then continue at operation 1728 above.

Process 1700 may continue at operation 1736, "Is Diff(I) <12?", where a determination may be made as to whether Diff(I) is less than 12. If Diff(I) is less than 12, process 1700 may continue at operation 1737 below. If Diff(I) is not less than 12, process 1700 may continue at operation 1738 below.

Process 1700 may continue at operation 1737, "Histo [3]++", where a counter Histo[3] may be incremented. Pixel counter I may be incremented. Process 1700 may then continue at operation 1728 above.

Process 1700 may continue at operation 1738, "Histo [4]++", where a counter Histo[4] may be incremented. Pixel counter I may be incremented. Process 1700 may then continue at operation 1728 above.

Process 1700 may continue at operation 1740, "Is RsCsDiff>7.6", where a determination may be made as to whether RsCsDiff is greater than 7.6. If RcCsDiff is greater than 7.6, process 1700 may continue. If RsCsDiff is not greater than 7.6, process 1700 may continue at operation 1742 below.

Process 1700 may continue at operation 1742, "Is DCDiff>2.9", where a determination may be made as to whether DCDiff is greater than 2.9. If DCDiff is greater than 2.9, process 1700 may continue at operation 1746 below. If DCDiff is not greater than 2.9, process 1700 may continue at operation 1750 below.

Process 1700 may continue at operation 1744, "Is DCDiff>1.6", where a determination may be made as to whether DCDiff is greater than 1.6. If DCDiff is greater than 1.6, process 1700 may continue at operation 1746 below. If DCDiff is not greater than 1.6, process 1700 may continue at operation 1750 below.

Process 1700 may continue at operation 1746, "Is balance>0.18", where a determination may be made as to whether balance is greater than 0.18. If balance is greater than 0.18, process 1700 may continue at operation 1748 below. If balance is not greater than 0.018, process 1700 may continue at operation 1750 below Process 1700 may continue at operation 1748, "Return Shot change found", where shot change found may be returned.

Process 1700 may continue at operation 1750, "Return No Shot change", where no shot change may be returned.

Figure 18:
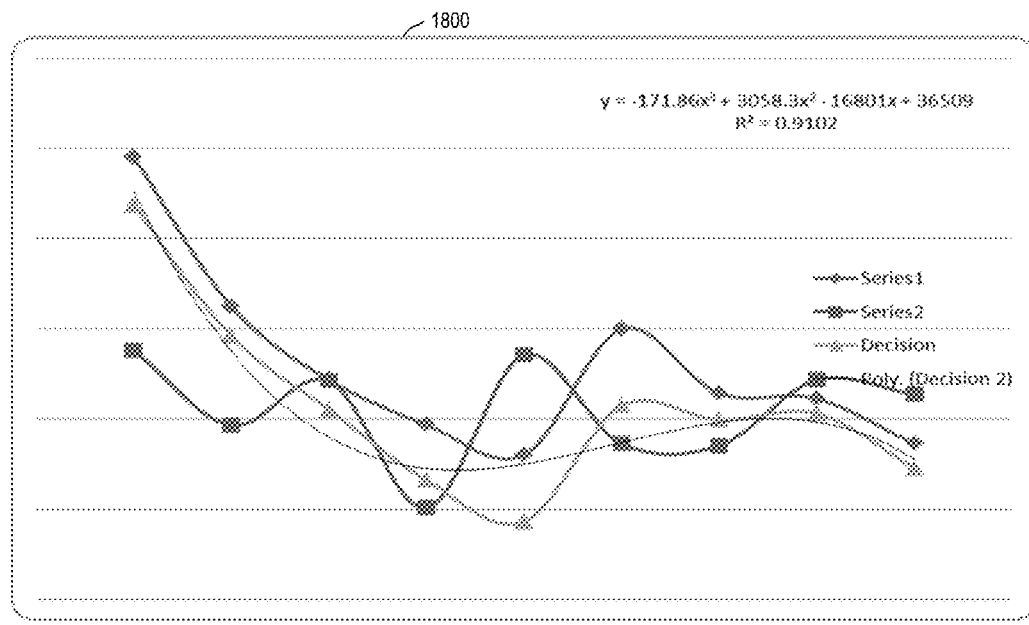
FIG. 18 is a diagram illustrating an example decision line for shot change determination.

FIG. 18 is a diagram illustrating an example decision line for shot change determination, arranged in accordance with at least some implementations of the present disclosure. Once the gain information is available, shot change may be determined by testing for four conditions that have to be met for a shot change to occur. One such condition is illustrated in chart 1800. Chart 1800 shows a diamond-shape plot illustrating instances of frames where a shot change has occurred, a square-shape plot illustrating instances of frames where no shot change has occurred, a triangle-shape plot illustrating a coarse decision line indicating where a shot change determination may be made with some confidence, and a plot illustrating a smoothed decision line indicating where a shot change determination may be made with some confidence.

In this example, chart 1800 illustrates an example relationship between a difference between current and previous frame motion vector difference value (diffMVdiffVal) in relationship with the Spatio Temporal index (tscIndex). The relationship between tscIndex and diffMVdiffVal is then represented in the equation on chart 1800, where diffMVdiffVal has to be bigger than "y", and to calculate "y" tscIndex is the x value for the equation. In this example, for the condition to be met the difference between current and previous frame motion vector difference value (diffMVdiffVal) in relationship with the Spatio Temporal index (tscIndex) has to be bigger, as shown by curve of FIG. 18.

Figure 19:
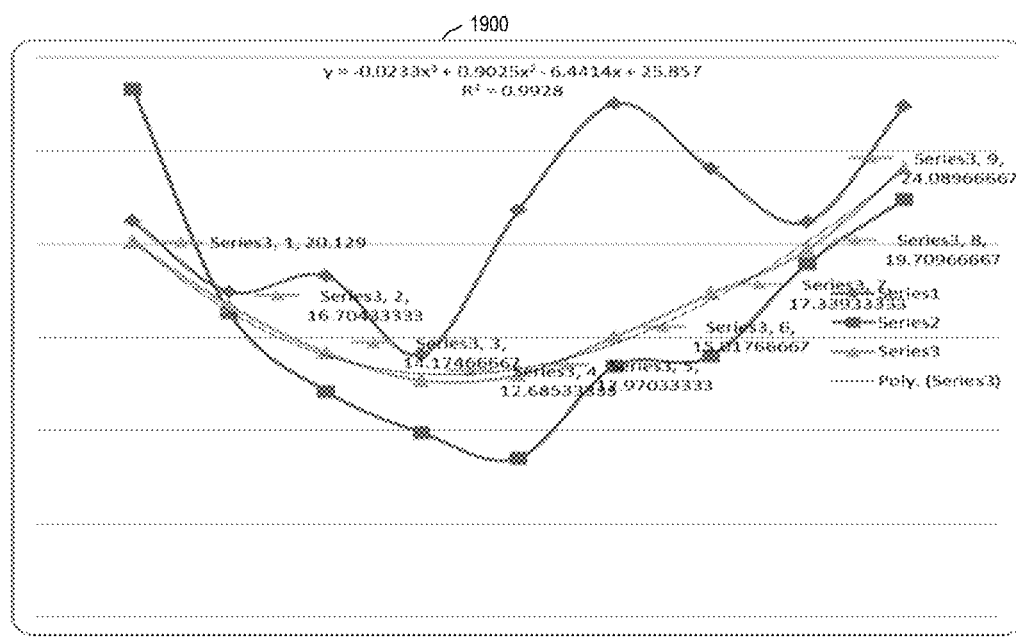
FIG. 19 is a diagram illustrating an example decision line for shot change determination.

FIG. 19 is a diagram illustrating an example decision line for shot change determination, arranged in accordance with at least some implementations of the present disclosure. Once the gain information is available, shot change may be determined by testing for four conditions that have to be met for a shot change to occur. One such condition is illustrated in chart 1900. Chart 1900 shows a diamond-shape plot illustrating instances of frames where a shot change has occurred, a square-shape plot illustrating instances of frames where no shot change has occurred, a triangle-shape plot illustrating a coarse decision line indicating where a shot change determination may be made with some confidence, and a plot illustrating a smoothed decision line indicating where a shot change determination may be made with some confidence.

In this example, chart 1900 illustrates an example relationship between between tscIndex and the difference value between average frame difference differential (AFDdiff). The relationship is then represented in the equation on chart 1900.

Figure 20:
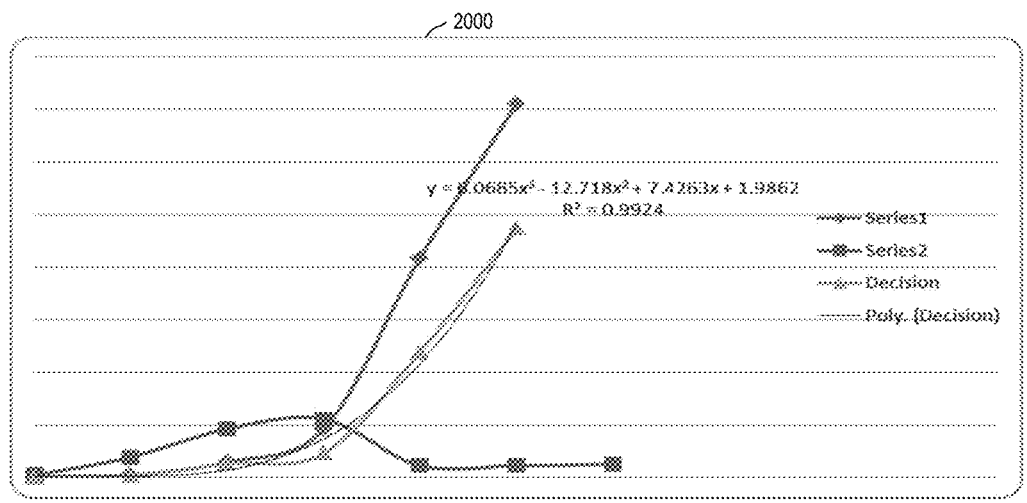
FIG. 20 is a diagram illustrating an example decision line for shot change determination.

FIG. 20 is a diagram illustrating an example decision line for shot change determination, arranged in accordance with at least some implementations of the present disclosure. Once the gain information is available, shot change may be determined by testing for four conditions that have to be met for a shot change to occur. One such condition is illustrated in chart 2000. Chart 2000 shows a diamond-shape plot illustrating instances of frames where a shot change has occurred, a square-shape plot illustrating instances of frames where no shot change has occurred, a triangle-shape plot illustrating a coarse decision line indicating where a shot change determination may be made with some confidence, and a plot illustrating a smoothed decision line indicating where a shot change determination may be made with some confidence.

In this example, chart 2000 illustrates an example relationship between the Spatial complexity (SC) and the difference value between the RsCs difference between current and previous frames. The relationship is represented in the equation on chart 2000.

Figure 21:
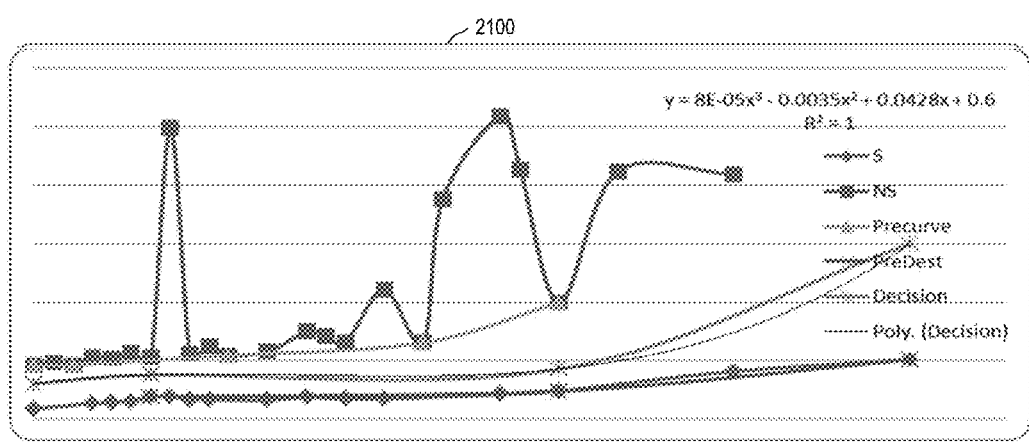
FIG. 21 is a diagram illustrating an example decision line for shot change determination.

FIG. 21 is a diagram illustrating an example decision line for shot change determination, arranged in accordance with at least some implementations of the present disclosure. Once the gain information is available, shot change may be determined by testing for four conditions that have to be met for a shot change to occur. One such condition is illustrated in chart 2100. Chart 2100 shows a diamond-shape plot illustrating instances of frames where a shot change has occurred, a square-shape plot illustrating instances of frames where no shot change has occurred, a triangle-shape plot illustrating a coarse decision line indicating where a shot change determination may be made with some confidence, and a plot illustrating a smoothed decision line indicating where a shot change determination may be made with some confidence.

In this example, chart 2100 illustrates an example relationship between between current SC and current AFD with respect to the SC index and TSC index. Chart 2100 requires that the ratio between current SC and current AFD is less than the multiplication of SC index and TSC index. The relationship is represented in the equation on chart 2100.

Figure 22:
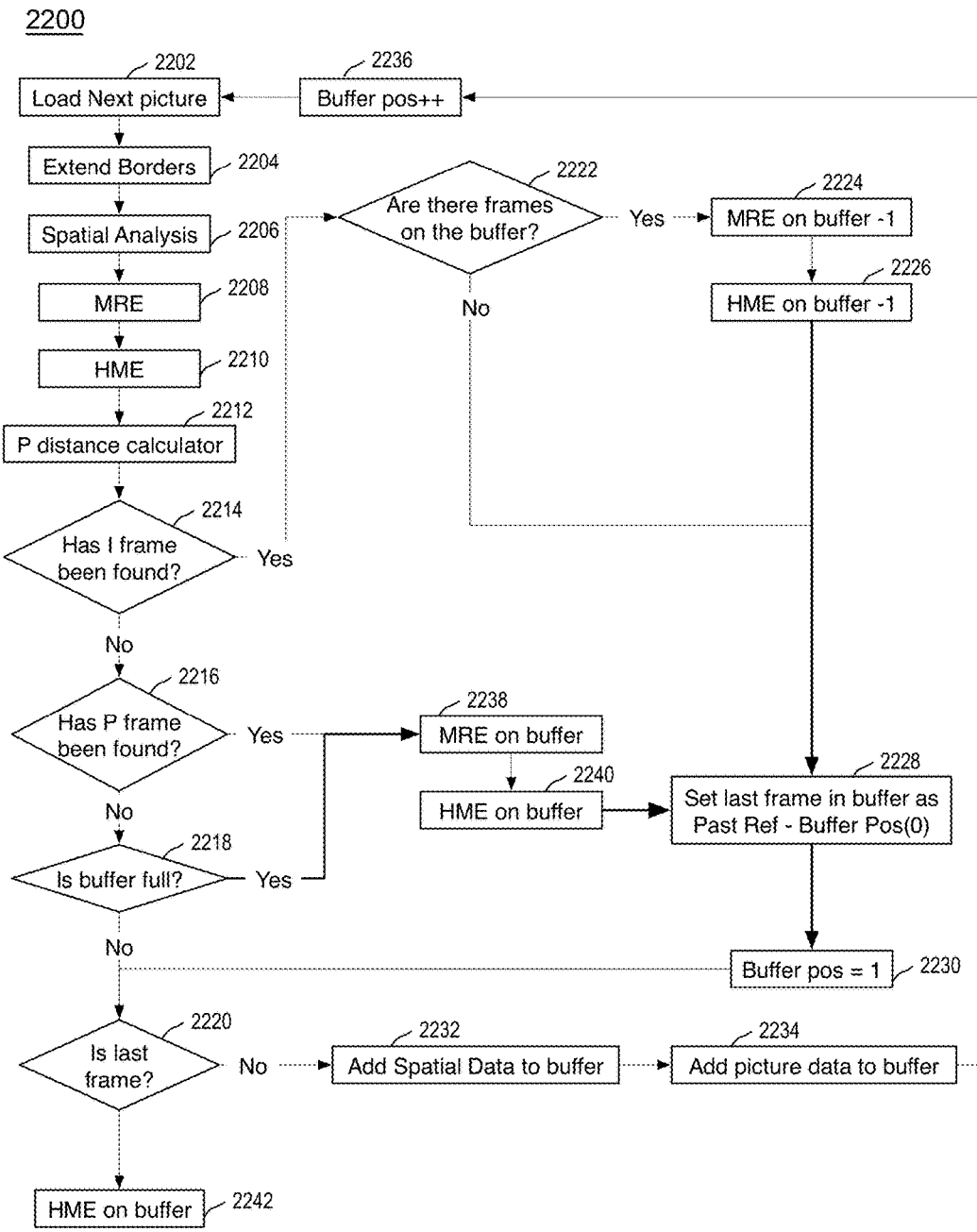
FIG. 22 is a flow diagram illustrating an example hierarchical motion estimation process

FIG. 22 is a flow diagram illustrating an example hierarchical motion estimation process 2200, arranged in accordance with at least some implementations of the present disclosure. Process 2200 may include one or more operations, functions or actions as illustrated by one or more operations. Process 2200 may form at least part of a next generation video coding process. By way of non-limiting example, process 2200 may form at least part of a next generation video encoding process as undertaken by encoder system 100 of FIG. 1 and/or any other encoder system or subsystems described herein.

Process 2200 may begin at operation 2202, "Load Next picture", where the next picture may be loaded.

Process 2200 may continue at operation 2204, "Extend Borders", where borders may be extended.

Process 2200 may continue at operation 2206, "Spatial Analysis", where spatial analysis may be performed.

Process 2200 may continue at operation 2208, "MRE", where motion range estimation may be performed.

Process 2200 may continue at operation 2210, "HME", where hierarchical motion estimation may be performed.

Process 2200 may continue at operation 2212, "P distance calculator", where p distance calculation may be performed.

Process 2200 may continue at operation 2214, "Has I frame been found?", where a determination may be made as to whether an I frame has been found. If an I frame has been found, process 2200 may continue at operation 2222 below. If an I frame has not been found, process 2200 may continue at operation 2216 below.

Process 2200 may continue at operation 2216, "Has P frame been found?", where a determination may be made as to whether a P frame has been found. If a P frame has been found, process 2200 may continue at operation 2236 below. If a P frame has not been found, process 2200 may continue at operation 2218 below.

Process 2200 may continue at operation 2218, "Is buffer full?", where a determination may be made as to whether the buffer is full. If the buffer is full, process 2200 may continue at operation 2236 below. If the buffer is not full, process 2200 may continue at operation 2220 below.

Process 2200 may continue at operation 2220, "Is last frame?", where a determination may be made as to whether the frame is the last frame. If the frame is the last frame, process 2200 may continue at operation 2242 below. If the frame is not the last frame, process 2200 may continue at operation 2232 below.

Process 2200 may continue at operation 2222, "Are there frames on the buffer?", where a determination is made as to whether there are frames on the buffer. If there are frames on the buffer, process 2200 may continue at operation 2224 below. If there are no frames on the buffer, process 2200 may continue at operation 2228 below.

Process 2200 may continue at operation 2224, "MRE on buffer−1", where motion range estimation may be performed on the previous buffer.

Process 2200 may continue at operation 2226, "HME on buffer−1", where hierarchical motion estimation may be performed on the previous buffer.

Process 2200 may continue at operation 2228, "Set last frame in buffer as Past Ref−Buffer Pos(0)", where the last frame in the buffer may be set to Past Ref−Buffer Pos(0).

Process 2200 may continue at operation 2230, "Buffer pos=1", where the buffer position may be set to equal one. Process 2200 may then continue at operation 2220 above.

Process 2200 may continue at operation 2232, "Add Spatial Data to buffer", where the spatial data may be added to the buffer.

Process 2200 may continue at operation 2234, "Add picture data to buffer", where the picture data may be added to the buffer.

Process 2200 may continue at operation 2236, "Buffer pos++", where the buffer position may be incremented, Process 2200 may then continue at operation 2202 above.

Process 2200 may continue at operation 2242, "HME on buffer", where hierarchical motion estimation may be performed on the buffer.

Figure 23:
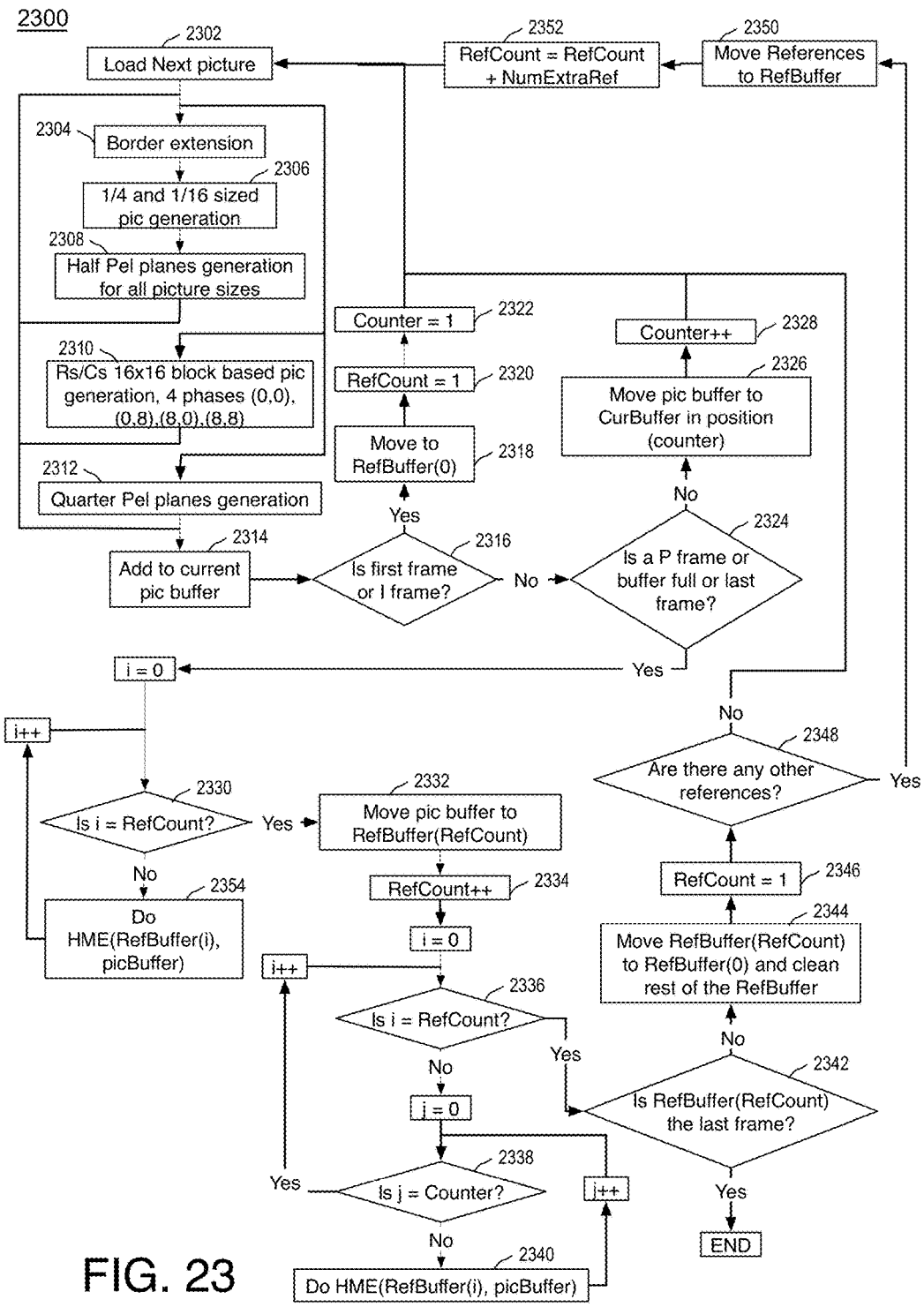
FIG. 23 is a flow diagram illustrating another example hierarchical motion estimation process.

FIG. 23 is a flow diagram illustrating another example hierarchical motion estimation process 2300, arranged in accordance with at least some implementations of the present disclosure. Process 2300 may include one or more operations, functions or actions as illustrated by one or more operations. Process 2300 may form at least part of a next generation video coding process. By way of non-limiting example, process 2300 may form at least part of a next generation video encoding process as undertaken by encoder system 100 of FIG. 1 and/or any other encoder system or subsystems described herein.

Process 2300 may begin at operation 2302, "Load Next picture", where the next picture is loaded.

Process 2300 may continue at operation 2304, "Border extenstion", where borders may be extended.

Process 2300 may continue at operation 2306, "¼ and ¹⁄₁₆ sized pic generation", where ¼ and ¹⁄₁₆ sized pictures may be generated.

Process 2300 may continue at operation 2308, "Half pel planes generation for all picture sizes", where half pixel planes generation may be performed for all picture sizes. Process 2300 may then continue at operation 2314 below.

Process 2300 may continue at operation 2310, "Rs/Cs 16×16 block based pic generation, 4 phases (0,0), (0,8), (8,0), (8,8)", where Rs/Cs 16×16 block based pictures may be generated in 4 phases of (0,0), (0,8), (8,0), (8,8). Process 2300 may then continue at operation 2314 below.

Process 2300 may continue at operation 2312, "Quarter pel planes generation", where quarter pixel planes may be generated.

Process 2300 may continue at operation 2314, "Add to current pic buffer", where the current picture buffer may be added to.

Process 2300 may continue at operation 2316, "Is first frame or I frame?", where a determination may be made as to whether the frame is the first frame or an I frame. If the frame is the first frame or an I frame, process 2300 may continue at operation 2318 below. If the frame is not the first frame or an I frame, process 2300 may continue at operation 2324 below.

Process 2300 may continue at operation 2318, "Move to RefBuffer(0)", where the frame may be moved to RefBuffer (0).

Process 2300 may continue at operation 2320, "Ref-Count=1", where a reference counter RefCount may be set to equal one.

Process 2300 may continue at operation 2322, "Counter=1", where a counter may be set to equal one. Process 2300 may then continue at operation 2302 above.

Process 2300 may continue at operation 2324, "Is a P frame or buffer full or last frame?", where a determination may be made as to whether the frame is a P frame or the buffer is full or the frame is the last frame. If the frame is a P frame or the buffer is full or the frame is the last frame, process 2300 may continue at operation 2330 and a counter i may be set to zero. If the frame is not a P frame and the buffer is not full and the frame is not the last frame, process 2300 may continue at operation 2326 below.

Process 2300 may continue at operation 2326, "Move pic buffer to CurBuffer in position (counter)", where the picture buffer may be moved to CurBuffer in position (counter).

Process 2300 may continue at operation 2328, "Counter++", where the counter may be incremented. Process 2300 may then continue at operation 2302 above.

Process 2300 may continue at operation 2330, "Is i=RefCount?", where a determination may be made as to whether counter i is equal to RefCount. If counter i is equal to RefCount, process 2300 may continue at operation 2332 below. If counter i is not equal to RefCount, process 2300 may continue at operation 2354 below.

Process 2300 may continue at operation 2332, "Move pic buffer to RefBuffer(RefCount)", where the picture buffer may be moved to RefBuffer(RefCount).

Process 2300 may continue at operation 2334, "Ref-Count++", where RefCount may be incremented. Counter i may be set to zero.

Process 2300 may continue at operation 2336, "Is i=RefCount?", where a determination may be made as to whether counter i is equal to RefCount. If counter i is equal to RefCount, process 2300 may continue at operation 2342 below. If counter i is not equal to RefCount, a counter j may be set to zero and process 2300 may continue at operation 2338 below.

Process 2300 may continue at operation 2338, "Is j=Counter?", where a determination may be made as to whether counter j is equal to Counter. If counter j is equal to Counter, counter i may be incremented and process 2300 may continue at operation 2336 above. If counter j is not equal to Counter, process 2300 may continue at operation 2340 below.

Process 2300 may continue at operation 2340, "Do HME (RefBuffer(i), picBuffer)", where hierarchical motion estimation may be performed on RefBuffer(i), picBuffer. Counter j may be incremented. Process 2300 may then continue at operation 2336 above.

Process 2300 may continue at operation 2342, "Is RefBuffer(RefCount) the last frame?", where a determination may be made as to whether RefBuffer(RefCount) is the last frame. If RefBuffer(RefCount) is the last frame, process 2300 may conclude. If RefBuffer(RefCount) is not the last frame, process 2300 may continue at operation 2344 below.

Process 2300 may continue at operation 2344, "Move RefBuffer(RefCount) to RefBuffer(0) and clean rest of the RefBuffer", where RefBuffer(RefCount) may be moved to RefBuffer(0) and the rest of the RefBuffer may be cleaned.

Process 2300 may continue at operation 2346, "Ref-Count=1", where RefCount may be set to equal one.

Process 2300 may continue at operation 2348, "Are there any other references?", where a determination may be made as to whether there are any other references. If there are any other references, process 2300 may continue at operation 2350 below. If there are not any other references, process 2300 may continue at operation 2302 above.

Process 2300 may continue at operation 2350, "Move References to RefBuffer", where references may be moved to RefBuffer.

Process 2300 may continue at operation 2352, "RefCount=RefCount+NumExtraRef", where RefCount may be incremented by the number of extra references. Process 2300 may then continue at operation 2302 above.

Process 2300 may continue at operation 2354, "Do HME (Refbuffer(i), picBuffer)", where hierarchical motion estimation may be performed on RefBuffer(i), picBuffer.

Figure 24:
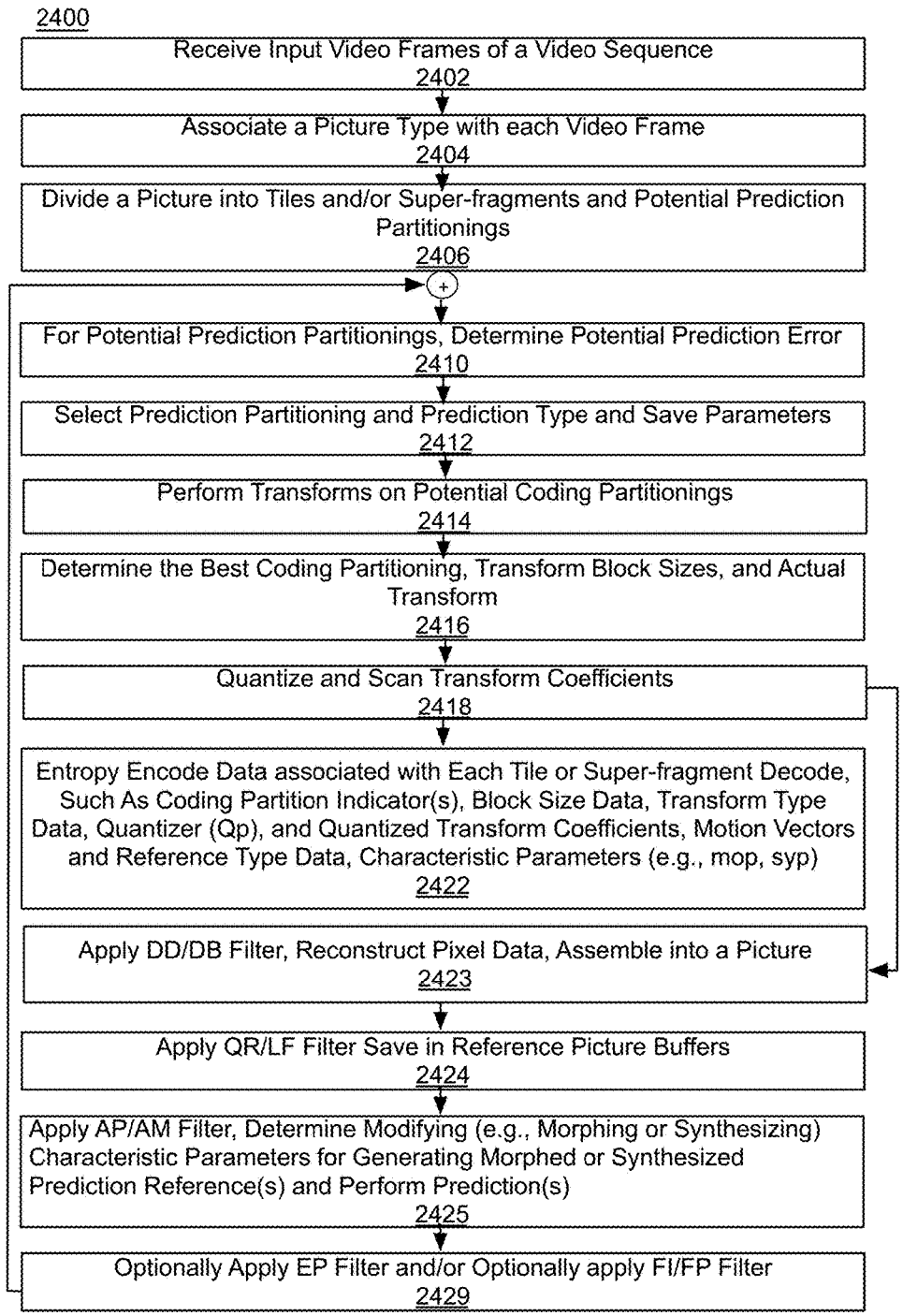
FIG. 24 is a flow diagram illustrating an example encoding process.

FIG. 24 is a flow diagram illustrating an example process 2400, arranged in accordance with at least some implementations of the present disclosure. Process 2400 may include one or more operations, functions or actions as illustrated by one or more operations. Process 2400 may form at least part of a next generation video coding process. By way of non-limiting example, process 2400 may form at least part of a next generation video encoding process as undertaken by encoder system 100 of FIG. 1 and/or any other encoder system or subsystems described herein.

Process 2400 may begin at operation 2402, "Receive Input Video Frames of a Video Sequence", where input video frames of a video sequence may be received via encoder 100 for example.

Process 2400 may continue at operation 2404, "Associate a Picture Type with each Video Frame", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein that may be performed on a frame or picture of a group of pictures and the processing may be repeated for all frames or pictures of a group and then repeated for all groups of pictures in a video sequence.

Process 2400 may continue at operation 2406, "Divide a Picture into Tiles and/or Super-fragments and Potential Prediction Partitionings", where a picture may be divided into tiles or super-fragments and potential prediction partitions via prediction partitions generator 105 for example.

Process 2400 may continue at operation 2410, "For Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 2400 may continue at operation 2412, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 2400 may continue at operation 2414, "Perform Transforms on Potential Coding Partitionings", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 2400 may continue at operation 2416, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 2400 may continue at operation 2418, "Quantize and Scan Transform Coefficients", where transform coefficients associated with coding partitions (and/or transform blocks) may be quantized and scanned in preparation for entropy coding.

Process 2400 may continue at operation 2422, "Entropy Encode Data associated with Each Tile or Super-fragment Decode, Such As Coding Partition Indicator(s), Block Size Data, Transform Type Data, Quantizer (Qp), and Quantized Transform Coefficients, Motion Vectors and Reference Type Data, Characteristic Parameters (e.g., mop, syp)", where data may be entropy encoded. For example, the entropy encoded data may include the coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 2400 may continue at operation 2423 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 2400 may continue at operation 2424 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 2400 may continue at operation 2425, "Apply AP/AM Filter, Determine Modifying (e.g., Morphing or Synthesizing) Characteristic Parameters for Generating Morphed or Synthesized Prediction Reference(s) and Perform Prediction(s)", where, modifying (e.g., morphing or synthesizing) characteristic parameters and prediction(s) may be performed and adaptive motion filtering or adaptive precision filtering (e.g., AP/AM Filter) may be applied. For example, modifying (e.g., morphing or synthesizing) characteristic parameters for generating morphed or synthesized prediction reference(s) may be generated and prediction(s) may be performed. Additionally, adaptive motion filtering or adaptive precision filtering may be applied at this point in the process.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to nine reference types may be supported in P-pictures, and up to ten reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 2012) may include a frame reference, morphing parameters, or synthesizing parameters associated with the prediction partition.

Process 2400 may continue at operation 2429 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Operations 2402 through 2429 may provide for video encoding and bitstream transmission techniques, which may be employed by an encoder system as discussed herein.

FIG. 25 illustrates an example bitstream 2500, arranged in accordance with at least some implementations of the present disclosure. In some examples, bitstream 2500 may correspond to output bitstream 111 as shown in FIG. 1 and/or input bitstream 201 as shown in FIG. 2. Although not shown in FIG. 25 for the sake of clarity of presentation, in some examples bitstream 2500 may include a header portion and a data portion. In various examples, bitstream 2500 may include data, indicators, index values, mode selection data, or the like associated with encoding a video frame as discussed herein.

As discussed, bitstream 2500 may be generated by an encoder such as, for example, encoder 100 and/or received by a decoder 200 for decoding such that decoded video frames may be presented via a display device.

FIG. 26 is a flow diagram illustrating an example process 2600, arranged in accordance with at least some implementations of the present disclosure. Process 2600 may include one or more operations, functions or actions as illustrated by one or more operations. Process 2600 may form at least part of a next generation video coding process. By way of non-limiting example, process 2600 may form at least part of a next generation video decoding process as undertaken by decoder system 200 and/or any other decoder system or subsystems described herein.

Process 2600 may begin at operation 2602, "Receive Encoded Bitstream", where a bitstream may be received. For example, a bitstream encoded as discussed herein may be received at a video decoder. In some examples, bitstream 2500 may be received via decoder 200.

Process 2600 may continue at operation 2604, "Decode the Entropy Encoded Bitstream to Determine Coding Partition Indicator(s), Block Size Data, Transform Type Data, Quantizer (Qp), Quantized Transform Coefficients, Motion Vectors and Reference Type Data, Characteristic Parameters (e.g., mop, syp)", where the bitstream may be decoded to determine coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 2600 may continue at operation 2606, "Apply Quantizer (Qp) on Quantized Coefficients to Generate Inverse Quantized Transform Coefficients", where quantizer (Qp) may be applied to quantized transform coefficients to generate inverse quantized transform coefficients. For example, operation 2606 may be applied via adaptive inverse quantize module 203.

Process 2600 may continue at operation 2608, "On each Decoded Block of Coefficients in a Coding (or Intra Predicted) Partition Perform Inverse Transform based on Transform Type and Block Size Data to Generate Decoded Prediction Error Partitions", where, on each decode block of transform coefficients in a coding (or intra predicted) partition, an inverse transform based on the transform type and block size data may be performed to generate decoded prediction error partitions. In some examples, the inverse transform may include an inverse fixed transform. In some examples, the inverse transform may include an inverse content adaptive transform. In such examples, performing the inverse content adaptive transform may include determining basis functions associated with the inverse content adaptive transform based on a neighboring block of decoded video data, as discussed herein. Any forward transform used for encoding as discussed herein may be used for decoding using an associated inverse transform. In some examples, the inverse transform may be performed by adaptive inverse transform module 204. In some examples, generating the decoded prediction error partitions may also include assembling coding partitions via coding partitions assembler 205.

Process 2600 may continue at operation 2623 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 2600 may continue at operation 2624 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 2600 may continue at operation 2625, "Apply AP/AM Filter, Use Decoded Modifying Characteristics (e.g., mop, syp) to Generate Modified References for Prediction and Use Motion Vectors and Reference Info, Predicted Partition Info, and Modified References to Generate Predicted Partition", where modified references for prediction may be generated and predicted partitions may be generated as well, and where adaptive motion filtering or adaptive precision filtering (e.g., AP/AM Filter) may be applied. For example, where modified references for prediction may be generated based at least in part on decoded modifying characteristics (e.g., mop, syp) and predicted partitions may be generated based at least in part on motion vectors and reference information, predicted partition information, and modified references. Additionally, adaptive motion filtering or adaptive precision filtering may be applied at this point in the process.

Process 2600 may continue at operation 2629 "Optionally Apply EP Filter and/or Optionally apply FI/FP Filter", where enhanced predicted partition (e.g., EP Filtering) or FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

In implementations where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 2600 may continue at operation 2630, "Add Prediction Partition to the Decoded Prediction Error Data Partition to Generate a Reconstructed Partition", where a prediction partition may be added to the decoded prediction error data partition to generate a reconstructed prediction partition. For example, the decoded prediction error data partition may be added to the associated prediction partition via adder 206.

Process 2600 may continue at operation 2632, "Assemble Reconstructed Partitions to Generate a Tile or Super-Fragment", where the reconstructed prediction partitions may be assembled to generate tiles or super-fragments. For example, the reconstructed prediction partitions may be assembled to generate tiles or super-fragments via prediction partitions assembler module 207.

Process 2600 may continue at operation 2634, "Assemble Tiles or Super-Fragments of a Picture to Generate a Full Decoded Picture", where the tiles or super-fragments of a picture may be assembled to generate a full decoded picture. For example, after optional deblock filtering and/or quality restoration filtering, tiles or super-fragments may be assembled to generate a full decoded picture, which may be stored via decoded picture buffer 210 and/or transmitted for presentment via a display device after processing via adaptive picture re-organizer module 217 and content post-restorer module 218.

Various components of the systems described herein may be implemented in software, firmware, and/or hardware and/or any combination thereof. For example, various components of system 300 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

Some additional and/or alternative details related to process 2400, 2600 and other processes discussed herein may be illustrated in one or more examples of implementations discussed herein and, in particular, with respect to FIG. 27 below.

Figure 27B:
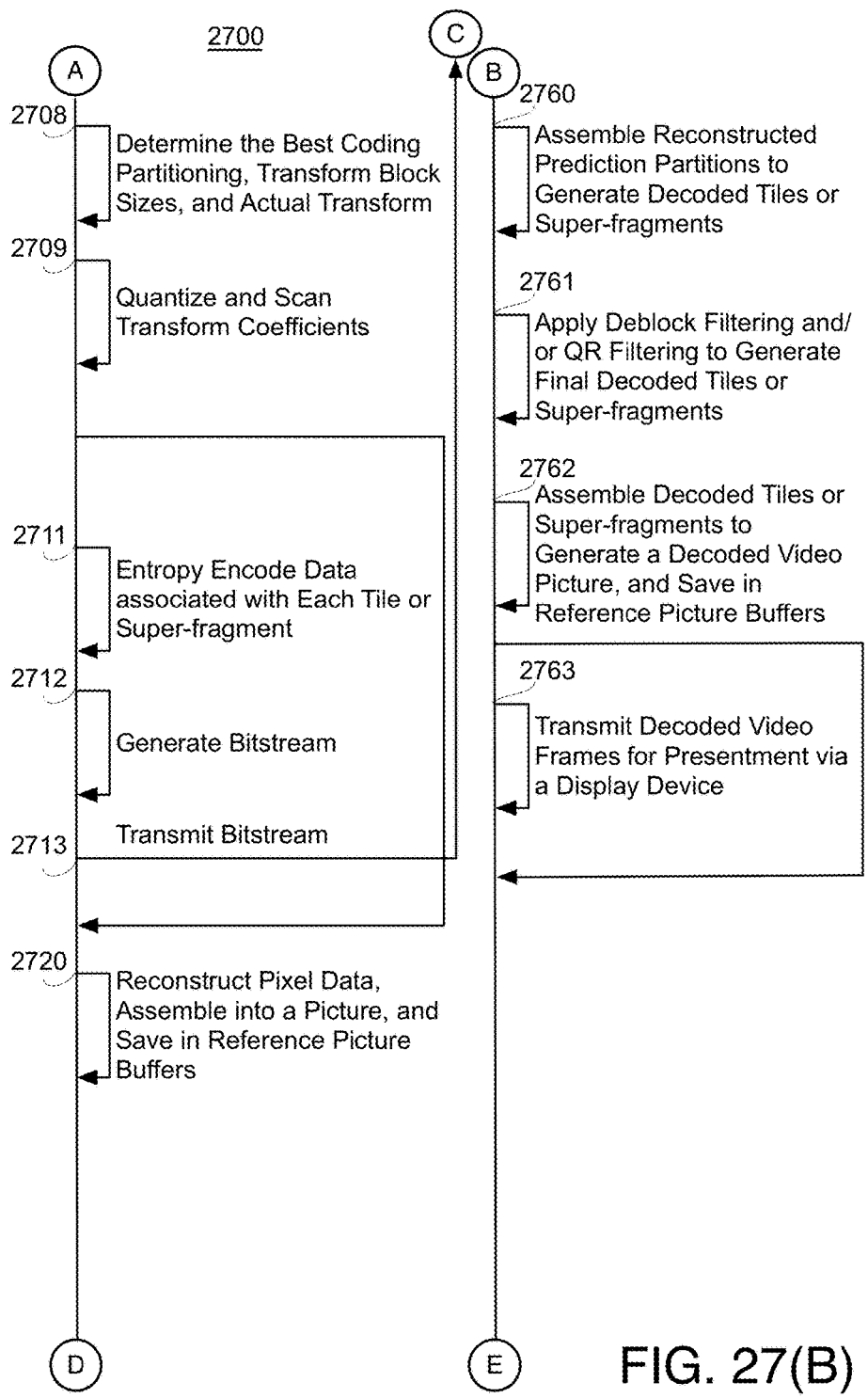
Figure 27C:
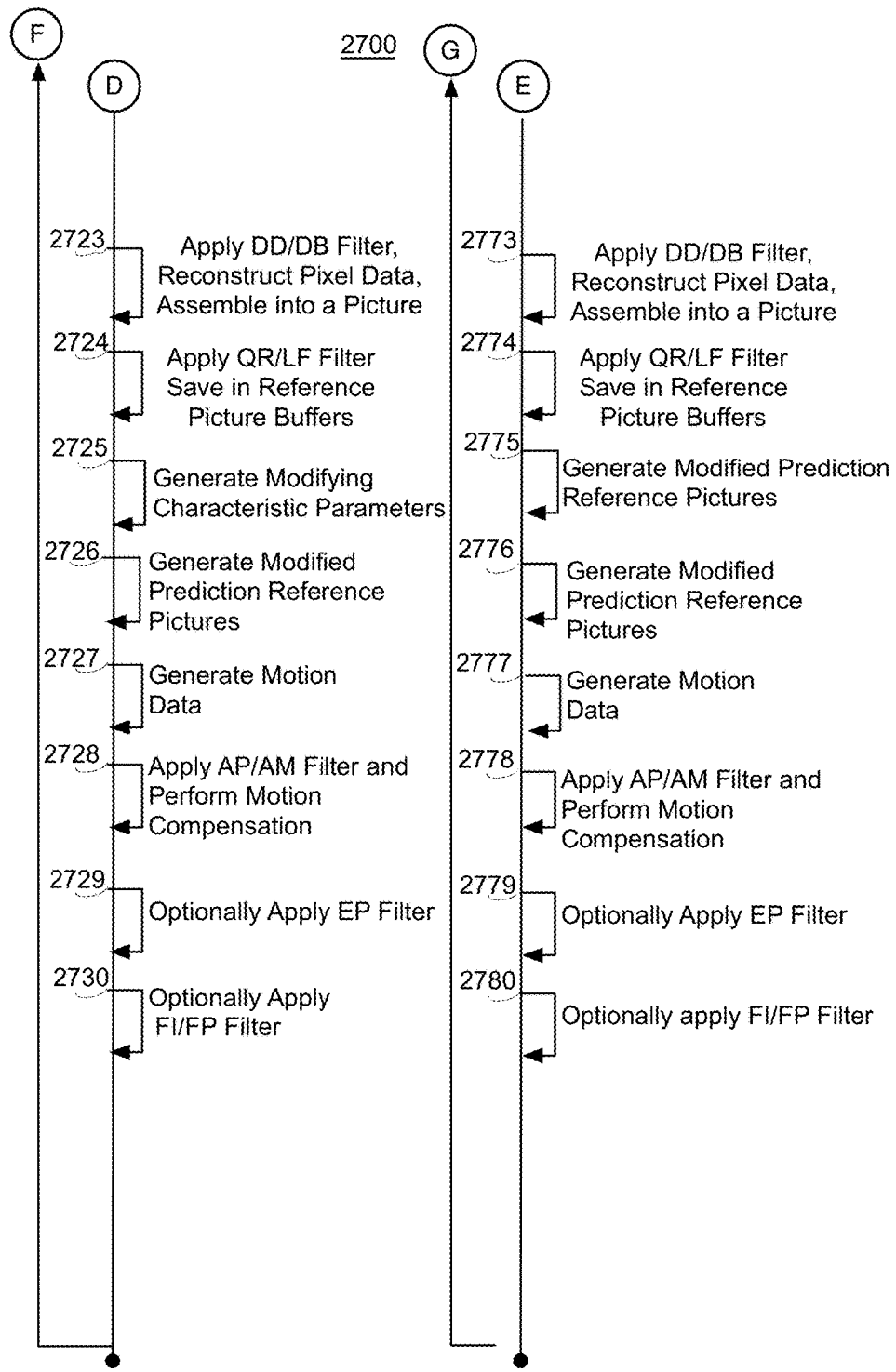

FIGS. 27(A), 27(B), and 27(C) provide an illustrative diagram of an example video coding system 2900 and video coding process 2700 in operation, arranged in accordance with at least some implementations of the present disclosure. In the illustrated implementation, process 2700 may include one or more operations, functions or actions as illustrated by one or more of actions 2701 through 2780. By way of non-limiting example, process 2700 will be described herein with reference to example video coding system 2900 including encoder 100 of FIG. 1 and decoder 200 of FIG. 2, as is discussed further herein below with respect to FIG. 29. In various examples, process 2700 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

In the illustrated implementation, video coding system 2900 may include logic circuitry 2950, the like, and/or combinations thereof. For example, logic circuitry 2950 may include encoder system 100 of FIG. 1 and/or decoder system 200 of FIG. 2 and may include any modules as discussed with respect to any of the encoder systems or subsystems described herein and/or decoder systems or subsystems described herein. Although video coding system 2900, as shown in FIGS. 27(A)-(C) may include one particular set of blocks or actions associated with particular modules, these blocks or actions may be associated with different modules than the particular modules illustrated here. Although process 2700, as illustrated, is directed to encoding and decoding, the concepts and/or operations described may be applied to encoding and/or decoding separately, and, more generally, to video coding.

Process 2700 may begin at operation 2701, "Receive Input Video Frames of a Video Sequence", where input video frames of a video sequence may be received via encoder 100 for example.

Process 2700 may continue at operation 2702, "Associate a Picture Type with each Video Frame in a Group of Pictures", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 2703 through 2711) may be performed on a frame or picture of a group of pictures and the processing may be repeated for all frames or pictures of a group and then repeated for all groups of pictures in a video sequence.

Process 2700 may continue at operation 2703, "Divide a Picture into Tiles and/or Super-fragments and Potential Prediction Partitionings", where a picture may be divided into tiles or super-fragments and potential prediction partitions via prediction partitions generator 105 for example.

Process 2700 may continue at operation 2704, "For Each Potential Prediction Partitioning, Perform Prediction(s) and Determine Prediction Parameters", where, for each potential prediction partitionings, prediction(s) may be performed and prediction parameters may be determined. For example, a range of potential prediction partitionings (each having various prediction partitions) may be generated and the associated prediction(s) and prediction parameters may be determined. For example, the prediction(s) may include prediction(s) using characteristics and motion based multi-reference predictions or intra-predictions.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to 9 reference types may be supported in P-pictures, and up to 10 reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, and the bitstream (discussed below with respect to operation 2712) may include a frame reference, morphing parameters, or synthesizing parameters associated with the prediction partition.

Process 2700 may continue at operation 2705, "For Each Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 2700 may continue at operation 2706, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 2700 may continue at operation 2707, "Perform Fixed or Content Adaptive Transforms with Various Block Sizes on Various Potential Coding Partitionings of Partition Prediction Error Data", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 2700 may continue at operation 2708, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 2700 may continue at operation 2709, "Quantize and Scan Transform Coefficients", where transform coefficients associated with coding partitions (and/or transform blocks) may be quantized and scanned in preparation for entropy coding.

Process 2700 may continue at operation 2711, "Entropy Encode Data associated with Each Tile or Super-fragment", where data associated with each tile or super-fragment may be entropy encoded. For example, data associated with each tile or super-fragment of each picture of each group of pictures of each video sequence may be entropy encoded. The entropy encoded data may include the prediction partitioning, prediction parameters, the selected coding partitioning, the selected characteristics data, motion vector data, quantized transform coefficients, filter parameters, selection data (such as mode selection data), and indictors.

Process 2700 may continue at operation 2712, "Generate Bitstream" where a bitstream may be generated based on the entropy encoded data. As discussed, in some examples, the bitstream may include a frame or picture reference, morphing parameters, or synthesizing parameters associated with a prediction partition.

Process 2700 may continue at operation 2713, "Transmit Bitstream", where the bitstream may be transmitted. For example, video coding system 2900 may transmit output bitstream 111, bitstream 2500, or the like via an antenna 2902 (please refer to FIG. 29).

Process 2700 may continue at operation 2720, "Reconstruct Pixel Data, Assemble into a Picture, and Save in Reference Picture Buffers", where pixel data may be reconstructed, assembled into a picture, and saved in reference picture buffers. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture. The picture may be saved in decoded picture buffer 119 as a reference picture for prediction of other (e.g., following) pictures.

Process 2700 may continue at operation 2723 "Apply DD/DB Filter, Reconstruct Pixel Data, Assemble into a Picture", where deblock filtering (e.g., DD or DB filters) may be applied, pixel data may be reconstructed, and assembled into a picture. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture.

Process 2700 may continue at operation 2724 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in decoded picture buffer 119 as a reference picture for prediction of other (e.g., following) pictures.

Process 2700 may continue at operation 2725, "Generate Modifying Characteristic Parameters", where, modified characteristic parameters may be generated. For example, a second modified prediction reference picture and second modifying characteristic parameters associated with the second modified prediction reference picture may be generated based at least in part on the second decoded prediction reference picture, where the second modified reference picture may be of a different type than the first modified reference picture.

Process 2700 may continue at operation 2726, "Generate Modified Prediction Reference Pictures", where modified prediction reference pictures may be generated, for example, a first modified prediction reference picture and first modifying characteristic parameters associated with the first modified prediction reference picture may be generated based at least in part on the first decoded prediction reference picture.

Process 2700 may continue at operation 2727, "Generate Motion Data", where, motion estimation data may be generated. For example, motion data associated with a prediction partition of a current picture may be generated based at least in part on one of the first modified prediction reference picture or the second modified prediction reference picture.

Process 2700 may continue at operation 2728, "Apply AP/AM Filter Perform Motion Compensation", where, motion compensation may be performed. For example, motion compensation may be performed based at least in part on the motion data and at least one of the first modified prediction reference picture or the second modified prediction reference picture to generate prediction partition data for the prediction partition and adaptive motion filtering or adaptive precision filtering (e.g., AP/AM Filter) may be applied. Process 2700 may feed this information back to operation 2704 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 2700 may continue at operation 2729 "Optionally Apply EP", where enhanced predicted partition (e.g., EP Filtering) may be optionally applied. In some examples, where both EP Filtering or FI/FP Filtering are available, an indicator may be generated that indicates to the decoder system whether to use the enhanced predicted partition (e.g., EP Filtering) or the predicted partition data as the selected predicted partition for the prediction partition.

Process 2700 may continue at operation 2730 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Operations 2701 through 2740 may provide for video encoding and bitstream transmission techniques, which may be employed by an encoder system as discussed herein. The following operations, operations 2754 through 2768 may provide for video decoding and video display techniques, which may be employed by a decoder system as discussed herein.

Process 2700 may continue at operation 2754, "Receive Bitstream", where the bitstream may be received. For example, input bitstream 201, bitstream 2500, or the like may be received via decoder 200. In some examples, the bitstream may include data associated with a coding partition, one or more indicators, and/or data defining coding partition(s) as discussed above. In some examples, the bitstream may include the prediction partitioning, prediction parameters, the selected coding partitioning, the selected characteristics data, motion vector data, quantized transform coefficients, filter parameters, selection data (such as mode selection data), and indictors.

Process 2700 may continue at operation 2755, "Decode Bitstream", where the received bitstream may be decoded via adaptive entropy decoder module 202 for example. For example, received bitstream may be entropy decoded to determine the prediction partitioning, prediction parameters, the selected coding partitioning, the selected characteristics data, motion vector data, quantized transform coefficients, filter parameters, selection data (such as mode selection data), and indictors.

Process 2700 may continue at operation 2756, "Perform Inverse Scan and Inverse Quantization on Each Block of Each Coding Partition", where an inverse scan and inverse quantization may be performed on each block of each coding partition for the prediction partition being processed. For example, the inverse scan and inverse quantization may be performed via adaptive inverse quantize module 203.

Process 2700 may continue at operation 2757, "Perform Fixed or Content Adaptive Inverse Transform to Decode Transform Coefficients to Determine Decoded Prediction Error Data Partitions", where a fixed or content adaptive inverse transform may be performed to decode transform coefficients to determine decoded prediction error data partitions. For example, the inverse transform may include an inverse content adaptive transform such as a hybrid parametric Haar inverse transform such that the hybrid parametric Haar inverse transform may include a parametric Haar inverse transform in a direction of the parametric transform direction and a discrete cosine inverse transform in a direction orthogonal to the parametric transform direction. In some examples, the fixed inverse transform may include a discrete cosine inverse transform or a discrete cosine inverse transform approximator. For example, the fixed or content adaptive transform may be performed via adaptive inverse transform module 204. As discussed, the content adaptive inverse transform may be based on other previously decoded data, such as, for example, decoded neighboring partitions or blocks. In some examples, generating the decoded prediction error data partitions may include assembling decoded coding partitions via coding partitions assembler module 205.

Process 2700 may continue at operation 2758, "Generate Prediction Pixel Data for Each Prediction Partition", where prediction pixel data may be generated for each prediction partition. For example, prediction pixel data may be generated using the selected prediction type (e.g., based on characteristics and motion, or intra-, or other types) and associated prediction parameters.

Process 2700 may continue at operation 2759, "Add to Each Decoded Prediction Error Partition the Corresponding Prediction Partition to Generate Reconstructed Prediction Partition", where each decoded prediction error partition (e.g., including zero prediction error partitions) may be added to the corresponding prediction partition to generated a reconstructed prediction partition. For example, prediction partitions may be generated via the decode loop illustrated in FIG. 2 and added via adder 206 to decoded prediction error partitions.

Process 2700 may continue at operation 2760, "Assemble Reconstructed Prediction Partitions to Generate Decoded Tiles or Super-fragments", where reconstructed prediction partitions may be assembled to generate decoded tiles or super-fragments. For example, prediction partitions may be assembled to generate decoded tiles or super-fragments via prediction partitions assembler module 207.

Process 2700 may continue at operation 2761, "Apply Deblock Filtering and/or QR Filtering to Generate Final Decoded Tiles or Super-fragments", where optional deblock filtering and/or quality restoration filtering may be applied to the decoded tiles or super-fragments to generate final decoded tiles or super-fragments. For example, optional deblock filtering may be applied via deblock filtering module 208 and/or optional quality restoration filtering may be applied via quality restoration filtering module 209.

Process 2700 may continue at operation 2762, "Assemble Decoded Tiles or Super-fragments to Generate a Decoded Video Picture, and Save in Reference Picture Buffers", where decoded (or final decoded) tiles or super-fragments may be assembled to generate a decoded video picture, and the decoded video picture may be saved in reference picture buffers (e.g., decoded picture buffer 210) for use in future prediction.

Figure 29:
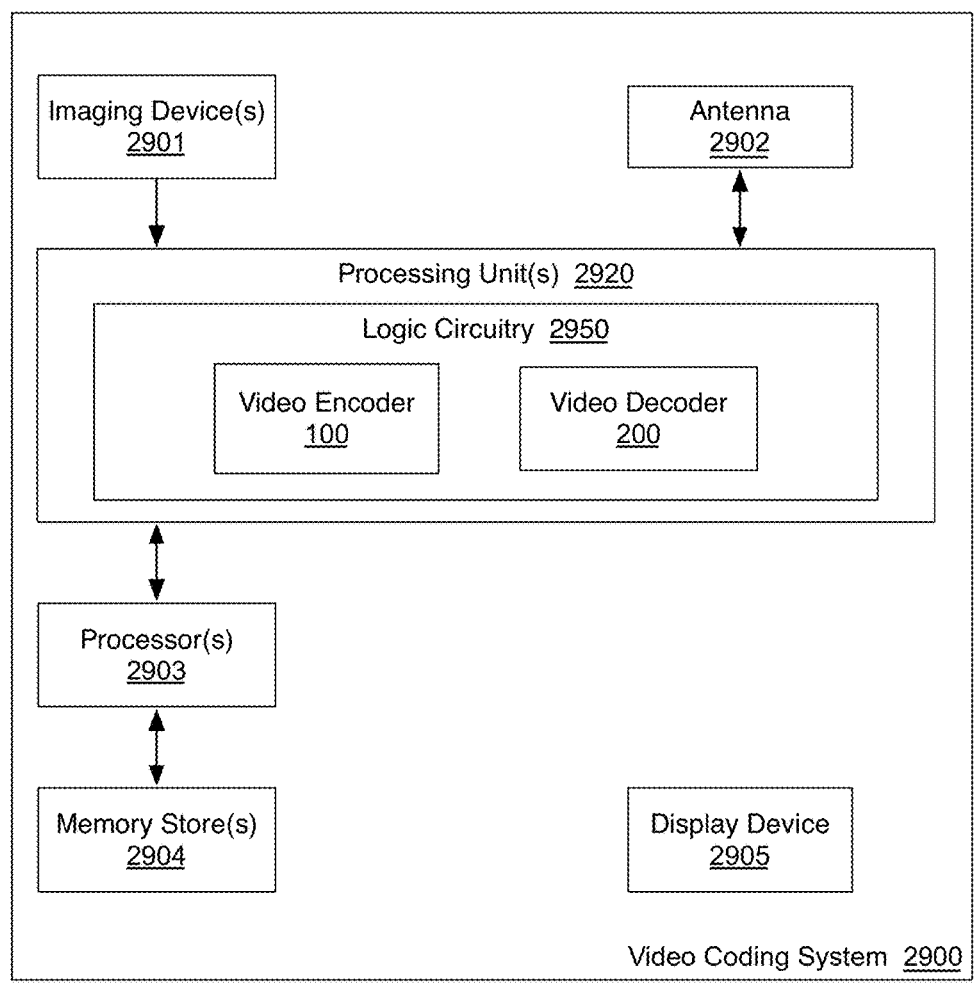
FIG. 29 is an illustrative diagram of an example video coding system.

Process 2700 may continue at operation 2763, "Transmit Decoded Video Frames for Presentment via a Display Device", where decoded video frames may be transmitted for presentment via a display device. For example, decoded video pictures may be further processed via adaptive picture re-organizer 217 and content post restorer module 218 and transmitted to a display device as video frames of display video 219 for presentment to a user. For example, the video frame(s) may be transmitted to a display device 2905 (as shown in FIG. 29) for presentment.

Process 2700 may continue at operation 2773 "Apply DD/DB Filter, Reconstruct Pixel Data, Assemble into a Picture", where deblock filtering (e.g., DD or DB filters) may be applied, pixel data may be reconstructed, and assembled into a picture. For example, after inverse scan, inverse transform, and assembling coding partitions, the prediction error data partitions may be added with a prediction partition to generate reconstructed prediction partitions, which may be assembled into tiles or super-fragments. The assembled tiles or super-fragments may be optionally processed via deblock filtering.

Process 2700 may continue at operation 2774 "Apply QR/LF Filter Save in Reference Picture Buffers", where quality restoration filtering (e.g., QR or LF filtering) may be applied, and the assembled picture may be saved in reference picture buffers. For example, in addition to or in the alternative to the DD/DB filtering, the assembled tiles or super-fragments may be optionally processed via quality restoration filtering and assembled to generate a picture. The picture may be saved in a picture buffer as a reference picture for prediction of other (e.g., following) pictures.

Process 2700 may continue at operation 2776, "Generate Modified Prediction Reference Pictures", where modified prediction reference pictures may be generated, for example, at least a portion of a third modified prediction reference picture may be generated based at least in part on the third modifying characteristic parameters. Similarly, at least a portion a fourth modified prediction reference picture may be generated based at least in part on the second modifying characteristic parameters associated.

Process 2700 may continue at operation 2777, "Generate Motion Data", where, motion estimation data may be generated. For example, motion data associated with a prediction partition of a current picture may be generated based at least in part on one of the third modified prediction reference picture or the third modified prediction reference picture.

Process 2700 may continue at operation 2778, "Apply AP/AM Filter and Perform Motion Compensation", where, motion compensation may be performed and where adaptive motion filtering or adaptive precision filtering (e.g., AP/AM Filter) may be applied. For example, motion compensation may be performed based at least in part on the motion data and at least one of the third modified prediction reference picture or the fourth modified prediction reference picture to generate prediction partition data for the prediction partition. Process 2700 may feed this information back to operation 2759 where each decoded prediction error partition (e.g., including zero prediction error partitions) may be added to the corresponding prediction partition to generate a reconstructed prediction partition. Additionally, adaptive motion filtering or adaptive precision filtering may be applied at this point in the process.

Process 2700 may continue at operation 2779 "Optionally Apply EP Filter", where enhanced predicted partition (e.g., EP Filtering) may be optionally applied. In some examples, where both EP Filtering or FI/FP Filtering are available, an indicator may be received from the encoder system that indicates to the decoder system whether to use the enhanced predicted partition (e.g., EP Filtering) or the predicted partition data as the selected predicted partition for the prediction partition.

Process 2700 may continue at operation 2780 "Optionally apply FI/FP Filter", where FI/FP Filtering (e.g., fusion filtering or fusion improvement filtering) may be optionally applied. In some examples, a decision may be made regarding whether to utilize some form or FI/FP Filter (fusion improvement filtering/fusion filtering) or not to use FI/FP Filtering. When some form or FI/FP Filter (e.g., fusion filtering or fusion improvement filtering) is to be applied to the selected predicted partition the selected predicted partition and a second selected predicted partition may be assembled to generate at least a portion of an assembled picture. FI/FP Filtering may be applied to filter the portion of the assembled picture. FI/FP Filtering parameters (e.g., filtering parameters or fusion improvement filtering parameters) associated with the FI/FP Filtering may be generated and sent to the entropy coder subsystem.

Process 2700 may be implemented via any of the coder systems as discussed herein. Further, process 2700 may be repeated either in serial or in parallel on any number of instantiations of video data such as prediction error data partitions, original data partitions, or wavelet data or the like.

Figure 28:
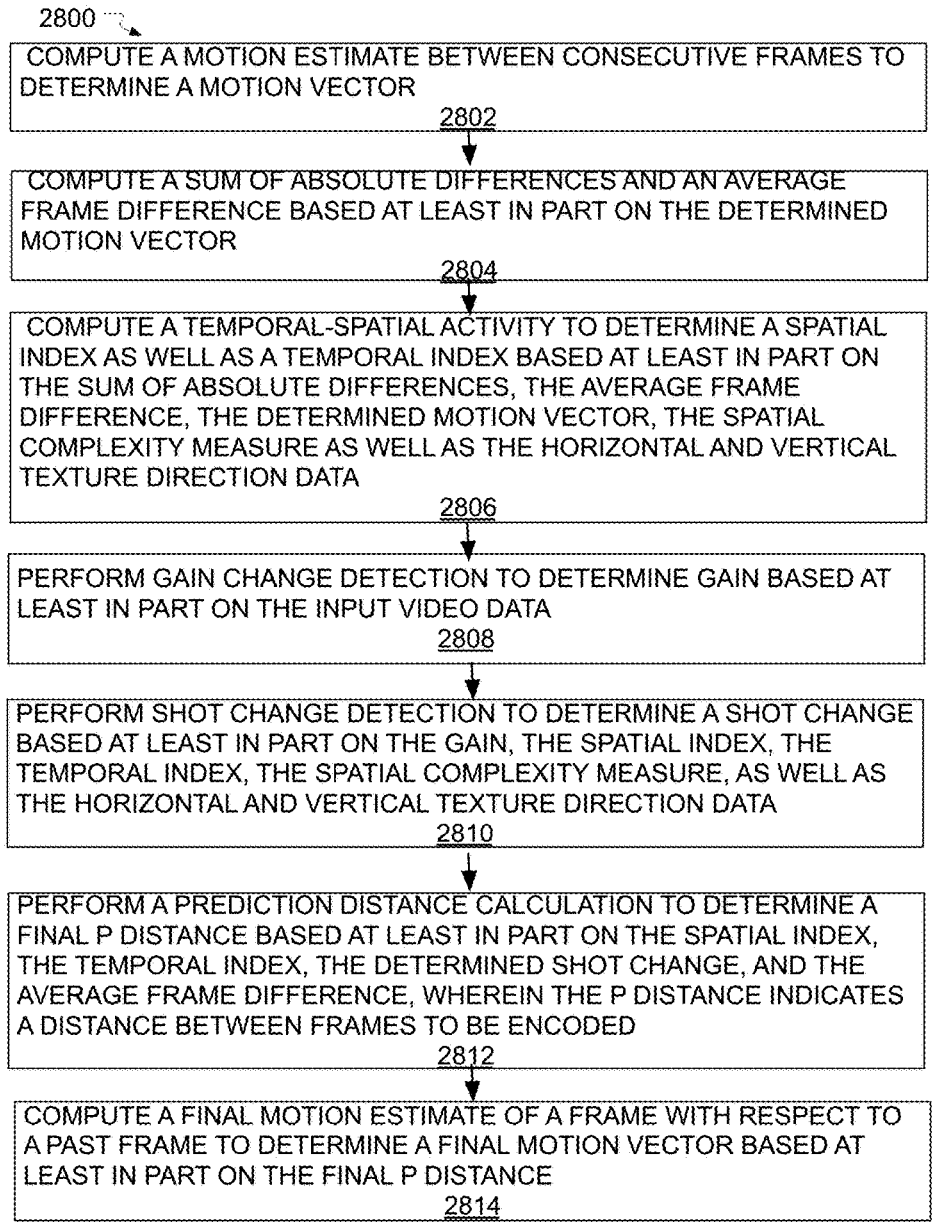
FIG. 28 is a flow diagram illustrating an example coding process.

FIG. 28 is a flow diagram illustrating an example encoding process, arranged in accordance with at least some implementations of the present disclosure. Process 2800 may include one or more operations, functions or actions as illustrated by one or more operations. Process 2800 may form at least part of a next generation video coding process. By way of non-limiting example, process 2800 may form at least part of a next generation video encoding process as undertaken by encoder system 100 of FIG. 1 and/or any other encoder system or subsystems described herein.

Process 2800 may begin at operation 2802 to perform of spatial analysis to determine a spatial complexity measure as well as horizontal and vertical texture direction data based at least in part on input video data.

At operation 2804, process 2800 may compute a motion estimate between consecutive frames to determine a motion vector; compute a sum of absolute differences and an average frame difference based at least in part on the determined motion vector.

At operation 2806, process 2800 may compute a temporal-spatial activity to determine a spatial index as well as a temporal index based at least in part on the sum of absolute differences, the average frame difference, the determined motion vector, the spatial complexity measure as well as the horizontal and vertical texture direction data.

At operation 2808, process 2800 may perform gain change detection to determine gain based at least in part on the input video data.

At operation 2810, process 2800 may perform shot change detection to determine a shot change based at least in part on the gain, the spatial index, the temporal index, the spatial complexity measure, as well as the horizontal and vertical texture direction data.

At operation 2812, process 2800 may perform a prediction distance calculation to determine a final p distance based at least in part on the spatial index, the temporal index, the determined shot change, and the average frame difference, wherein the p distance indicates a distance between frames to be encoded.

At operation 2814, process 2800 may compute a final motion estimate of a frame with respect to a past frame to determine a final motion vector based at least in part on the final p distance.

FIG. 29 is an illustrative diagram of example video coding system 2900, arranged in accordance with at least some implementations of the present disclosure. In the illustrated implementation, video coding system 2900 may include imaging device(s) 2901, video encoder 100, video decoder 200 (and/or a video coder implemented via logic circuitry 2950 of processing unit(s) 2920), an antenna 2902, one or more processor(s) 2903, one or more memory store(s) 2904, and/or a display device 2905.

As illustrated, imaging device(s) 2901, antenna 2902, processing unit(s) 2920, logic circuitry 2950, video encoder 100, video decoder 200, processor(s) 2903, memory store(s) 2904, and/or display device 2905 may be capable of communication with one another. As discussed, although illustrated with both video encoder 100 and video decoder 200, video coding system 2900 may include only video encoder 100 or only video decoder 200 in various examples.

As shown, in some examples, video coding system 2900 may include antenna 2902. Antenna 2902 may be configured to transmit or receive an encoded bitstream of video data, for example. Further, in some examples, video coding system 2900 may include display device 2905. Display device 2905 may be configured to present video data. As shown, in some examples, logic circuitry 2950 may be implemented via processing unit(s) 2920. Processing unit(s) 2920 may include application-specific integrated circuit (ASIC) logic, graphics processor(s), general purpose processor(s), or the like. Video coding system 2900 also may include optional processor(s) 2903, which may similarly include application-specific integrated circuit (ASIC) logic, graphics processor(s), general purpose processor(s), or the like. In some examples, logic circuitry 2950 may be implemented via hardware, video coding dedicated hardware, or the like, and processor(s) 2903 may implemented general purpose software, operating systems, or the like. In addition, memory store(s) 2904 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 2904 may be implemented by cache memory. In some examples, logic circuitry 2950 may access memory store(s) 2904 (for implementation of an image buffer for example). In other examples, logic circuitry 2950 and/or processing unit(s) 2920 may include memory stores (e.g., cache or the like) for the implementation of an image buffer or the like.

In some examples, video encoder 100 implemented via logic circuitry may include an image buffer (e.g., via either processing unit(s) 2920 or memory store(s) 2904)) and a graphics processing unit (e.g., via processing unit(s) 2920). The graphics processing unit may be communicatively coupled to the image buffer. The graphics processing unit may include video encoder 100 as implemented via logic circuitry 2950 to embody the various modules as discussed with respect to FIG. 1 and/or any other encoder system or subsystem described herein. For example, the graphics processing unit may include coding partitions generator logic circuitry, adaptive transform logic circuitry, content pre-analyzer, encode controller logic circuitry, adaptive entropy encoder logic circuitry, and so on. The logic circuitry may be configured to perform the various operations as discussed herein.

In some implementations, the video encoder may include an image buffer and a graphics processing unit. The graphics processing unit may be configured to:

perform of spatial analysis to determine a spatial complexity measure as well as horizontal and vertical texture direction data based at least in part on input video data;

compute a motion estimate between consecutive frames to determine a motion vector;

compute a sum of absolute differences and an average frame difference based at least in part on the determined motion vector;

compute a temporal-spatial activity to determine a spatial index as well as a temporal index based at least in part on the sum of absolute differences, the average frame difference, the determined motion vector, the spatial complexity measure as well as the horizontal and vertical texture direction data;

perform gain change detection to determine gain based at least in part on the input video data;

perform shot change detection to determine a shot change based at least in part on the gain, the spatial index, the temporal index, the spatial complexity measure, as well as the horizontal and vertical texture direction data;

perform a prediction distance calculation to determine a final p distance based at least in part on the spatial index, the temporal index, the determined shot change, and the average frame difference, wherein the p distance indicates a distance between frames to be encoded; and compute a final motion estimate of a frame with respect to a past frame to determine a final motion vector based at least in part on the final p distance.

In some examples, the graphics processing unit may be further configured to:

In some examples, the graphics processing unit may be further configured to:

perform an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data;

wherein determining the motion vector further includes performing a multi-stage sequential hierarchical motion estimation, including:

perform a first stage of the multi-stage sequential hierarchical motion estimation to determine an initial motion vector at a coarse level based at least in part on the estimated motion direction and the estimated motion range, wherein the coarse level includes a level at $\frac{1}{16}^{th}$ the size of an original picture;

perform one or more intermediate stages of the multi-stage sequential hierarchical motion estimation to determine one or more intermediate motion vectors at one or more intermediate levels based at least in part on the initial motion vector, wherein at least one of the intermediate levels includes a level at $\frac{1}{4}^{th}$ the size of the original picture; and perform a final stage of the multi-stage sequential hierarchical motion estimation to determine a final motion vector at a fine level based at least in part on the one or more intermediate motion vectors, wherein the fine level includes a level at the full size of the original picture;

wherein determining the shot change further includes a multi-criteria determination, including:

determine whether one criteria associated with a relationship between a difference between current and previous frame motion vector difference value (diffMVdiffVal) as compared with a spatio temporal index (tscIndex) has been met;

determine whether another criteria associated with a relationship between the spatio temporal index (tscIndex) as compared with the difference value between average frame difference differential (AFDdiff) has been met;

determine whether a further criteria associated with a relationship between a spatial complexity measure (SC) as compared with a difference value between RsCs difference between current and previous frames has been met; and determine whether a still futher criteria associated with a relationship between a current SC and a current average frame difference (MD) as compared with an SC index and the spatio temporal index (tscIndex) has been met, and wherein all of these criteria must be determined to have been met to conclude that a scene change has been detected;

perform a prediction distance calculation to determine an initial p distance based at least in part on the spatial index and the temporal index;

perform a prediction distance calculation to determine an intermediate p distance based at least in part on the initial p distance as well as the determined shot change, wherein a positive shot change detection results in resetting the intermediate p distance value to a frame before the determined shot change frame and flaging the determined shot change frame as an I-picture, wherein a positive gain change detection results in resetting the intermediate p distance value to a frame before that indicated by the initial p distance, wherein performing the prediction distance calculation to determine the final p distance includes determining the final p distance based at least in part on the intermediate p distance as well as the average frame difference, wherein performing the prediction distance calculation to determine the final p distance includes determining the final p distance based at least in part on a lookup table for spatial complexity measure and temporal spatial measure that is associated with the spatial index and the temporal index, and wherein the number of intervening B-picture frames is one value less that the final p distance, buffer 4×4 block based Rs/Cs and 16×16 block based Rs/Cs arrays for a frame from a p distance calculator module;

perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based at least in part on the buffered 4×4 block based Rs/Cs and 16×16 block based Rs/Cs arrays;

wherein determining the final motion vector further includes performing a final multi-stage sequential hierarchical motion estimation, including:

perform a final first stage of the multi-stage sequential hierarchical motion estimation at half pixel resolution to determine a final initial motion vector at a final coarse level based at least in part on the estimated motion direction and the estimated motion range, wherein the final coarse level includes a level at $\frac{1}{16}^{th}$ the size of an original picture;

perform one or more final intermediate stages of the final multi-stage sequential hierarchical motion estimation at half pixel resolution to determine one or more final intermediate motion vectors at one or more final intermediate levels based at least in part on the final initial motion vector, wherein at least one of the final intermediate levels includes a level at $\frac{1}{4}^{th}$ the size of the original picture; and perform a final stage of the multi-stage sequential hierarchical motion estimation at one-fourth pixel or one-eighth pixel resolution to determine a final motion vector at a fine level based at least in part on the one or more intermediate motion vectors, wherein the fine level includes a level at the full size of the original picture.

Video decoder 200 may be implemented in a similar manner as implemented via logic circuitry 2950 to embody the various modules as discussed with respect to decoder 200 of FIG. 2 and/or any other decoder system or subsystem described herein.

In some examples, antenna 2902 of video coding system 2900 may be configured to receive an encoded bitstream of video data. As discussed, the encoded bitstream may include data associated with the coding partition (e.g., transform coefficients or quantized transform coefficients, optional indicators (as discussed), and/or data defining the coding partition (e.g., data associated with defining bi-tree partitions or k-d tree partitions using a symbol-run coding or codebook technique or the like)). Video coding system 2900 may also include video decoder 200 coupled to antenna 2902 and configured to decode the encoded bitstream.

In some implementations, the decoder system may include a video decoder configured to decode an encoded bitstream.

In some embodiments, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein.

Figure 30:
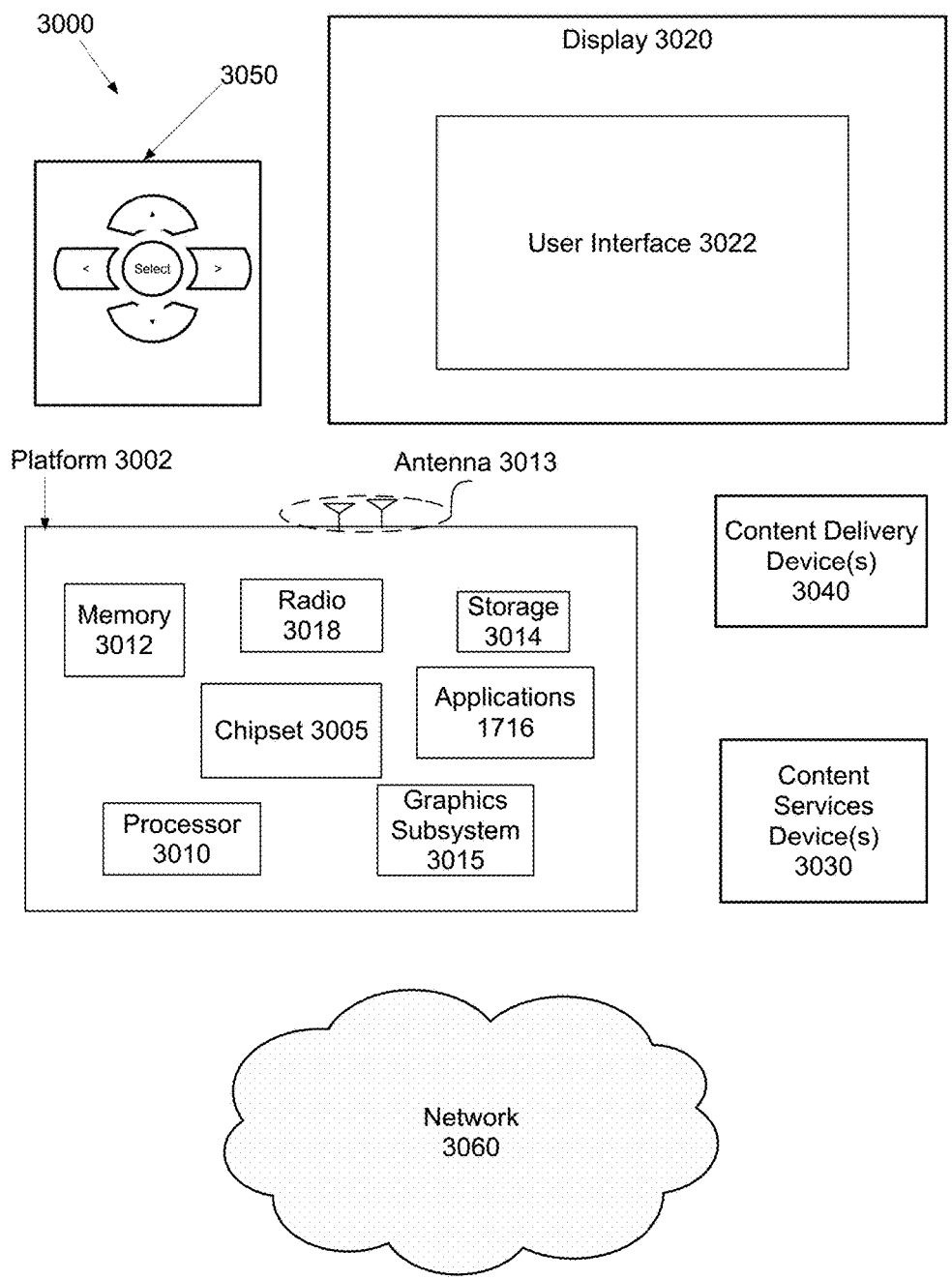
FIG. 30 is an illustrative diagram of an example system.

FIG. 30 is an illustrative diagram of an example system 3000, arranged in accordance with at least some implementations of the present disclosure. In various implementations, system 3000 may be a media system although system 3000 is not limited to this context. For example, system 3000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 3000 includes a platform 3002 coupled to a display 3020. Platform 3002 may receive content from a content device such as content services device(s) 3030 or content delivery device(s) 3040 or other similar content sources. A navigation controller 3050 including one or more navigation features may be used to interact with, for example, platform 3002 and/or display 3020. Each of these components is described in greater detail below.

In various implementations, platform 3002 may include any combination of a chipset 3005, processor 3010, memory 3012, antenna 3013, storage 3014, graphics subsystem 3015, applications 3016 and/or radio 3018. Chipset 3005 may provide intercommunication among processor 3010, memory 3012, storage 3014, graphics subsystem 3015, applications 3016 and/or radio 3018. For example, chipset 3005 may include a storage adapter (not depicted) capable of providing intercommunication with storage 3014.

Processor 3010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 3010 may be dual-core processor(s), dual-core mobile processor(s), and so forth.

Memory 3012 may be implemented as a volatile memory device such as, but not limited to, a Random Access Memory (RAM), Dynamic Random Access Memory (DRAM), or Static RAM (SRAM).

Storage 3014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 3014 may include technology to increase the storage performance enhanced protection for valuable digital media when multiple hard drives are included, for example.

Graphics subsystem 3015 may perform processing of images such as still or video for display. Graphics subsystem 3015 may be a graphics processing unit (GPU) or a visual processing unit (VPU), for example. An analog or digital interface may be used to communicatively couple graphics subsystem 3015 and display 3020. For example, the interface may be any of a High-Definition Multimedia Interface, DisplayPort, wireless HDMI, and/or wireless HD compliant techniques. Graphics subsystem 3015 may be integrated into processor 3010 or chipset 3005. In some implementations, graphics subsystem 3015 may be a stand-alone device communicatively coupled to chipset 3005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 3018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 3018 may operate in accordance with one or more applicable standards in any version.

In various implementations, display 3020 may include any television type monitor or display. Display 3020 may include, for example, a computer display screen, touch screen display, video monitor, television-like device, and/or a television. Display 3020 may be digital and/or analog. In various implementations, display 3020 may be a holographic display. Also, display 3020 may be a transparent surface that may receive a visual projection. Such projections may convey various forms of information, images, and/or objects. For example, such projections may be a visual overlay for a mobile augmented reality (MAR) application. Under the control of one or more software applications 3016, platform 3002 may display user interface 3022 on display 3020.

In various implementations, content services device(s) 3030 may be hosted by any national, international and/or independent service and thus accessible to platform 3002 via the Internet, for example. Content services device(s) 3030 may be coupled to platform 3002 and/or to display 3020. Platform 3002 and/or content services device(s) 3030 may be coupled to a network 3060 to communicate (e.g., send and/or receive) media information to and from network 3060. Content delivery device(s) 3040 also may be coupled to platform 3002 and/or to display 3020.

In various implementations, content services device(s) 3030 may include a cable television box, personal computer, network, telephone, Internet enabled devices or appliance capable of delivering digital information and/or content, and any other similar device capable of unidirectionally or bidirectionally communicating content between content providers and platform 3002 and/display 3020, via network 3060 or directly. It will be appreciated that the content may be communicated unidirectionally and/or bidirectionally to and from any one of the components in system 3000 and a content provider via network 3060. Examples of content may include any media information including, for example, video, music, medical and gaming information, and so forth.

Content services device(s) 3030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 3002 may receive control signals from navigation controller 3050 having one or more navigation features. The navigation features of controller 3050 may be used to interact with user interface 3022, for example. In various embodiments, navigation controller 3050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 3050 may be replicated on a display (e.g., display 3020) by movements of a pointer, cursor, focus ring, or other visual indicators displayed on the display. For example, under the control of software applications 3016, the navigation features located on navigation controller 3050 may be mapped to virtual navigation features displayed on user interface 3022. In various embodiments, controller 3050 may not be a separate component but may be integrated into platform 3002 and/or display 3020. The present disclosure, however, is not limited to the elements or in the context shown or described herein.

In various implementations, drivers (not shown) may include technology to enable users to instantly turn on and off platform 3002 like a television with the touch of a button after initial boot-up, when enabled, for example. Program logic may allow platform 3002 to stream content to media adaptors or other content services device(s) 3030 or content delivery device(s) 3040 even when the platform is turned "off." In addition, chipset 3005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 3000 may be integrated. For example, platform 3002 and content services device(s) 3030 may be integrated, or platform 3002 and content delivery device(s) 3040 may be integrated, or platform 3002, content services device(s) 3030, and content delivery device(s) 3040 may be integrated, for example. In various embodiments, platform 3002 and display 3020 may be an integrated unit. Display 3020 and content service device(s) 3030 may be integrated, or display 3020 and content delivery device(s) 3040 may be integrated, for example. These examples are not meant to limit the present disclosure.

In various embodiments, system 3000 may be implemented as a wireless system, a wired system, or a combination of both. When implemented as a wireless system, system 3000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 3000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 3002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 30.

Figure 31:
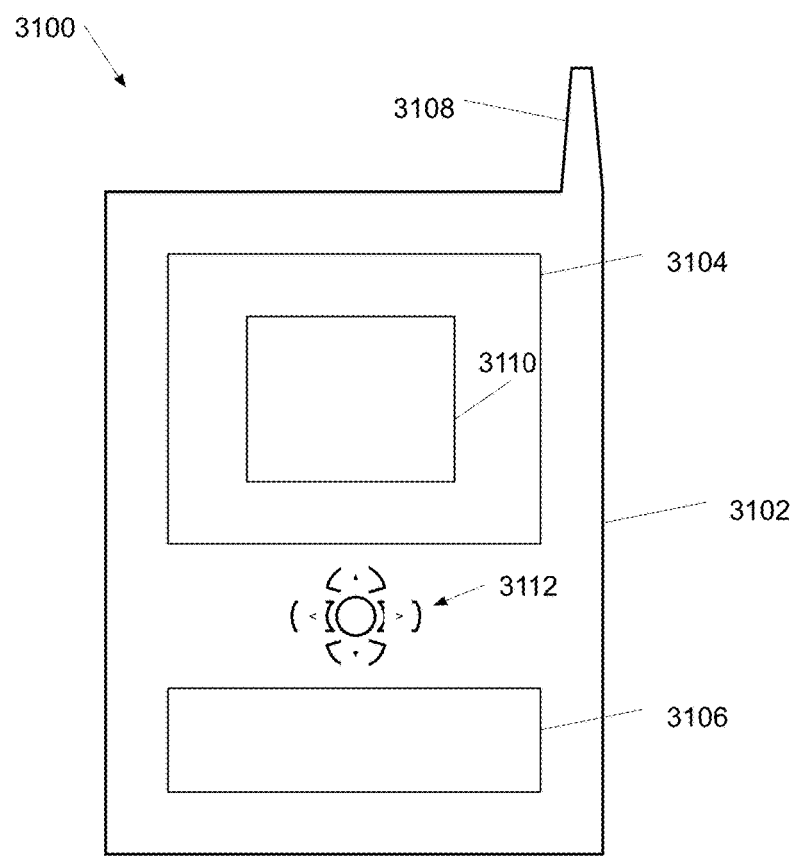
FIG. 31 illustrates an example device, all arranged in accordance with at least some implementations of the present disclosure.

As described above, system 3000 may be embodied in varying physical styles or form factors. FIG. 31 illustrates implementations of a small form factor device 3100 in which system 3100 may be embodied. In various embodiments, for example, device 3100 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 31, device 3100 may include a housing 3102, a display 3104 which may include a user interface 3110, an input/output (I/O) device 3106, and an antenna 3108. Device 3100 also may include navigation features 3112. Display 3104 may include any suitable display unit for displaying information appropriate for a mobile computing device. I/O device 3106 may include any suitable I/O device for entering information into a mobile computing device. Examples for I/O device 3106 may include an alphanumeric keyboard, a numeric keypad, a touch pad, input keys, buttons, switches, rocker switches, microphones, speakers, voice recognition device and software, and so forth. Information also may be entered into device 3100 by way of microphone (not shown). Such information may be digitized by a voice recognition device (not shown). The embodiments are not limited in this context.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for calculating prediction distance of a previous frame with respect to a current frame for which motion estimation and compensation for video coding is being performed, may include operations to:

perform of spatial analysis to determine a spatial complexity measure as well as horizontal and vertical texture direction data based at least in part on input video data;

compute a motion estimate between consecutive frames to determine a motion vector;

compute a sum of absolute differences and an average frame difference based at least in part on the determined motion vector;

compute a temporal-spatial activity to determine a spatial index as well as a temporal index based at least in part on the sum of absolute differences, the average frame difference, the determined motion vector, the spatial complexity measure as well as the horizontal and vertical texture direction data;

perform gain change detection to determine gain based at least in part on the input video data;

perform shot change detection to determine a shot change based at least in part on the gain, the spatial index, the temporal index, the spatial complexity measure, as well as the horizontal and vertical texture direction data;

perform a prediction distance calculation to determine a final p distance based at least in part on the spatial index, the temporal index, the determined shot change, and the average frame difference, wherein the p distance indicates a distance between frames to be encoded; and compute a final motion estimate of a frame with respect to a past frame to determine a final motion vector based at least in part on the final p distance.

In some examples, the method may further include:

performing an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data.

In some examples, the method may further include: wherein determining the motion vector further includes performing a multi-stage sequential hierarchical motion estimation including, including:

performing a first stage of the multi-stage sequential hierarchical motion estimation to determine an initial motion vector at a coarse level, wherein the coarse level includes a level at $\frac{1}{16}^{th}$ the size of an original picture;

performing one or more intermediate stages of the multi-stage sequential hierarchical motion estimation to determine one or more intermediate motion vectors at one or more intermediate levels based at least in part on the initial motion vector, wherein at least one of the intermediate levels includes a level at ¼$^{th}$ the size of the original picture; and performing a final stage of the multi-stage sequential hierarchical motion estimation to determine a final motion vector at a fine level based at least in part on the one or more intermediate motion vectors, wherein the fine level includes a level at the full size of the original picture.

In some examples, the method may further include: performing an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data;

wherein determining the motion vector further includes performing a multi-stage sequential hierarchical motion estimation, including:

performing a first stage of the multi-stage sequential hierarchical motion estimation to determine an initial motion vector at a coarse level based at least in part on the estimated motion direction and the estimated motion range, wherein the coarse level includes a level at 1/16$^{th}$ the size of an original picture;

performing one or more intermediate stages of the multi-stage sequential hierarchical motion estimation to determine one or more intermediate motion vectors at one or more intermediate levels based at least in part on the initial motion vector, wherein at least one of the intermediate levels includes a level at ¼$^{th}$ the size of the original picture; and performing a final stage of the multi-stage sequential hierarchical motion estimation to determine a final motion vector at a fine level based at least in part on the one or more intermediate motion vectors, wherein the fine level includes a level at the full size of the original picture.

In some examples, the method may further include: wherein determining the shot change further includes a multi-criteria determination, including:

determining whether one criteria associated with a relationship between a difference between current and previous frame motion vector difference value (diffMVdiffVal) as compared with a spatio temporal index (tscIndex) has been met;

determining whether another criteria associated with a relationship between the spatio temporal index (tscIndex) as compared with the difference value between average frame difference differential (AFDdiff) has been met;

determining whether a further criteria associated with a relationship between a spatial complexity measure (SC) as compared with a difference value between RsCs difference between current and previous frames has been met; and determining whether a still futher criteria associated with a relationship between a current SC and a current average frame difference (AFD) as compared with an SC index and the spatio temporal index (tscIndex) has been met, wherein all of these criteria must be determined to have been met to conclude that a scene change has been detected.

In some examples, the method may further include: performing a prediction distance calculation to determine an initial p distance based at least in part on the spatial index and the temporal index; and performing a prediction distance calculation to determine an intermediate p distance based at least in part on the initial p distance as well as the determined shot change, wherein a positive shot change detection results in resetting the intermediate p distance value to a frame before the determined shot change frame and flaging the determined shot change frame as an I-picture, wherein a positive gain change detection results in resetting the intermediate p distance value to a frame before that indicated by the initial p distance;

wherein performing the prediction distance calculation to determine the final p distance includes determining the final p distance based at least in part on the intermediate p distance as well as the average frame difference, wherein performing the prediction distance calculation to determine the final p distance includes determining the final p distance based at least in part on a lookup table for spatial complexity measure and temporal spatial measure that is associated with the spatial index and the temporal index, wherein the number of intervening B-picture frames is one value less that the final p distance.

In some examples, the method may further include: wherein determining the final motion vector further includes performing a final multi-stage sequential hierarchical motion estimation, including:

performing a final first stage of the final multi-stage sequential hierarchical motion estimation to determine a final initial motion vector at a final coarse level, wherein the final coarse level includes a level at 1/16$^{th}$ the size of an original picture;

performing one or more final intermediate stages of the final multi-stage sequential hierarchical motion estimation to determine one or more final intermediate motion vectors at one or more final intermediate levels based at least in part on the final initial motion vector, wherein at least one of the final intermediate levels includes a level at ¼$^{th}$ the size of the original picture; and performing a final final stage of the final multi-stage sequential hierarchical motion estimation to determine a final final motion vector at a final fine level based at least in part on the one or more final intermediate motion vectors, wherein the final fine level includes a level at the full size of the original picture.

In some examples, the method may further include: performing a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data;

wherein determining the final motion vector further includes performing a final multi-stage sequential hierarchical motion estimation, including:

performing a final first stage of the multi-stage sequential hierarchical motion estimation to determine a final initial motion vector at a final coarse level based at least in part on the estimated motion direction and the estimated motion range, wherein the final coarse level includes a level at 1/16$^{th}$ the size of an original picture;

performing one or more final intermediate stages of the final multi-stage sequential hierarchical motion estimation to determine one or more final intermediate motion vectors at one or more final intermediate levels based at least in part on the final initial motion vector, wherein at least one of the final intermediate levels includes a level at 1/4$^{th}$ the size of the original picture; and performing a final stage of the multi-stage sequential hierarchical motion estimation to determine a final motion vector at a fine level based at least in part on the one or more intermediate motion vectors, wherein the fine level includes a level at the full size of the original picture.

In some examples, the method may further include: wherein determining the final motion vector further includes:

performing a final multi-stage motion estimation to determine a high accuracy final motion vector, wherein determining a high accuracy motion vector includes computing a motion vector at one-half pixel, one-fourth pixel or one-eighth pixel resolution.

In some examples, the method may further include: wherein determining the final motion vector further includes:

performing a final multi-stage motion estimation to determine a high accuracy final motion vector, wherein determining a high accuracy motion vector includes computing a first stage motion vector at one-half pixel accuracy, a second stage motion vector at one-half pixel accuracy, and a final stage motion vector at one-quarter pixel accuracy.

In some examples, the method may further include: wherein determining the final motion vector further includes:

performing a final multi-stage motion estimation to determine a high accuracy final motion vector, wherein determining a high accuracy motion vector includes computing a first stage motion vector at one-half pixel accuracy, a second stage motion vector at one-half pixel accuracy, and a final stage motion vector at one-eighth pixel accuracy.

In some examples, the method may further include:

performing a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data;

wherein determining the final motion vector further includes: performing a final multi-stage hierarchical motion estimation (HME) to determine a high accuracy final motion vector, wherein determining the high accuracy motion vector includes computing a motion vector at one-half pixel resolution, one-fourth pixel resolution, or one-eighth pixel resolution.

In some examples, the method may further include:

buffering 4×4 block based Rs/Cs and 16×16 block based Rs/Cs arrays for a frame from a p distance calculator module;

performing a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based at least in part on the buffered 4×4 block based Rs/Cs and 16×16 block based Rs/Cs arrays;

wherein determining the final motion vector further includes: performing a final multi-stage hierarchical motion estimation (HME) to determine a high accuracy final motion vector, wherein determining a high accuracy motion vector includes:

computing a first stage motion vector based at least in part on the final estimated motion range and the final p distance values;

computing a second stage motion vector based at least in part on the first stage motion vector, the final estimated motion range, and the final p distance values; and computing a final stage motion vector based at least in part on the second stage motion vector, the final estimated motion range, and the final p distance values to generate the high accuracy final motion vector at one-half pixel, one-fourth pixel or one-eighth pixel resolution.

In some examples, the method may further include:

buffering 4×4 block based Rs/Cs and 16×16 block based Rs/Cs arrays for a frame from a p distance calculator module;

performing a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based at least in part on the buffered 4×4 block based Rs/Cs and 16×16 block based Rs/Cs arrays;

wherein determining the final motion vector further includes: performing a final multi-stage hierarchical motion estimation (HME) to determine a high accuracy final motion vector, wherein determining a high accuracy motion vector includes:

computing a first stage motion vector at half pixel resolution based at least in part on the final estimated motion range and the final p distance values;

computing a second stage motion vector at half pixel resolution based at least in part on the first stage motion vector at half pixel resolution, the final estimated motion range, and the final p distance values; and computing a final stage motion vector at one fourth pixel resolution based at least in part on the second stage motion vector at half pixel resolution, the final estimated motion range, and the final p distance values to generate the high accuracy final motion vector at one-half pixel, one-fourth pixel or one-eighth pixel resolution.

In some examples, the method may further include:

buffering 4×4 block based Rs/Cs and 16×16 block based Rs/Cs arrays for a frame from a p distance calculator module;

performing a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based at least in part on the buffered 4×4 block based Rs/Cs and 16×16 block based Rs/Cs arrays;

wherein determining the final motion vector further includes: performing a final multi-stage hierarchical motion estimation (HME) to determine a high accuracy final motion vector, wherein determining a high accuracy motion vector includes:

computing a first stage motion vector at half pixel resolution based at least in part on the final estimated motion range and the final p distance values;

computing a second stage motion vector at half pixel resolution based at least in part on the first stage motion vector at half pixel resolution, the final estimated motion range, and the final p distance values; and computing a final stage motion vector at one eighth pixel resolution based at least in part on the second stage motion vector at half pixel resolution, the final estimated motion range, and the final p distance values to generate the high accuracy final motion vector at one-half pixel, one-fourth pixel or one-eighth pixel resolution.

In some examples, the method may further include: performing an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data;

wherein determining the motion vector further includes performing a multi-stage sequential hierarchical motion estimation, including:

performing a first stage of the multi-stage sequential hierarchical motion estimation to determine an initial motion vector at a coarse level based at least in part on the estimated motion direction and the estimated motion range, wherein the coarse level includes a level at $1/16^{th}$ the size of an original picture;

performing one or more intermediate stages of the multi-stage sequential hierarchical motion estimation to determine one or more intermediate motion vectors at one or more intermediate levels based at least in part on the initial motion vector, wherein at least one of the intermediate levels includes a level at $1/4^{th}$ the size of the original picture; and performing a final stage of the multi-stage sequential hierarchical motion estimation to determine a final motion vector at a fine level based at least in part on the one or more intermediate motion vectors, wherein the fine level includes a level at the full size of the original picture;

wherein determining the shot change further includes a multi-criteria determination, including:

determining whether one criteria associated with a relationship between a difference between current and previous frame motion vector difference value (diffMVdiffVal) as compared with a spatio temporal index (tscIndex) has been met;

determining whether another criteria associated with a relationship between the spatio temporal index (tscIndex) as compared with the difference value between average frame difference differential (AFDdiff) has been met;

determining whether a further criteria associated with a relationship between a spatial complexity measure (SC) as compared with a difference value between RsCs difference between current and previous frames has been met; and determining whether a still futher criteria associated with a relationship between a current SC and a current average frame difference (AFD) as compared with an SC index and the spatio temporal index (tscIndex) has been met, and wherein all of these criteria must be determined to have been met to conclude that a scene change has been detected;

performing a prediction distance calculation to determine an initial p distance based at least in part on the spatial index and the temporal index;

performing a prediction distance calculation to determine an intermediate p distance based at least in part on the initial p distance as well as the determined shot change, wherein a positive shot change detection results in resetting the intermediate p distance value to a frame before the determined shot change frame and flaging the determined shot change frame as an I-picture, wherein a positive gain change detection results in resetting the intermediate p distance value to a frame before that indicated by the initial p distance, wherein performing the prediction distance calculation to determine the final p distance includes determining the final p distance based at least in part on the intermediate p distance as well as the average frame difference, wherein performing the prediction distance calculation to determine the final p distance includes determining the final p distance based at least in part on a lookup table for spatial complexity measure and temporal spatial measure that is associated with the spatial index and the temporal index, and wherein the number of intervening B-picture frames is one value less that the final p distance, buffering 4×4 block based Rs/Cs and 16×16 block based Rs/Cs arrays for a frame from a p distance calculator module;

performing a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based at least in part on the buffered 4×4 block based Rs/Cs and 16×16 block based Rs/Cs arrays;

wherein determining the final motion vector further includes performing a final multi-stage sequential hierarchical motion estimation, including:

performing a final first stage of the multi-stage sequential hierarchical motion estimation at half pixel resolution to determine a final initial motion vector at a final coarse level based at least in part on the estimated motion direction and the estimated motion range, wherein the final coarse level includes a level at $1/16^{th}$ the size of an original picture;

performing one or more final intermediate stages of the final multi-stage sequential hierarchical motion estimation at half pixel resolution to determine one or more final intermediate motion vectors at one or more final intermediate levels based at least in part on the final initial motion vector, wherein at least one of the final intermediate levels includes a level at ¼$^{th}$ the size of the original picture; and performing a final stage of the multi-stage sequential hierarchical motion estimation at one-fourth pixel or one-eighth pixel resolution to determine a final motion vector at a fine level based at least in part on the one or more intermediate motion vectors, wherein the fine level includes a level at the full size of the original picture.

In another example implementation, a video may include an image buffer and a graphics processing unit. The graphics processing unit may be configured to:

perform of spatial analysis to determine a spatial complexity measure as well as horizontal and vertical texture direction data based at least in part on input video data;

compute a motion estimate between consecutive frames to determine a motion vector; computing a sum of absolute differences and an average frame difference based at least in part on the determined motion vector;

compute a temporal-spatial activity to determine a spatial index as well as a temporal index based at least in part on the sum of absolute differences, the average frame difference, the determined motion vector, the spatial complexity measure as well as the horizontal and vertical texture direction data;

perform gain change detection to determine gain based at least in part on the input video data;

perform shot change detection to determine a shot change based at least in part on the gain, the spatial index, the temporal index, the spatial complexity measure, as well as the horizontal and vertical texture direction data;

perform a prediction distance calculation to determine a final p distance based at least in part on the spatial index, the temporal index, the determined shot change, and the average frame difference, wherein the p distance indicates a distance between frames to be encoded; and compute a final motion estimate of a frame with respect to a past frame to determine a final motion vector based at least in part on the final p distance.

In some examples, the graphics processing unit may be further configured to:

perform an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data.

In some examples, the graphics processing unit may be further configured to:

wherein determining the motion vector further includes performing a multi-stage sequential hierarchical motion estimation including, including:

perform a first stage of the multi-stage sequential hierarchical motion estimation to determine an initial motion vector at a coarse level, wherein the coarse level includes a level at ⅟16$^{th}$ the size of an original picture;

perform one or more intermediate stages of the multi-stage sequential hierarchical motion estimation to determine one or more intermediate motion vectors at one or more intermediate levels based at least in part on the initial motion vector, wherein at least one of the intermediate levels includes a level at ¼$^{th}$ the size of the original picture; and perform a final stage of the multi-stage sequential hierarchical motion estimation to determine a final motion vector at a fine level based at least in part on the one or more intermediate motion vectors, wherein the fine level includes a level at the full size of the original picture.

In some examples, the graphics processing unit may be further configured to:

perform an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data;

wherein determining the motion vector further includes performing a multi-stage sequential hierarchical motion estimation, including:

perform a first stage of the multi-stage sequential hierarchical motion estimation to determine an initial motion vector at a coarse level based at least in part on the estimated motion direction and the estimated motion range, wherein the coarse level includes a level at ⅟16$^{th}$ the size of an original picture;

perform one or more intermediate stages of the multi-stage sequential hierarchical motion estimation to determine one or more intermediate motion vectors at one or more intermediate levels based at least in part on the initial motion vector, wherein at least one of the intermediate levels includes a level at ¼$^{th}$ the size of the original picture; and perform a final stage of the multi-stage sequential hierarchical motion estimation to determine a final motion vector at a fine level based at least in part on the one or more intermediate motion vectors, wherein the fine level includes a level at the full size of the original picture.

In some examples, the graphics processing unit may be further configured to:

wherein determining the shot change further includes a multi-criteria determination, including:

determine whether one criteria associated with a relationship between a difference between current and previous frame motion vector difference value (diffMVdiffVal) as compared with a spatio temporal index (tscIndex) has been met;

determine whether another criteria associated with a relationship between the spatio temporal index (tscIndex) as compared with the difference value between average frame difference differential (AFDdiff) has been met;

determine whether a further criteria associated with a relationship between a spatial complexity measure (SC) as compared with a difference value between RsCs difference between current and previous frames has been met; and determine whether a still futher criteria associated with a relationship between a current SC and a current average frame difference (AFD) as compared with an SC index and the spatio temporal index (tscIndex) has been met, wherein all of these criteria must be determined to have been met to conclude that a scene change has been detected.

In some examples, the graphics processing unit may be further configured to:

perform a prediction distance calculation to determine an initial p distance based at least in part on the spatial index and the temporal index; and perform a prediction distance calculation to determine an intermediate p distance based at least in part on the initial p distance as well as the determined shot change, wherein a positive shot change detection results in resetting the intermediate p distance value to a frame before the determined shot change frame and flaging the determined shot change frame as an I-picture, wherein a positive gain change detection results in resetting the intermediate p distance value to a frame before that indicated by the initial p distance;

wherein performing the prediction distance calculation to determine the final p distance includes determining the final p distance based at least in part on the intermediate p distance as well as the average frame difference, wherein performing the prediction distance calculation to determine the final p distance includes determining the final p distance based at least in part on a lookup table for spatial complexity measure and temporal spatial measure that is associated with the spatial index and the temporal index, wherein the number of intervening B-picture frames is one value less that the final p distance.

In some examples, the graphics processing unit may be further configured to:

wherein determining the final motion vector further includes performing a final multi-stage sequential hierarchical motion estimation, including:

perform a final first stage of the final multi-stage sequential hierarchical motion estimation to determine a final initial motion vector at a final coarse level, wherein the final coarse level includes a level at $\frac{1}{16}^{th}$ the size of an original picture;

perform one or more final intermediate stages of the final multi-stage sequential hierarchical motion estimation to determine one or more final intermediate motion vectors at one or more final intermediate levels based at least in part on the final initial motion vector, wherein at least one of the final intermediate levels includes a level at $\frac{1}{4}^{th}$ the size of the original picture; and perform a final final stage of the final multi-stage sequential hierarchical motion estimation to determine a final final motion vector at a final fine level based at least in part on the one or more final intermediate motion vectors, wherein the final fine level includes a level at the full size of the original picture.

In some examples, the graphics processing unit may be further configured to:

perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data;

wherein determining the final motion vector further includes performing a final multi-stage sequential hierarchical motion estimation, including:

perform a final first stage of the multi-stage sequential hierarchical motion estimation to determine a final initial motion vector at a final coarse level based at least in part on the estimated motion direction and the estimated motion range, wherein the final coarse level includes a level at $\frac{1}{16}^{th}$ the size of an original picture;

perform one or more final intermediate stages of the final multi-stage sequential hierarchical motion estimation to determine one or more final intermediate motion vectors at one or more final intermediate levels based at least in part on the final initial motion vector, wherein at least one of the final intermediate levels includes a level at $\frac{1}{4}^{th}$ the size of the original picture; and perform a final stage of the multi-stage sequential hierarchical motion estimation to determine a final motion vector at a fine level based at least in part on the one or more intermediate motion vectors, wherein the fine level includes a level at the full size of the original picture.

In some examples, the graphics processing unit may be further configured to:

wherein determining the final motion vector further includes:

perform a final multi-stage motion estimation to determine a high accuracy final motion vector, wherein determining a high accuracy motion vector includes computing a motion vector at one-half pixel, one-fourth pixel or one-eighth pixel resolution.

In some examples, the graphics processing unit may be further configured to:

wherein determining the final motion vector further includes:

perform a final multi-stage motion estimation to determine a high accuracy final motion vector, wherein determining a high accuracy motion vector includes computing a first stage motion vector at one-half pixel accuracy, a second stage motion vector at one-half pixel accuracy, and a final stage motion vector at one-quarter pixel accuracy.

In some examples, the graphics processing unit may be further configured to:

wherein determining the final motion vector further includes:

perform a final multi-stage motion estimation to determine a high accuracy final motion vector, wherein determining a high accuracy motion vector includes computing a first stage motion vector at one-half pixel accuracy, a second stage motion vector at one-half pixel accuracy, and a final stage motion vector at one-eighth pixel accuracy.

In some examples, the graphics processing unit may be further configured to:

perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data;

wherein determining the final motion vector further includes: performing a final multi-stage hierarchical motion estimation (HME) to determine a high accuracy final motion vector, wherein determining the high accuracy motion vector includes computing a motion vector at one-half pixel resolution, one-fourth pixel resolution, or one-eighth pixel resolution.

In some examples, the graphics processing unit may be further configured to:

buffer 4×4 block based Rs/Cs and 16×16 block based Rs/Cs arrays for a frame from a p distance calculator module;

perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based at least in part on the buffered 4×4 block based Rs/Cs and 16×16 block based Rs/Cs arrays;

wherein determining the final motion vector further includes performing a final multi-stage hierarchical motion estimation (HME) to determine a high accuracy final motion vector, wherein determining a high accuracy motion vector includes:
 compute a first stage motion vector based at least in part on the final estimated motion range and the final p distance values;
 compute a second stage motion vector based at least in part on the first stage motion vector, the final estimated motion range, and the final p distance values; and
 compute a final stage motion vector based at least in part on the second stage motion vector, the final estimated motion range, and the final p distance values to generate the high accuracy final motion vector at one-half pixel, one-fourth pixel or one-eighth pixel resolution.

In some examples, the graphics processing unit may be further configured to:
 buffer 4×4 block based Rs/Cs and 16×16 block based Rs/Cs arrays for a frame from a p distance calculator module;
 perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based at least in part on the buffered 4×4 block based Rs/Cs and 16×16 block based Rs/Cs arrays;

wherein determining the final motion vector further includes performing a final multi-stage hierarchical motion estimation (HME) to determine a high accuracy final motion vector, wherein determining a high accuracy motion vector includes:
 compute a first stage motion vector at half pixel resolution based at least in part on the final estimated motion range and the final p distance values;
 compute a second stage motion vector at half pixel resolution based at least in part on the first stage motion vector at half pixel resolution, the final estimated motion range, and the final p distance values; and
 compute a final stage motion vector at one fourth pixel resolution based at least in part on the second stage motion vector at half pixel resolution, the final estimated motion range, and the final p distance values to generate the high accuracy final motion vector at one-half pixel, one-fourth pixel or one-eighth pixel resolution.

In some examples, the graphics processing unit may be further configured to:
 buffer 4×4 block based Rs/Cs and 16×16 block based Rs/Cs arrays for a frame from a p distance calculator module;
 perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based at least in part on the buffered 4×4 block based Rs/Cs and 16×16 block based Rs/Cs arrays;

wherein determining the final motion vector further includes performing a final multi-stage hierarchical motion estimation (HME) to determine a high accuracy final motion vector, wherein determining a high accuracy motion vector includes:
 compute a first stage motion vector at half pixel resolution based at least in part on the final estimated motion range and the final p distance values;
 compute a second stage motion vector at half pixel resolution based at least in part on the first stage motion vector at half pixel resolution, the final estimated motion range, and the final p distance values; and
 compute a final stage motion vector at one eighth pixel resolution based at least in part on the second stage motion vector at half pixel resolution, the final estimated motion range, and the final p distance values to generate the high accuracy final motion vector at one-half pixel, one-fourth pixel or one-eighth pixel resolution.

In some examples, the graphics processing unit may be further configured to:
 perform an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data;

wherein determining the motion vector further includes performing a multi-stage sequential hierarchical motion estimation, including:
 perform a first stage of the multi-stage sequential hierarchical motion estimation to determine an initial motion vector at a coarse level based at least in part on the estimated motion direction and the estimated motion range, wherein the coarse level includes a level at $\frac{1}{16}^{th}$ the size of an original picture;
 perform one or more intermediate stages of the multi-stage sequential hierarchical motion estimation to determine one or more intermediate motion vectors at one or more intermediate levels based at least in part on the initial motion vector, wherein at least one of the intermediate levels includes a level at $\frac{1}{4}^{th}$ the size of the original picture; and
 perform a final stage of the multi-stage sequential hierarchical motion estimation to determine a final motion vector at a fine level based at least in part on the one or more intermediate motion vectors, wherein the fine level includes a level at the full size of the original picture;

wherein determining the shot change further includes a multi-criteria determination, including:
  determine whether one criteria associated with a relationship between a difference between current and previous frame motion vector difference value (diffMVdiffVal) as compared with a spatio temporal index (tscIndex) has been met;
  determine whether another criteria associated with a relationship between the spatio temporal index (tscIndex) as compared with the difference value between average frame difference differential (AFDdiff) has been met;
  determine whether a further criteria associated with a relationship between a spatial complexity measure (SC) as compared with a difference value between RsCs difference between current and previous frames has been met; and
  determine whether a still futher criteria associated with a relationship between a current SC and a current average frame difference (AFD) as compared with an SC index and the spatio temporal index (tscIndex) has been met, and wherein all of these criteria must be determined to have been met to conclude that a scene change has been detected;
perform a prediction distance calculation to determine an initial p distance based at least in part on the spatial index and the temporal index;
perform a prediction distance calculation to determine an intermediate p distance based at least in part on the initial p distance as well as the determined shot change, wherein a positive shot change detection results in resetting the intermediate p distance value to a frame before the determined shot change frame and flaging the determined shot change frame as an I-picture, wherein a positive gain change detection results in resetting the intermediate p distance value to a frame before that indicated by the initial p distance, wherein performing the prediction distance calculation to determine the final p distance includes determining the final p distance based at least in part on the intermediate p distance as well as the average frame difference, wherein performing the prediction distance calculation to determine the final p distance includes determining the final p distance based at least in part on a lookup table for spatial complexity measure and temporal spatial measure that is associated with the spatial index and the temporal index, and wherein the number of intervening B-picture frames is one value less that the final p distance,
buffer 4×4 block based Rs/Cs and 16×16 block based Rs/Cs arrays for a frame from a p distance calculator module;
  perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based at least in part on the buffered 4×4 block based Rs/Cs and 16×16 block based Rs/Cs arrays;
  wherein determining the final motion vector further includes performing a final multi-stage sequential hierarchical motion estimation, including:
    perform a final first stage of the multi-stage sequential hierarchical motion estimation at half pixel resolution to determine a final initial motion vector at a final coarse level based at least in part on the estimated motion direction and the estimated motion range, wherein the final coarse level includes a level at $\frac{1}{16}^{th}$ the size of an original picture;
    perform one or more final intermediate stages of the final multi-stage sequential hierarchical motion estimation at half pixel resolution to determine one or more final intermediate motion vectors at one or more final intermediate levels based at least in part on the final initial motion vector, wherein at least one of the final intermediate levels includes a level at $\frac{1}{4}^{th}$ the size of the original picture; and
    perform a final stage of the multi-stage sequential hierarchical motion estimation at one-fourth pixel or one-eighth pixel resolution to determine a final motion vector at a fine level based at least in part on the one or more intermediate motion vectors, wherein the fine level includes a level at the full size of the original picture.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for calculating prediction distance of a previous frame with respect to a current frame, when motion estimation and compensation for video coding is being performed between the current frame and the previous frame, comprising:
  receiving input video data;
  performing spatial analysis to determine a spatial complexity measure as well as horizontal and vertical texture direction data based on input video data;
  computing a motion estimate between consecutive frames to determine a motion vector;
  computing a sum of absolute differences and an average frame difference based on the determined motion vector;
  computing a temporal-spatial activity to determine a spatial index as well as a temporal index based on the sum of absolute differences, the average frame difference, the determined motion vector, the spatial complexity measure as well as the horizontal and vertical texture direction data, wherein the spatial index is determine based on the spatial complexity measure and the temporal index is determined based on the sum of absolute differences;
  performing gain change detection based on the input video data;
  performing shot change detection to determine a shot change based on the gain, the spatial index, the temporal index, the spatial complexity measure, as well as the horizontal and vertical texture direction data;

performing a prediction distance calculation to determine a final p distance based on the spatial index, the temporal index, the determined shot change, and the average frame difference, wherein the p distance indicates a distance between frames to be encoded;

computing a final motion estimate of a frame with respect to a past frame to determine a final motion vector based on the final p distance; and generating an encoded bitstream of video data that has been compressed based on the above video coding operations.

2. The method of claim 1, further comprising:
performing an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data.

3. The method of claim 1,
wherein determining the motion vector further comprises performing a multi-stage sequential hierarchical motion estimation, comprising:
performing a first stage of the multi-stage sequential hierarchical motion estimation to determine an initial motion vector at a coarse level, wherein the coarse level comprises a level at $1/16^{th}$ the size of an original picture;
performing one or more intermediate stages of the multi-stage sequential hierarchical motion estimation to determine one or more intermediate motion vectors at one or more intermediate levels based on the initial motion vector, wherein at least one of the intermediate levels comprises a level at $1/4^{th}$ the size of the original picture; and
performing a final stage of the multi-stage sequential hierarchical motion estimation to determine a final motion vector at a fine level based on the one or more intermediate motion vectors, wherein the fine level comprises a level at the full size of the original picture.

4. The method of claim 1, further comprising:
performing an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data;
wherein determining the motion vector further comprises performing a multi-stage sequential hierarchical motion estimation, comprising:
performing a first stage of the multi-stage sequential hierarchical motion estimation to determine an initial motion vector at a coarse level based on the estimated motion direction and the estimated motion range, wherein the coarse level comprises a level at $1/16^{th}$ the size of an original picture;
performing one or more intermediate stages of the multi-stage sequential hierarchical motion estimation to determine one or more intermediate motion vectors at one or more intermediate levels based on the initial motion vector, wherein at least one of the intermediate levels comprises a level at $1/4^{th}$ the size of the original picture; and
performing a final stage of the multi-stage sequential hierarchical motion estimation to determine a final motion vector at a fine level based on the one or more intermediate motion vectors, wherein the fine level comprises a level at the full size of the original picture.

5. The method of claim 1, further comprising:
wherein determining the shot change further comprises a multi-criteria determination, comprising:
performing the shot change detection based at least in part on a relationship between a difference between current and previous frame motion vector difference value (diffMVdiffVal) as compared with a spatio temporal index (tscIndex);
performing the shot change detection based at least in part on a relationship between the spatio temporal index (tscIndex) as compared with the difference value between average frame difference differential (AFDdiff);
performing the shot change detection based at least in part on a relationship between a spatial complexity measure (SC) as compared with a difference value between RsCs difference between current and previous frames; and
performing the shot change detection based at least in part on a relationship between a current SC and a current average frame difference (AFD) as compared with an SC index and the spatio temporal index (tscIndex).

6. The method of claim 1, further comprising:
performing a prediction distance calculation to determine an initial p distance based on the spatial index and the temporal index; and
performing a prediction distance calculation to determine an intermediate p distance based on the initial p distance as well as the determined shot change, wherein a positive shot change detection results in resetting the intermediate p distance value to a frame before the determined shot change frame and flagging the determined shot change frame as an I-picture;
wherein performing the prediction distance calculation to determine the final p distance includes determining the final p distance based on the intermediate p distance as well as the average frame difference,
wherein performing the prediction distance calculation to determine the final p distance includes determining the final p distance based on a lookup table for spatial complexity measure and temporal spatial measure that is associated with the spatial index and the temporal index,
wherein the number of intervening B-picture frames is one value less than the final p distance.

7. The method of claim 1, further comprising:
wherein determining the final motion vector further comprises performing a final multi-stage sequential hierarchical motion estimation, comprising:
performing a final first stage of the final multi-stage sequential hierarchical motion estimation to determine a final initial motion vector at a final coarse level, wherein the final coarse level comprises a level at $1/16^{th}$ the size of an original picture;
performing one or more final intermediate stages of the final multi-stage sequential hierarchical motion estimation to determine one or more final intermediate motion vectors at one or more final intermediate levels based on the final initial motion vector, wherein at least one of the final intermediate levels comprises a level at ¼$^{th}$ the size of the original picture; and performing an ultimate final stage of the final multi-stage sequential hierarchical motion estimation to determine an ultimate final motion vector at a final fine level based on the one or more final intermediate motion vectors, wherein the final fine level comprises a level at the full size of the original picture.

8. The method of claim 1, further comprising:

performing a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data;

wherein determining the final motion vector further comprises performing a final multi-stage sequential hierarchical motion estimation, comprising:

performing a final first stage of the multi-stage sequential hierarchical motion estimation to determine a final initial motion vector at a final coarse level based on the estimated motion direction and the estimated motion range, wherein the final coarse level comprises a level at ¹/₁₆$^{th}$ the size of an original picture;

performing one or more final intermediate stages of the final multi-stage sequential hierarchical motion estimation to determine one or more final intermediate motion vectors at one or more final intermediate levels based on the final initial motion vector, wherein at least one of the final intermediate levels comprises a level at ¼$^{th}$ the size of the original picture; and performing a final stage of the multi-stage sequential hierarchical motion estimation to determine a final motion vector at a fine level based on the one or more intermediate motion vectors, wherein the fine level comprises a level at the full size of the original picture.

9. The method of claim 1, wherein determining the final motion vector further comprises:

performing a final multi-stage motion estimation to determine a high accuracy final motion vector, wherein determining a high accuracy motion vector comprises computing a motion vector at one-half pixel, one-fourth pixel or one-eighth pixel resolution.

10. The method of claim 1, wherein determining the final motion vector further comprises:

performing a final multi-stage motion estimation to determine a high accuracy final motion vector, wherein determining a high accuracy motion vector comprises computing a first stage motion vector at one-half pixel accuracy, a second stage motion vector at one-half pixel accuracy, and a final stage motion vector at one-quarter pixel accuracy.

11. The method of claim 1, wherein determining the final motion vector further comprises:

performing a final multi-stage motion estimation to determine a high accuracy final motion vector, wherein determining a high accuracy motion vector comprises computing a first stage motion vector at one-half pixel accuracy, a second stage motion vector at one-half pixel accuracy, and a final stage motion vector at one-eighth pixel accuracy.

12. The method of claim 1, further comprising:

performing a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data;

wherein determining the final motion vector further comprises: performing a final multi-stage hierarchical motion estimation (HME) to determine a high accuracy final motion vector, wherein determining the high accuracy motion vector comprises computing a motion vector at one-half pixel resolution, one-fourth pixel resolution, or one-eighth pixel resolution.

13. The method of claim 1, further comprising:

buffering 4×4 block based Rs/Cs and 16×16 block based Rs/Cs arrays for a frame from a p distance calculator module;

performing a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based on the buffered 4×4 block based Rs/Cs and 16×16 block based Rs/Cs arrays;

wherein determining the final motion vector further comprises: performing a final multi-stage hierarchical motion estimation (HME) to determine a high accuracy final motion vector, wherein determining a high accuracy motion vector comprises:

computing a first stage motion vector based on the final estimated motion range and the final p distance values;

computing a second stage motion vector based on the first stage motion vector, the final estimated motion range, and the final p distance values; and computing a final stage motion vector based on the second stage motion vector, the final estimated motion range, and the final p distance values to generate the high accuracy final motion vector at one-half pixel, one-fourth pixel or one-eighth pixel resolution.

14. The method of claim 1, further comprising:

buffering 4×4 block based Rs/Cs and 16×16 block based Rs/Cs arrays for a frame from a p distance calculator module;

performing a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based on the buffered 4×4 block based Rs/Cs and 16×16 block based Rs/Cs arrays;

wherein determining the final motion vector further comprises: performing a final multi-stage hierarchical motion estimation (HME) to determine a high accuracy final motion vector, wherein determining a high accuracy motion vector comprises:

computing a first stage motion vector at half pixel resolution based on the final estimated motion range and the final p distance values;

computing a second stage motion vector at half pixel resolution based on the first stage motion vector at half pixel resolution, the final estimated motion range, and the final p distance values; and computing a final stage motion vector at one fourth pixel resolution based on the second stage motion vector at half pixel resolution, the final estimated motion range, and the final p distance values to generate the high accuracy final motion vector at one-half pixel, one-fourth pixel or one-eighth pixel resolution.

15. The method of claim 1, further comprising:

buffering 4×4 block based Rs/Cs and 16×16 block based Rs/Cs arrays for a frame from a p distance calculator module;

performing a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based on the buffered 4×4 block based Rs/Cs and 16×16 block based Rs/Cs arrays;

wherein determining the final motion vector further comprises: performing a final multi-stage hierarchical motion estimation (HME) to determine a high accuracy final motion vector, wherein determining a high accuracy motion vector comprises:

computing a first stage motion vector at half pixel resolution based on the final estimated motion range and the final p distance values;

computing a second stage motion vector at half pixel resolution based on the first stage motion vector at half pixel resolution, the final estimated motion range, and the final p distance values; and computing a final stage motion vector at one eighth pixel resolution based on the second stage motion vector at half pixel resolution, the final estimated motion range, and the final p distance values to generate the high accuracy final motion vector at one-half pixel, one-fourth pixel or one-eighth pixel resolution.

16. The method of claim 1, further comprising:

performing an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data;

wherein determining the motion vector further comprises performing a multi-stage sequential hierarchical motion estimation, comprising:

performing a first stage of the multi-stage sequential hierarchical motion estimation to determine an initial motion vector at a coarse level based on the estimated motion direction and the estimated motion range, wherein the coarse level comprises a level at $\frac{1}{16}^{th}$ the size of an original picture;

performing one or more intermediate stages of the multi-stage sequential hierarchical motion estimation to determine one or more intermediate motion vectors at one or more intermediate levels based on the initial motion vector, wherein at least one of the intermediate levels comprises a level at $\frac{1}{4}^{th}$ the size of the original picture; and performing a final stage of the multi-stage sequential hierarchical motion estimation to determine a final motion vector at a fine level based on the one or more intermediate motion vectors, wherein the fine level comprises a level at the full size of the original picture;

wherein determining the shot change further comprises a multi-criteria determination, comprising:

performing the shot change detection based at least in part on a relationship between a difference between current and previous frame motion vector difference value (diffMVdiffVal) as compared with a spatio temporal index (tscIndex);

performing the shot change detection based at least in part on a relationship between the spatio temporal index (tscIndex) as compared with the difference value between average frame difference differential (AFDdiff);

performing the shot change detection based at least in part on a relationship between a spatial complexity measure (SC) as compared with a difference value between RsCs difference between current and previous frames; and performing the shot change detection based at least in part on a relationship between a current SC and a current average frame difference (AFD) as compared with an SC index and the spatio temporal index (tscIndex);

performing a prediction distance calculation to determine an initial p distance based on the spatial index and the temporal index;

performing a prediction distance calculation to determine an intermediate p distance based on the initial p distance as well as the determined shot change, wherein a positive shot change detection results in resetting the intermediate p distance value to a frame before the determined shot change frame and flagging the determined shot change frame as an I-picture, wherein performing the prediction distance calculation to determine the final p distance includes determining the final p distance based on the intermediate p distance as well as the average frame difference, wherein performing the prediction distance calculation to determine the final p distance includes determining the final p distance based on a lookup table for spatial complexity measure and temporal spatial measure that is associated with the spatial index and the temporal index, and wherein the number of intervening B-picture frames is one value less than the final p distance, buffering 4×4 block based Rs/Cs and 16×16 block based Rs/Cs arrays for a frame from a p distance calculator module;

performing a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based on the buffered 4×4 block based Rs/Cs and 16×16 block based Rs/Cs arrays;

wherein determining the final motion vector further comprises performing a final multi-stage sequential hierarchical motion estimation, comprising:

performing a final first stage of the multi-stage sequential hierarchical motion estimation at half pixel resolution to determine a final initial motion vector at a final coarse level based on the estimated motion direction and the estimated motion range, wherein the final coarse level comprises a level at $\frac{1}{16}^{th}$ the size of an original picture;

performing one or more final intermediate stages of the final multi-stage sequential hierarchical motion estimation at half pixel resolution to determine one or more final intermediate motion vectors at one or more final intermediate levels based on the final initial motion vector, wherein at least one of the final intermediate levels comprises a level at $\frac{1}{4}^{th}$ the size of the original picture; and performing a final stage of the multi-stage sequential hierarchical motion estimation at one-fourth pixel or one-eighth pixel resolution to determine a final motion vector at a fine level based on the one or more intermediate motion vectors, wherein the fine level comprises a level at the full size of the original picture.

17. A video encoder comprising:
an image buffer; and
a graphics processing unit configured to:
receive input video data;
perform of spatial analysis to determine a spatial complexity measure as well as horizontal and vertical texture direction data based on input video data;
compute a motion estimate between consecutive frames to determine a motion vector;
compute a sum of absolute differences and an average frame difference based on the determined motion vector;
compute a temporal-spatial activity to determine a spatial index as well as a temporal index based on the sum of absolute differences, the average frame difference, the determined motion vector, the spatial complexity measure as well as the horizontal and vertical texture direction data, wherein the spatial index is determine based on the spatial complexity measure and the temporal index is determined based on the sum of absolute differences;
perform gain change detection based on the input video data;

perform shot change detection to determine a shot change based on the gain, the spatial index, the temporal index, the spatial complexity measure, as well as the horizontal and vertical texture direction data;

perform a prediction distance calculation to determine a final p distance based on the spatial index, the temporal index, the determined shot change, and the average frame difference, wherein the p distance indicates a distance between frames to be encoded;

compute a final motion estimate of a frame with respect to a past frame to determine a final motion vector based on the final p distance; and generate an encoded bitstream of video data that has been compressed based on the above video coding operations.

18. The video encoder of claim 17, the graphics processing unit further configured to:
perform an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data.

19. The video encoder of claim 17, the graphics processing unit further configured to:
wherein determining the motion vector further comprises performing a multi-stage sequential hierarchical motion estimation, comprising:
perform a first stage of the multi-stage sequential hierarchical motion estimation to determine an initial motion vector at a coarse level, wherein the coarse level comprises a level at $\frac{1}{16}^{th}$ the size of an original picture;
perform one or more intermediate stages of the multi-stage sequential hierarchical motion estimation to determine one or more intermediate motion vectors at one or more intermediate levels based on the initial motion vector, wherein at least one of the intermediate levels comprises a level at $\frac{1}{4}^{th}$ the size of the original picture; and
perform a final stage of the multi-stage sequential hierarchical motion estimation to determine a final motion vector at a fine level based on the one or more intermediate motion vectors, wherein the fine level comprises a level at the full size of the original picture.

20. The video encoder of claim 17, the graphics processing unit further configured to:
perform an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data;
wherein determining the motion vector further comprises performing a multi-stage sequential hierarchical motion estimation, comprising:
perform a first stage of the multi-stage sequential hierarchical motion estimation to determine an initial motion vector at a coarse level based on the estimated motion direction and the estimated motion range, wherein the coarse level comprises a level at $\frac{1}{16}^{th}$ the size of an original picture;

perform one or more intermediate stages of the multi-stage sequential hierarchical motion estimation to determine one or more intermediate motion vectors at one or more intermediate levels based on the initial motion vector, wherein at least one of the intermediate levels comprises a level at $\frac{1}{4}^{th}$ the size of the original picture; and perform a final stage of the multi-stage sequential hierarchical motion estimation to determine a final motion vector at a fine level based on the one or more intermediate motion vectors, wherein the fine level comprises a level at the full size of the original picture.

21. The video encoder of claim 17, the graphics processing unit further configured to:

wherein determining the shot change further comprises a multi-criteria determination, comprising:

performing the shot change detection based at least in part on a relationship between a difference between current and previous frame motion vector difference value (diffMVdiffVal) as compared with a spatio temporal index (tscIndex);

performing the shot change detection based at least in part on a relationship between the spatio temporal index (tscIndex) as compared with the difference value between average frame difference differential (AFDdiff);

performing the shot change detection based at least in part on a relationship between a spatial complexity measure (SC) as compared with a difference value between RsCs difference between current and previous frames; and performing the shot change detection based at least in part on a relationship between a current SC and a current average frame difference (AFD) as compared with an SC index and the spatio temporal index (tscIndex).

22. The video encoder of claim 17, the graphics processing unit further configured to:

perform a prediction distance calculation to determine an initial p distance based on the spatial index and the temporal index; and perform a prediction distance calculation to determine an intermediate p distance based on the initial p distance as well as the determined shot change, wherein a positive shot change detection results in resetting the intermediate p distance value to a frame before the determined shot change frame and flagging the determined shot change frame as an I-picture;

wherein performing the prediction distance calculation to determine the final p distance includes determining the final p distance based on the intermediate p distance as well as the average frame difference, wherein performing the prediction distance calculation to determine the final p distance includes determining the final p distance based on a lookup table for spatial complexity measure and temporal spatial measure that is associated with the spatial index and the temporal index, wherein the number of intervening B-picture frames is one value less than the final p distance.

23. The video encoder of claim 17, the graphics processing unit further configured to:

wherein determining the final motion vector further comprises performing a final multi-stage sequential hierarchical motion estimation, comprising:

perform a final first stage of the final multi-stage sequential hierarchical motion estimation to determine a final initial motion vector at a final coarse level, wherein the final coarse level comprises a level at $\frac{1}{16}^{th}$ the size of an original picture;

perform one or more final intermediate stages of the final multi-stage sequential hierarchical motion estimation to determine one or more final intermediate motion vectors at one or more final intermediate levels based on the final initial motion vector, wherein at least one of the final intermediate levels comprises a level at $\frac{1}{4}^{th}$ the size of the original picture; and perform an ultimate final stage of the final multi-stage sequential hierarchical motion estimation to determine an ultimate final motion vector at a final fine level based on the one or more final intermediate motion vectors, wherein the final fine level comprises a level at the full size of the original picture.

24. The video encoder of claim 17, the graphics processing unit further configured to:

perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data;

wherein determining the final motion vector further comprises performing a final multi-stage sequential hierarchical motion estimation, comprising:

perform a final first stage of the multi-stage sequential hierarchical motion estimation to determine a final initial motion vector at a final coarse level based on the estimated motion direction and the estimated motion range, wherein the final coarse level comprises a level at $\frac{1}{16}^{th}$ the size of an original picture;

perform one or more final intermediate stages of the final multi-stage sequential hierarchical motion estimation to determine one or more final intermediate motion vectors at one or more final intermediate levels based on the final initial motion vector, wherein at least one of the final intermediate levels comprises a level at $\frac{1}{4}^{th}$ the size of the original picture; and perform a final stage of the multi-stage sequential hierarchical motion estimation to determine a final motion vector at a fine level based on the one or more intermediate motion vectors, wherein the fine level comprises a level at the full size of the original picture.

25. The video encoder of claim 17, wherein determining the final motion vector further comprises:

perform a final multi-stage motion estimation to determine a high accuracy final motion vector, wherein determining a high accuracy motion vector comprises computing a motion vector at one-half pixel, one-fourth pixel or one-eighth pixel resolution.

26. The video encoder of claim 17, wherein determining the final motion vector further comprises:

perform a final multi-stage motion estimation to determine a high accuracy final motion vector, wherein determining a high accuracy motion vector comprises computing a first stage motion vector at one-half pixel accuracy, a second stage motion vector at one-half pixel accuracy, and a final stage motion vector at one-quarter pixel accuracy.

27. The video encoder of claim 17,
wherein determining the final motion vector further comprises:
perform a final multi-stage motion estimation to determine a high accuracy final motion vector, wherein determining a high accuracy motion vector comprises computing a first stage motion vector at one-half pixel accuracy, a second stage motion vector at one-half pixel accuracy, and a final stage motion vector at one-eighth pixel accuracy.

28. The video encoder of claim 17, the graphics processing unit further configured to:
perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data;
wherein determining the final motion vector further comprises: performing a final multi-stage hierarchical motion estimation (HME) to determine a high accuracy final motion vector, wherein determining the high accuracy motion vector comprises computing a motion vector at one-stage pixel resolution, one-fourth pixel resolution, or one-eighth pixel resolution.

29. The video encoder of claim 17, the graphics processing unit further configured to:
buffer 4×4 block based Rs/Cs and 16×16 block based Rs/Cs arrays for a frame from a p distance calculator module;
perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based on the buffered 4×4 block based Rs/Cs and 16×16 block based Rs/Cs arrays;
wherein determining the final motion vector further comprises performing a final multi-stage hierarchical motion estimation (HME) to determine a high accuracy final motion vector, wherein determining a high accuracy motion vector comprises:
compute a first stage motion vector based on the final estimated motion range and the final p distance values;
compute a second stage motion vector based on the first stage motion vector, the final estimated motion range, and the final p distance values; and
compute a final stage motion vector based on the second stage motion vector, the final estimated motion range, and the final p distance values to generate the high accuracy final motion vector at one-half pixel, one-fourth pixel or one-eighth pixel resolution.

30. The video encoder of claim 17, the graphics processing unit further configured to:
buffer 4×4 block based Rs/Cs and 16×16 block based Rs/Cs arrays for a frame from a p distance calculator module;
perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based on the buffered 4×4 block based Rs/Cs and 16×16 block based Rs/Cs arrays;
wherein determining the final motion vector further comprises performing a final multi-stage hierarchical motion estimation (HME) to determine a high accuracy final motion vector, wherein determining a high accuracy motion vector comprises:
compute a first stage motion vector at half pixel resolution based on the final estimated motion range and the final p distance values;
compute a second stage motion vector at half pixel resolution based on the first stage motion vector at half pixel resolution, the final estimated motion range, and the final p distance values; and
compute a final stage motion vector at one fourth pixel resolution based on the second stage motion vector at half pixel resolution, the final estimated motion range, and the final p distance values to generate the high accuracy final motion vector at one-half pixel, one-fourth pixel or one-eighth pixel resolution.

31. The video encoder of claim 17, the graphics processing unit further configured to:
buffer 4×4 block based Rs/Cs and 16×16 block based Rs/Cs arrays for a frame from a p distance calculator module;
perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based on the buffered 4×4 block based Rs/Cs and 16×16 block based Rs/Cs arrays;
wherein determining the final motion vector further comprises performing a final multi-stage hierarchical motion estimation (HME) to determine a high accuracy final motion vector, wherein determining a high accuracy motion vector comprises:
compute a first stage motion vector at half pixel resolution based on the final estimated motion range and the final p distance values;

compute a second stage motion vector at half pixel resolution based on the first stage motion vector at half pixel resolution, the final estimated motion range, and the final p distance values; and compute a final stage motion vector at one eighth pixel resolution based on the second stage motion vector at half pixel resolution, the final estimated motion range, and the final p distance values to generate the high accuracy final motion vector at one-half pixel, one-fourth pixel or one-eighth pixel resolution.

32. The video encoder of claim 17, the graphics processing unit further configured to:

perform an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data;

wherein determining the motion vector further comprises performing a multi-stage sequential hierarchical motion estimation, comprising:

perform a first stage of the multi-stage sequential hierarchical motion estimation to determine an initial motion vector at a coarse level based on the estimated motion direction and the estimated motion range, wherein the coarse level comprises a level at $\frac{1}{16}^{th}$ the size of an original picture;

perform one or more intermediate stages of the multi-stage sequential hierarchical motion estimation to determine one or more intermediate motion vectors at one or more intermediate levels based on the initial motion vector, wherein at least one of the intermediate levels comprises a level at $\frac{1}{4}^{th}$ the size of the original picture; and perform a final stage of the multi-stage sequential hierarchical motion estimation to determine a final motion vector at a fine level based on the one or more intermediate motion vectors, wherein the fine level comprises a level at the full size of the original picture;

wherein determining the shot change further comprises a multi-criteria determination, comprising:

performing the shot change detection based at least in part on a relationship between a difference between current and previous frame motion vector difference value (diffMVdiffVal) as compared with a spatio temporal index (tscIndex);

performing the shot change detection based at least in part on a relationship between the spatio temporal index (tscIndex) as compared with the difference value between average frame difference differential (AFDdiff);

performing the shot change detection based at least in part on a relationship between a spatial complexity measure (SC) as compared with a difference value between RsCs difference between current and previous frames; and performing the shot change detection based at least in part on a relationship between a current SC and a current average frame difference (AFD) as compared with an SC index and the spatio temporal index (tscIndex);

perform a prediction distance calculation to determine an initial p distance based on the spatial index and the temporal index;

perform a prediction distance calculation to determine an intermediate p distance based on the initial p distance as well as the determined shot change, wherein a positive shot change detection results in resetting the intermediate p distance value to a frame before the determined shot change frame and flagging the determined shot change frame as an I-picture, wherein performing the prediction distance calculation to determine the final p distance includes determining the final p distance based on the intermediate p distance as well as the average frame difference, wherein performing the prediction distance calculation to determine the final p distance includes determining the final p distance based on a lookup table for spatial complexity measure and temporal spatial measure that is associated with the spatial index and the temporal index, and wherein the number of intervening B-picture frames is one value less than the final p distance, buffer 4×4 block based Rs/Cs and 16×16 block based Rs/Cs arrays for a frame from a p distance calculator module;

perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based on the buffered 4×4 block based Rs/Cs and 16×16 block based Rs/Cs arrays;

wherein determining the final motion vector further comprises performing a final multi-stage sequential hierarchical motion estimation, comprising:

perform a final first stage of the multi-stage sequential hierarchical motion estimation at half pixel resolution to determine a final initial motion vector at a final coarse level based on the estimated motion direction and the estimated motion range, wherein the final coarse level comprises a level at $\frac{1}{16}^{th}$ the size of an original picture;

perform one or more final intermediate stages of the final multi-stage sequential hierarchical motion estimation at half pixel resolution to determine one or more final intermediate motion vectors at one or more final intermediate levels based on the final initial motion vector, wherein at least one of the final intermediate levels comprises a level at $\frac{1}{4}^{th}$ the size of the original picture; and perform a final stage of the multi-stage sequential hierarchical motion estimation at one-fourth pixel or one-eighth pixel resolution to determine a final motion vector at a fine level based on the one or more intermediate motion vectors, wherein the fine level comprises a level at the full size of the original picture.

33. At least one non-transitory machine readable medium comprising a plurality of instructions that in response to being executed on a computing device, cause the computing device to:

receive input video data;

perform of spatial analysis to determine a spatial complexity measure as well as horizontal and vertical texture direction data based on input video data;

compute a motion estimate between consecutive frames to determine a motion vector;

computing a sum of absolute differences and an average frame difference based on the determined motion vector;

compute a temporal-spatial activity to determine a spatial index as well as a temporal index based on the sum of absolute differences, the average frame difference, the determined motion vector, the spatial complexity measure as well as the horizontal and vertical texture direction data wherein the spatial index is determine based on the spatial complexity measure and the temporal index is determined based on the sum of absolute differences;

perform gain change detection based on the input video data;

perform shot change detection to determine a shot change based on the gain, the spatial index, the temporal index, the spatial complexity measure, as well as the horizontal and vertical texture direction data;

perform a prediction distance calculation to determine a final p distance based on the spatial index, the temporal index, the determined shot change, and the average frame difference, wherein the p distance indicates a distance between frames to be encoded;

compute a final motion estimate of a frame with respect to a past frame to determine a final motion vector based on the final p distance; and generate an encoded bitstream of video data that has been compressed based on the above video coding operations.

34. The machine readable medium of claim 33, further comprising instructions that in response to being executed on the computing device, cause the computing device to:
perform an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data.

35. The machine readable medium of claim 33, further comprising instructions that in response to being executed on the computing device, cause the computing device to:
wherein determining the motion vector further comprises performing a multi-stage sequential hierarchical motion estimation, comprising:
perform a first stage of the multi-stage sequential hierarchical motion estimation to determine an initial motion vector at a coarse level, wherein the coarse level comprises a level at $1/16^{th}$ the size of an original picture;
perform one or more intermediate stages of the multi-stage sequential hierarchical motion estimation to determine one or more intermediate motion vectors at one or more intermediate levels based on the initial motion vector, wherein at least one of the intermediate levels comprises a level at $1/4^{th}$ the size of the original picture; and
perform a final stage of the multi-stage sequential hierarchical motion estimation to determine a final motion vector at a fine level based on the one or more intermediate motion vectors, wherein the fine level comprises a level at the full size of the original picture.

36. The machine readable medium of claim 33, further comprising instructions that in response to being executed on the computing device, cause the computing device to:
perform an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data;
wherein determining the motion vector further comprises performing a multi-stage sequential hierarchical motion estimation, comprising:
perform a first stage of the multi-stage sequential hierarchical motion estimation to determine an initial motion vector at a coarse level based on the estimated motion direction and the estimated motion range, wherein the coarse level comprises a level at $1/16^{th}$ the size of an original picture;
perform one or more intermediate stages of the multi-stage sequential hierarchical motion estimation to determine one or more intermediate motion vectors at one or more intermediate levels based on the initial motion vector, wherein at least one of the intermediate levels comprises a level at $1/4^{th}$ the size of the original picture; and
perform a final stage of the multi-stage sequential hierarchical motion estimation to determine a final motion vector at a fine level based on the one or more intermediate motion vectors, wherein the fine level comprises a level at the full size of the original picture.

37. The machine readable medium of claim 33, further comprising instructions that in response to being executed on the computing device, cause the computing device to:
wherein determining the shot change further comprises a multi-criteria determination, comprising:
performing the shot change detection based at least in part on a relationship between a difference between current and previous frame motion vector difference value (diffMVdiffVal) as compared with a spatio temporal index (tscIndex) has exceeded a threshold value;
performing the shot change detection based at least in part on a relationship between the spatio temporal index (tscIndex) as compared with the difference value between average frame difference differential (AFDdiff) has exceeded a threshold value;
performing the shot change detection based at least in part on a relationship between a spatial complexity measure (SC) as compared with a difference value between RsCs difference between current and previous frames has exceeded a threshold value; and
performing the shot change detection based at least in part on a relationship between a current SC and a current average frame difference (AFD) as compared with an SC index and the spatio temporal index (tscIndex).

38. The machine readable medium of claim 33, further comprising instructions that in response to being executed on the computing device, cause the computing device to:
perform a prediction distance calculation to determine an initial p distance based on the spatial index and the temporal index; and
perform a prediction distance calculation to determine an intermediate p distance based on the initial p distance as well as the determined shot change, wherein a positive shot change detection results in resetting the intermediate p distance value to a frame before the determined shot change frame and flagging the determined shot change frame as an I-picture;

wherein performing the prediction distance calculation to determine the final p distance includes determining the final p distance based on the intermediate p distance as well as the average frame difference, wherein performing the prediction distance calculation to determine the final p distance includes determining the final p distance based on a lookup table for spatial complexity measure and temporal spatial measure that is associated with the spatial index and the temporal index, wherein the number of intervening B-picture frames is one value less than the final p distance.

39. The machine readable medium of claim 33, further comprising instructions that in response to being executed on the computing device, cause the computing device to:

wherein determining the final motion vector further comprises performing a final multi-stage sequential hierarchical motion estimation, comprising:

perform a final first stage of the final multi-stage sequential hierarchical motion estimation to determine a final initial motion vector at a final coarse level, wherein the final coarse level comprises a level at $\frac{1}{16}^{th}$ the size of an original picture;

perform one or more final intermediate stages of the final multi-stage sequential hierarchical motion estimation to determine one or more final intermediate motion vectors at one or more final intermediate levels based on the final initial motion vector, wherein at least one of the final intermediate levels comprises a level at $\frac{1}{4}^{th}$ the size of the original picture; and perform an ultimate final stage of the final multi-stage sequential hierarchical motion estimation to determine an ultimate final motion vector at a final fine level based on the one or more final intermediate motion vectors, wherein the final fine level comprises a level at the full size of the original picture.

40. The machine readable medium of claim 33, further comprising instructions that in response to being executed on the computing device, cause the computing device to:

perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data;

wherein determining the final motion vector further comprises performing a final multi-stage sequential hierarchical motion estimation, comprising:

perform a final first stage of the multi-stage sequential hierarchical motion estimation to determine a final initial motion vector at a final coarse level based on the estimated motion direction and the estimated motion range, wherein the final coarse level comprises a level at $\frac{1}{16}^{th}$ the size of an original picture;

perform one or more final intermediate stages of the final multi-stage sequential hierarchical motion estimation to determine one or more final intermediate motion vectors at one or more final intermediate levels based on the final initial motion vector, wherein at least one of the final intermediate levels comprises a level at $\frac{1}{4}^{th}$ the size of the original picture; and perform a final stage of the multi-stage sequential hierarchical motion estimation to determine a final motion vector at a fine level based on the one or more intermediate motion vectors, wherein the fine level comprises a level at the full size of the original picture.

41. The machine readable medium of claim 33, wherein determining the final motion vector further comprises:

perform a final multi-stage motion estimation to determine a high accuracy final motion vector, wherein determining a high accuracy motion vector comprises computing a motion vector at one-half pixel, one-fourth pixel or one-eighth pixel resolution.

42. The machine readable medium of claim 33, wherein determining the final motion vector further comprises:

perform a final multi-stage motion estimation to determine a high accuracy final motion vector, wherein determining a high accuracy motion vector comprises computing a first stage motion vector at one-half pixel accuracy, a second stage motion vector at one-half pixel accuracy, and a final stage motion vector at one-quarter pixel accuracy.

43. The machine readable medium of claim 33, wherein determining the final motion vector further comprises:

perform a final multi-stage motion estimation to determine a high accuracy final motion vector, wherein determining a high accuracy motion vector comprises computing a first stage motion vector at one-half pixel accuracy, a second stage motion vector at one-half pixel accuracy, and a final stage motion vector at one-eighth pixel accuracy.

44. The machine readable medium of claim 33, further comprising instructions that in response to being executed on the computing device, cause the computing device to:

perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data;

wherein determining the final motion vector further comprises: performing a final multi-stage hierarchical motion estimation (HME) to determine a high accuracy final motion vector, wherein determining the high accuracy motion vector comprises computing a motion vector at one-half pixel resolution, one-fourth pixel resolution, or one-eighth pixel resolution.

45. The machine readable medium of claim 33, further comprising instructions that in response to being executed on the computing device, cause the computing device to:

buffer 4×4 block based Rs/Cs and 16×16 block based Rs/Cs arrays for a frame from a p distance calculator module;

perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based on the buffered 4×4 block based Rs/Cs and 16×16 block based Rs/Cs arrays;

wherein determining the final motion vector further comprises performing a final multi-stage hierarchical motion estimation (HME) to determine a high accuracy final motion vector, wherein determining a high accuracy motion vector comprises:

compute a first stage motion vector based on the final estimated motion range and the final p distance values;

compute a second stage motion vector based on the first stage motion vector, the final estimated motion range, and the final p distance values; and compute a final stage motion vector based on the second stage motion vector, the final estimated motion range, and the final p distance values to generate the high accuracy final motion vector at one-half pixel, one-fourth pixel or one-eighth pixel resolution.

46. The machine readable medium of claim 33, further comprising instructions that in response to being executed on the computing device, cause the computing device to:

buffer 4×4 block based Rs/Cs and 16×16 block based Rs/Cs arrays for a frame from a p distance calculator module;

perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based on the buffered 4×4 block based Rs/Cs and 16×16 block based Rs/Cs arrays;

wherein determining the final motion vector further comprises performing a final multi-stage hierarchical motion estimation (HME) to determine a high accuracy final motion vector, wherein determining a high accuracy motion vector comprises:

compute a first stage motion vector at half pixel resolution based on the final estimated motion range and the final p distance values;

compute a second stage motion vector at half pixel resolution based on the first stage motion vector at half pixel resolution, the final estimated motion range, and the final p distance values; and compute a final stage motion vector at one fourth pixel resolution based on the second stage motion vector at half pixel resolution, the final estimated motion range, and the final p distance values to generate the high accuracy final motion vector at one-half pixel, one-fourth pixel or one-eighth pixel resolution.

47. The machine readable medium of claim 33, further comprising instructions that in response to being executed on the computing device, cause the computing device to:

buffer 4×4 block based Rs/Cs and 16×16 block based Rs/Cs arrays for a frame from a p distance calculator module;

perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based on the buffered 4×4 block based Rs/Cs and 16×16 block based Rs/Cs arrays;

wherein determining the final motion vector further comprises performing a final multi-stage hierarchical motion estimation (HME) to determine a high accuracy final motion vector, wherein determining a high accuracy motion vector comprises:

compute a first stage motion vector at half pixel resolution based on the final estimated motion range and the final p distance values;

compute a second stage motion vector at half pixel resolution based on the first stage motion vector at half pixel resolution, the final estimated motion range, and the final p distance values; and compute a final stage motion vector at one eighth pixel resolution based on the second stage motion vector at half pixel resolution, the final estimated motion range, and the final p distance values to generate the high accuracy final motion vector at one-half pixel, one-fourth pixel or one-eighth pixel resolution.

48. The machine readable medium of claim 33, further comprising instructions that in response to being executed on the computing device, cause the computing device to:

perform an estimated motion range analysis to determine an estimated motion direction and estimated motion range prior to performing the motion estimate between consecutive frames, wherein the determination of the estimated motion direction and estimated motion range is determined in an Rs/Cs domain associated with the horizontal and vertical texture direction data;

wherein determining the motion vector further comprises performing a multi-stage sequential hierarchical motion estimation, comprising:

perform a first stage of the multi-stage sequential hierarchical motion estimation to determine an initial motion vector at a coarse level based on the estimated motion direction and the estimated motion range, wherein the coarse level comprises a level at $\frac{1}{16}^{th}$ the size of an original picture;

perform one or more intermediate stages of the multi-stage sequential hierarchical motion estimation to determine one or more intermediate motion vectors at one or more intermediate levels based on the initial motion vector, wherein at least one of the intermediate levels comprises a level at $\frac{1}{4}^{th}$ the size of the original picture; and perform a final stage of the multi-stage sequential hierarchical motion estimation to determine a final motion vector at a fine level based on the one or more intermediate motion vectors, wherein the fine level comprises a level at the full size of the original picture;

wherein determining the shot change further comprises a multi-criteria determination, comprising:
  performing the shot change detection based at least in part on a relationship between a difference between current and previous frame motion vector difference value (diffMVdiffVal) as compared with a spatio temporal index (tscIndex);
  performing the shot change detection based at least in part on a relationship between the spatio temporal index (tscIndex) as compared with the difference value between average frame difference differential (AFDdiff);
  performing the shot change detection based at least in part on a relationship between a spatial complexity measure (SC) as compared with a difference value between RsCs difference between current and previous frames; and
  performing the shot change detection based at least in part on a relationship between a current SC and a current average frame difference (AFD) as compared with an SC index and the spatio temporal index (tscIndex);
perform a prediction distance calculation to determine an initial p distance based on the spatial index and the temporal index;
perform a prediction distance calculation to determine an intermediate p distance based on the initial p distance as well as the determined shot change, wherein a positive shot change detection results in resetting the intermediate p distance value to a frame before the determined shot change frame and flagging the determined shot change frame as an I-picture, wherein performing the prediction distance calculation to determine the final p distance includes determining the final p distance based on the intermediate p distance as well as the average frame difference, wherein performing the prediction distance calculation to determine the final p distance includes determining the final p distance based on a lookup table for spatial complexity measure and temporal spatial measure that is associated with the spatial index and the temporal index, and wherein the number of intervening B-picture frames is one value less than the final p distance,
buffer 4×4 block based Rs/Cs and 16×16 block based Rs/Cs arrays for a frame from a p distance calculator module;
perform a final estimated motion range analysis to determine a final estimated motion direction and final estimated motion range prior to performing a final motion estimate between frames separated by the final p distance with consecutive frames or frames with higher distance, wherein the determination of the final estimated motion direction and final estimated motion range is determined in an Rs/Cs domain associated with the horizontal and vertical texture direction data, wherein the determination of the final estimated motion direction and final estimated motion range is determined in the Rs/Cs domain based on the buffered 4×4 block based Rs/Cs and 16×16 block based Rs/Cs arrays;
wherein determining the final motion vector further comprises performing a final multi-stage sequential hierarchical motion estimation, comprising:
  perform a final first stage of the multi-stage sequential hierarchical motion estimation at half pixel resolution to determine a final initial motion vector at a final coarse level based on the estimated motion direction and the estimated motion range, wherein the final coarse level comprises a level at $\frac{1}{16}^{th}$ the size of an original picture;
  perform one or more final intermediate stages of the final multi-stage sequential hierarchical motion estimation at half pixel resolution to determine one or more final intermediate motion vectors at one or more final intermediate levels based on the final initial motion vector, wherein at least one of the final intermediate levels comprises a level at $\frac{1}{4}^{th}$ the size of the original picture; and
  perform a final stage of the multi-stage sequential hierarchical motion estimation at one-fourth pixel or one-eighth pixel resolution to determine a final motion vector at a fine level based on the one or more intermediate motion vectors, wherein the fine level comprises a level at the full size of the original picture.

* * * * *